United States Patent
Lee et al.

(10) Patent No.: US 10,779,254 B2
(45) Date of Patent: Sep. 15, 2020

(54) SERVICE REQUEST METHOD FOR 5G LOCAL SERVICE

(71) Applicant: Electronics and Telecommunications Research Institute, Daejeon (KR)

(72) Inventors: Soohwan Lee, Daejeon (KR);
Dongmyoung Kim, Sejong-si (KR);
Myung Ki Shin, Seoul (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 15/998,693

(22) Filed: Aug. 16, 2018

(65) Prior Publication Data

US 2019/0059067 A1    Feb. 21, 2019

(30) Foreign Application Priority Data

Aug. 16, 2017  (KR) .................. 10-2017-0103791
Jun. 22, 2018  (KR) .................. 10-2018-0072004

(51) Int. Cl.
*H04W 60/04*     (2009.01)
*H04L 29/08*     (2006.01)
(Continued)

(52) U.S. Cl.
CPC .......... *H04W 60/04* (2013.01); *H04L 47/821* (2013.01); *H04L 67/141* (2013.01); *H04W 28/10* (2013.01);
(Continued)

(58) Field of Classification Search
CPC . H04W 28/10; H04W 28/0268; H04W 60/04; H04L 67/141; H04L 67/143
See application file for complete search history.

(56) References Cited

U.S. PATENT DOCUMENTS 10,299,173 B2 *  5/2019  Wu .................. H04W 36/0011
10,362,511 B2 *  7/2019  Youn ................ H04W 36/0011
(Continued)

FOREIGN PATENT DOCUMENTS

WO    2014/052877    4/2014
WO    2015/142048    9/2015

OTHER PUBLICATIONS

"TS 23.502: Updating Service Request procedure to consider LADN service"; SA WG2 Meeting #122-BIS, Aug. 21-25, 2017, 3GPP, pp. 1-12, Sophia Antipolis, France.

*Primary Examiner* — Rasheed Gidado
(74) *Attorney, Agent, or Firm* — Kile Park Reed & Houtteman PLLC

(57) ABSTRACT

Provided is a service request method performed by an SMF device, including receiving, by an AMF device, an N2 message including a service request message from an access network, and receiving an Nsmf_PDUSession_UpdateSM-Context request message including a PDU session ID and location information and an access type of a UE from the AMF device; verifying selection criteria of a UPF device based on the received location information of the UE and determining whether to use a new UPF device or an old UPF device; and sending an Nsmf_PDUSession_UpdateSMContext response message including information on a PDU session ID with the new UPF device or the old PUF device based on the determining. The access network is configured to receive, from the AMF device, an N2 request message including an MM NAS service accept and the access network is configured to perform a service through an RRC connection reconfiguration with the UE.

13 Claims, 16 Drawing Sheets

(51) Int. Cl.
*H04L 12/911* (2013.01)
*H04W 28/10* (2009.01)
*H04W 28/02* (2009.01)

(52) U.S. Cl.
CPC ....... *H04L 67/143* (2013.01); *H04W 28/0268* (2013.01)

(56) References Cited

U.S. PATENT DOCUMENTS

| | | | |
|---|---|---|---|
| 10,375,665 B2* | 8/2019 | Li | H04W 8/02 |
| 10,470,199 B2* | 11/2019 | Wu | H04W 72/1215 |
| 2011/0138033 A1 | 6/2011 | Yang et al. | |
| 2014/0098786 A1 | 4/2014 | Yim et al. | |
| 2016/0073308 A1 | 3/2016 | Okabe et al. | |
| 2016/0088673 A1 | 3/2016 | Yang et al. | |
| 2017/0288972 A1* | 10/2017 | Li | H04L 41/0803 |
| 2017/0359749 A1* | 12/2017 | Dao | H04W 28/0268 |
| 2018/0199398 A1* | 7/2018 | Dao | H04W 36/14 |
| 2018/0270781 A1* | 9/2018 | Baek | H04W 60/06 |
| 2018/0270888 A1* | 9/2018 | Faccin | H04W 76/15 |
| 2018/0279397 A1* | 9/2018 | Faccin | H04W 76/15 |

\* cited by examiner

<RM state model in UE>

<RM state model in AMF>

<CM state transition in UE>

<CM state transition in AMF>

Local access to the same DN

SERVICE REQUEST METHOD FOR 5G LOCAL SERVICE

CROSS-REFERENCE TO RELATED APPLICATION(S)

This application claims the priority benefit of Korean Patent Application No. 10-2017-0103791 filed on Aug. 16, 2017, and Korean Patent Application No. 10-2018-0072004 filed on Jun. 22, 2018, in the Korean Intellectual Property Office, the disclosures of which are incorporated herein by reference for all purposes.

BACKGROUND

1. Field

One or more example embodiments relate to a service request method for a 5G local service.

2. Description of Related Art

A mobile edge computing (MEC) technique is proposed to provide a low latency data service in a user equipment (UE). The MEC technique is used to minimize a round trip time (RTT) between the UE and a server that provides a service requested by the UE. The MEC technique relates to reducing a number of routing hops between the UE and the server and to deploying a geographical location of the server to be close to the UE.

In a 5G mobile communication network, a variety of services may be provided to the UE through a 5G network technique. Accordingly, the 5G mobile communication network may support an edge computing technique to provide the further enhanced quality of service (QoS) compared to an existing network scheme.

SUMMARY

At least one example embodiment provides a service request method performed based on a relationship between the respective entities in a 5G network.

At least one example embodiment also provides a service request method triggered by a user equipment (UE) in a CM-IDLE state or a CM-CONNECTED state.

At least one example embodiment also provides a service request method triggered by a network and performed based on a relationship between the respective entities.

According to an aspect of at least one example embodiment, there is provided a service request method performed by a session management function (SMF) device, the method including receiving, by an access and mobility management function (AMF) device, an N2 message that includes a service request message from an access network, and receiving an Nsmf_PDUSession_UpdateSMContext request message that includes a protocol data unit (PDU) session identifier (ID) and location information and an access type of a user equipment (UE) from the AMF device; verifying selection criteria of a user plane function (UPF) device based on the received location information of the UE and determining whether to use a new UPF device or an old UPF device; and sending an Nsmf_PDUSession_UpdateSMContext response message including information on a PDU session ID with the new UPF device or the old PUF device based on the determining. The access network is configured to receive, from the AMF device, an N2 request message that includes an MM non-access-stratum (NAS) service accept and the access network is configured to perform a service through a radio resource control (RRC) connection reconfiguration with the UE.

The SMF device may be configured to send an N4 session establishment request message to the new UPF device in response to determining to use the new UPF device.

The SMF device may be configured to send an N4 session modification request message including downlink (DL) tunnel information to a PUF (PSA) device that acts as a PDU session anchor, in response to determining to use the new UPF device.

The SMF device may be configured to send an N4 session modification request message to the old UPF device in response to determining to use the new UPF device.

According to an aspect of at least one example embodiment, there is provided a service request message performed by an AMF device, the method including sending, to an SMF device, an Nsmf_PDUSession_UpdateSMContext request message that includes location information of a UE in response to receiving, from an access network, an N2 message that includes a service request message; receiving an Nsmf_PDUSession_UpdateSMContext response message from the SMF device that verifies selection criteria of a PUF device based on the location information of the UE and determines whether to use a new UPF device or an old UPF device; and sending, to the access network, an N2 request message that includes an MM NAS service accept. The access network is configured to perform a service through an RRC connection reconfiguration with the UE.

In response to receiving the N2 message from the access network, the AMF device may be configured to initiate an NAS authentication procedure with the UE and a security procedure with an authentication server function (AUSF) if the service request message is not sent integrity protected or integrity protection verification is indicated failed.

According to an aspect of at least one example embodiment, there is provided a service request method performed by a new UPF device, the method including receiving an N4 session establishment request message from an SMF device when the SMF devices receives, from an AMF device, an Nsmf_PDUSession_UpdateSMContext request message that includes a PDU session ID and location information and an access type of a UE and determines to use a new UPF device by verifying selection criteria of the UPF device based on the location information of the UE; and sending, to the SMF device, an N4 session establishment response message indicating that an N4 session between the new UPF device and the SMF device is established instead of using an old UPF device. The SMF device is configured to send an Nsmf_PDUSession_UpdateSMContext response message to the AMF device, the AMF device is configured to send an N2 request message including an MM NAS service accept to an access network, and the access network is configured to perform a service through an RRC connection reconfiguration with the UE.

In response to receiving the N4 session establishment request message, the new UPF device may be configured to allocate downlink (DL) core network (CN) tunnel information and uplink (UL) CN tunnel information for the new UPF device that acts as a PDU session anchor.

According to an aspect of at least one example embodiment, there is provided a service request method performed by an old UPF device, the method including receiving an N4 session modification request message from an SMF device when the SMF device receives, from an AMF device, an Nsmf_PDUSession_UpdateSMContext request message that includes a PDU session ID and location information and an access type of a UE and determines to use a new UPF device instead of using the old UPF device by verifying selection criteria of a UPF device based on the location information of the UE; and sending, to the SMF device, an N4 session modification response message indicating that an N4 session with the old UPF device receiving the message is modified. The SMF device is configured to send an Nsmf_PDUSession_UpdateSMContext response message to the AMF device, the AMF device is configured to send an N2 request message including an MM NAS service accept to an access network, and the access network is configured to perform a service through an RRC connection reconfiguration with the UE.

The N4 session modification request message may include DL tunnel information.

According to an aspect of at least one example embodiment, there is provided a service request method performed by a UE, the method including sending a service request message to an access network; and performing a service through an RRC connection reconfiguration with the access network in such a manner that an AMF device receives an N2 message including the service request message from the access network and sends an Nsmf_PDUSession_UpdateSMContext request message including location information of the UE to an SMF device, the SMF device sends an Nsmf_PDUSession_UpdateSMContext response message to the AMF device, and the AMF device sends an N2 request including an MM NAS service accept to the access network.

In response to receiving the N2 message from the access network, the AMF device may be configured to initiate an NAS authentication procedure with the UE and a security procedure with an AUSF if the service request message is not sent integrity protected or integrity protection verification is indicated failed.

According to an aspect of at least one example embodiment, there is provided a service request method including receiving, by an AMF device, an N11 message from an SMF device that receives a data notification message indicating that a user plane function (UPF) device not including access network tunnel information for a PDU session receives DL data; and sending, by the AMF device, a paging message for performing a paging procedure with respect to a UE to an access network based on a PDU session ID and N2 SM information included in the N11 message. The UE may be configured to initiate the paging procedure and the UPF device is configured to send and receive data associated with a service to and from the UE using a PDU session identified from an MM NAS service request message.

If a connection management state for a non-3$^{rd}$ Generation Partnership Project (non-3GPP) access is a CM-IDLE state and a connection management state for a 3GPP access is a CM-CONNECTED state, the UE may be configured to send a list of allowed PDU sessions capable of being re-activated over the 3GPP access.

The list of PDU sessions may include a session of which use is allowed over the 3GPP access among PDU sessions associated with the non-3GPP access.

If a connection management state for a 3GPP access is a CM-IDLE state, the UE may be configured to initiate a data transmission and reception procedure associated with a service with the UPF device in response to receiving the paging message for the PDU session associated with the 3GPP access.

If a connection management state for a 3GPP access and a non-3GPP access is a CM-IDLE state, the UE may be configured to send, to the AMF device, a list of allowed PDU session capable of being re-activated over the 3GPP access.

The paging message may be sent based on a paging strategy managed by the AMF device, and the paging strategy may be set by a timer supervised by the AMF device, or used when the AMF device determines whether to send the paging message during high load conditions or determines whether to apply a sub-area based paging.

If the UPF device receives additional downlink data for a quality of service (QoS) flow of a PDU session with the same or lower priority than that of the PDU session, the UPF device that sends the data notification message to the SMF device may be configured to buffer the additional downlink data instead of sending a new data notification message.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

Figure 1:
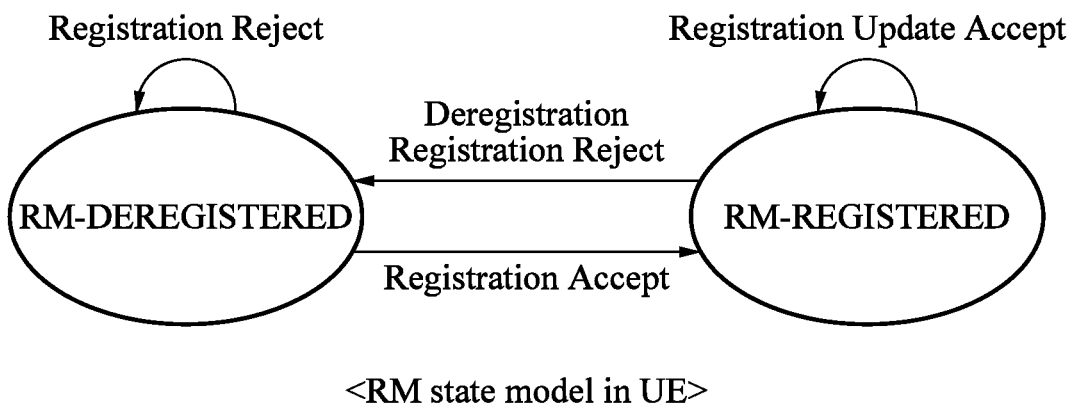
FIG. 1 illustrates an example of a registration management (RM) state model of a user equipment (UE) according to an example embodiment.

Hereinafter, some example embodiments will be described in detail with reference to the accompanying drawings. Regarding the reference numerals assigned to the elements in the drawings, it needs to be noted that the same elements will be designated by the same reference numerals, wherever possible, even though they are shown in different drawings. Also, in the description of embodiments, detailed description of well-known related structures or functions will be omitted when it is deemed that such description will cause ambiguous interpretation of the present disclosure.

The following detailed structural or functional description of example embodiments is provided as an example only and various alterations and modifications may be made to the example embodiments. Accordingly, the example embodiments are not construed as being limited to the disclosure and needs to be understood to include all changes, equivalents, and replacements within the technical scope of the disclosure.

Terms, such as first, second, and the like, may be used herein to describe components. Each of these terminologies is not used to define an essence, order or sequence of a corresponding component but used merely to distinguish the corresponding component from other component(s). For example, a first component may be referred to as a second component, and similarly the second component may also be referred to as the first component.

It needs to be noted that if it is described that one component is "connected." "coupled," or "joined" to another component, a third component may be "connected," "coupled," and "joined" between the first and second components, although the first component may be directly connected, coupled, or joined to the second component. On the contrary, it needs to be noted that if it is described that one component is "directly connected," "directly coupled," or "directly joined" to another component, a third component may be absent. Expressions describing a relationship between components, for example, "between," directly between," or "directly neighboring," etc., needs to be interpreted to be alike.

The singular forms "a." "an," and "the" are intended to include the plural forms as well, unless the context clearly indicates otherwise. It will be further understood that the terms "comprises/comprising" and/or "includes/including" when used herein, specify the presence of stated features, integers, operations, operations, elements, and/or components, but do not preclude the presence or addition of one or more other features, integers, operations, operations, elements, components and/or groups thereof.

Unless otherwise defined, all terms, including technical and scientific terms, used herein have the same meaning as commonly understood by one of ordinary skill in the art to which this disclosure pertains. Terms, such as those defined in commonly used dictionaries, are to be interpreted as having a meaning that is consistent with their meaning in the context of the relevant art, and are not to be interpreted in an idealized or overly formal sense unless expressly so defined herein.

Hereinafter, the example embodiments are described with reference to the accompanying drawings.

Definitions 5G access network: refers to an access network that includes an NG-RAN and/or non-3GPP AN connecting to a 5G core network.
5G core network: connects to the 5G access network.
5G system: refers to a 3GPP system that includes the 5G access network, the 5G core network, and a user equipment (UE).
Allowed area: refers to an area in which the UE is allowed to initiate communication.
AMF region: refers to an AMF region that includes one or more access and mobility management function (AMF) sets.
Local area data network: refers to a data network (DN) that is accessible by the UE in a specific location, that provides connectivity to a specific DNN, and of which availability is provided to the UE.
NG-RAN: refers to a radio access network (RAN) that supports at least one of the following options with the common characteristics that it connects to the 5G core network: 1) standalone new radio; 2) new radio is an anchor with E-UTRA extensions; 3) standalone E-UTRA; and 4) E-UTRA is an anchor with new radio extensions.
Protocol data unit (PDU) session: refers to an association between the UE and a data network that provides a PDU connectivity service.
PDU connectivity service: refers to a service that provides exchange of PDUs between the UE and the data network.
PDU session type: refers to a type of a PDU session that may be IPv4, IPv6, Ethernet, or unstructured.
Service continuity: refers to uninterrupted user experience of a service, including a case in which an IP address and/or an anchoring point change.
session continuity: refers to a continuity of a PDU session. For a PDU session of IPv4 or IPv6 type, "session continuity" indicates that an IP address is preserved for lifetime of the PDU session.

Abbreviations

5GC: core network
5GS: 5G system
5G-AN: 5G access network
5G-GUTI: 5G globally unique temporary identifier
AMF: access and mobility management function
AUSF: authentication server function
CP: control plane
DL: downlink
DN: data network
DNN: data network name
HR: home routed (roaming)
LADN: local area data network
MICO: mobile initiated connection only
N3IWF: non-3GPP inter working function
NAI: network access identifier
NF: network function
NR: new radio
NEF: network exposure function
NRF: network repository function
PCF: policy control function
PSA: PDU session anchor
(R)AN: (radio) access network
SSC: session and service Continuity
SUCI: subscription concealed identifier SUPI: subscription permanent identifier
UL: uplink
UL CL: uplink classifier
UPF: user plane function In the following, each of a session management function (SMF), an access and mobility management function (AMF), and a user plane function (UPF) may be a software function, or may be installed or executed on each of multiple hardware modules.

<Concepts>

A 5G system architecture is defined to support data connectivity and services using techniques such as, for example, network function virtualization (NFV) and software defined networking (SDN). The 5G system architecture may leverage service-based interactions between control plane (CP) network functions. Some key principles and concept follow as:

i) separate user plane (UP) functions from control plane (CP) functions, allowing independent scalability, evolution, and flexible deployments, for example, a centralized location or a distributed (remote) location; ii) modularize a function design, for example, to enable flexible and efficient network slicing; iii) if applicable, define procedures (i.e., a set of interactions between network functions) as services, so their reuse is possible; iv) enable each network function to interact with other network functions directly if necessary (here, the architecture does not preclude the use of an intermediate function to help route CP messages); v) minimize dependency between the access network (AN) and the core network (CN) (here, the architecture is defined with a converged core network with a command AN-CN interface that integrates different access type)s; vi) support a unified authentication framework; vii) support "stateless" NFs in which a "compute" resource is decoupled from a "storage" resource; viii) support capability exposure; ix) support a concurrent access to local and centralized services (here, to support low latency services and an access to local data networks, UP functions may be deployed close to the access network); and x) support roaming with both home routed traffic as well as Local breakout traffic in a visited PLMN.

<Architecture Reference Model>

Here, an architecture of the 5G system is described. The 5G system architecture is defined as a service-based architecture and an interaction between network functions is represented in the following two ways:

i) A service-based representation describes that network functions, for example, an AMF device, within a control plane enable other authorized network functions to access services of the network functions. The service-based representation may include a point-to-point reference point if necessary. ii) A reference point representation describes that an interaction is present between NF services in network functions described by a point-to-point reference point, for example, N11, between any two network functions, for example, an AMF and an SMF.

<Service-Based Interface>

The 5G system architecture includes the following service-based interfaces:

i) Namf: a service-based interface exhibited by an AMF; ii) Nsmf: a service-based interface exhibited by an SMF; iii) Nnef: a service-based interface exhibited by an NEF; iv) Npcf: a service-based interface exhibited by a PCF; v) Nudm: a service-based interface exhibited by a unified data management (UDM); vi) Naf: a service-based interface exhibited by an AF; vii) Nnrf: a service-based interface exhibited by an NRF; viii) Nnssf: a service-based interface exhibited by an NSSF; ix) Nausf: a service-based interface exhibited by an AUSF; x) Nudr: a service-based interface exhibited by a unified data repository (UDR); and xi) Nudsf: a service-based interface exhibited by a UDSF.

<Reference Points>

The 5G system architecture includes the following reference points:

1) N1: a reference point between a UE and an AMF device; 2) N2: a reference point between an access network and the AMF device; 3) N3: a reference point between the access network and a UPF device; 4) N4; a reference point between an SMF device and the UPF device; 5) N6: a reference point between the UPF device and a data network; and 6) N9: reference point between UPF devices.

The following reference points describe interactions that are present between NF services in NFs. The reference points are realized by corresponding NF service-based interfaces and by specifying an identified consumer and producer NF service as well as interaction therebetween to realize a specific system procedure:

1) N5: a reference point between a PCF and an AF; 2) N7: a reference point between the SMF device and the PCF; 3) N8: a reference point between a UDM and the AMF device; 4) N10: a reference point between the UDM and the SMF device; 5) N11: a reference point between the AMF device and the SMF device; 6) N12: a reference point between the AMF device and an AUSF; and 7) N14: a reference point between AMF devices.

<Support of Non-3GPP Access>

The 5G core network supports the connectivity of the UE over the non-3GPP access networks, for example, a wireless local area network (WLAN) access. Support of non-3GPP access networks deployed outside the NG-RAN (referred to as a "standalone" non-3GPP access) is described herein.

The 5G core network may support an untrusted non-3GPP access. The non-3GPP access networks may be connected to the 5G core network over a non-3GPP interworking function (N3IWF). The N3IWF may interface 5G core network CP and UP functions through N2 and N3 interfaces, respectively.

N2 and N3 reference points may be used to connect standalone non-3GPP accesses to the 5G core network CP and UP functions, respectively.

The UE that accesses the 5G core network over the standalone non-3GPP access may, after UE attachment, support NAS signaling with the 5G core network CP functions using the N reference point.

When the UE is connected over the NG-RAN and over the standalone non-3GPP access, a plurality of N1 instances may be present for the UE. That is, a single N1 instance over the NG-RAN and a single N1 instance over the non-3GPP access may be present.

The UE simultaneously connected to the same 5G core network of a PLMN over the 3GPP access and the non-3GPP access may be served by a single AMF device if the selected N3IWF is located in the same PLMN as that of the 3GPP access.

When the UE is connected to the 3GPP access of the PLMN, if the UE selects the N3IWF and the N3IWF is located in a PLMN different from the PLMN of the 3GPP access, for example, in a different VPLMN or in an HPLMN, the UE may be served separately by the two PLMNs. The UE may be registered with two separate AMF devices. PDU sessions over the 3GPP access may be served by V-SMF devices different from a V-SMF device serving the PDU sessions over the non-3GPP access.

The PLMN selection for the 3GPP access does not depend on the N3IWF selection. If the UE is registered over the non-3GPP access, the UE may perform the PLMN selection for the 3GPP access independently of the PLMN to which the N3IWF belongs.

The UE may establish an IPSec tunnel with the N3IWF to attach to the 5G core network over the untrusted non-3GPP access. The UE may be authenticated by and attached to the 5G core network during the IPSec tunnel establishment procedure.

It may be possible to maintain a UE signaling connection with the AMF device over the non-3GPP access after all the PDU sessions for the UE over that access are released or handed over to the 3GPP access. N1 NAS signaling over the standalone non-3GPP accesses may be protected with the same security mechanism applied for N11 over the 3GPP access.

User plane QoS differentiation between UE and N3IWF is supported.

<Registration Management>

The registration management is used to register or deregister a UE/user with a network, and to establish a user context in the network.

The UE/user needs to register with the network to receive a service that requires registration. Once registered and if applicable, the UE updates its registration with the network 1) periodically to remain reachable (period registration update); 2) upon mobility (mobility registration update); or 3) to update its capability or re-negotiate protocol parameters.

An initial registration procedure includes execution of network access control functions (i.e., user authentication and access authorization based on subscription files in UDM). As a result of the registration procedure, an identifier of a serving AMF device serving the UE in an access through which the UE is registered may be registered in the UDM.

The registration management procedure may be applied over a 3GPP access and a non-3GPP access. 3GPP and non-3GPP registration management (RM) states are mutually independent.

The following two RM states are used in the UE and the AMF device that reflect a registration status of the UE in the selected PLMN: i) RM-DEREGISTERED and ii) RM-REGISTERED.

Figure 2:
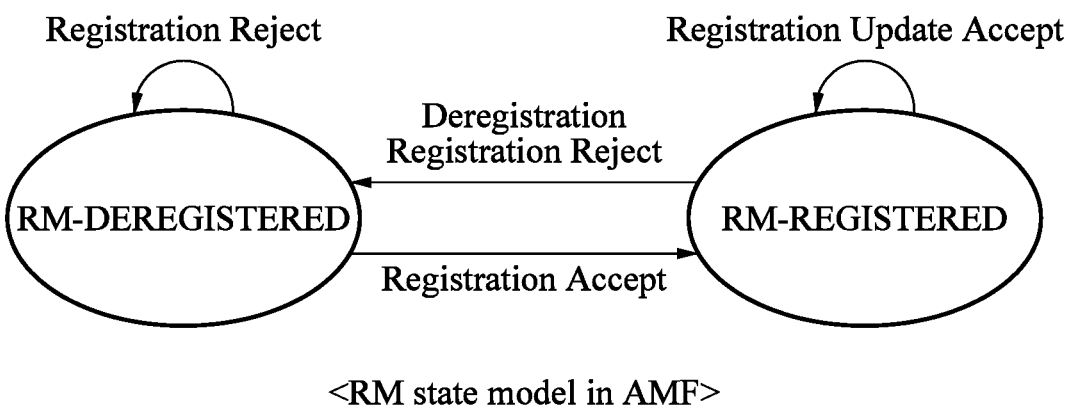
FIG. 2 illustrates an example of an RM state model of an access and mobility management function (AMF) device according to an example embodiment.

FIG. 1 illustrates an example of a registration management (RM) state model of a UE according to an example embodiment, and FIG. 2 illustrates an example of an RM state model of an AMF device according to an example embodiment.

1. RM-DEREGISTERED State

In the RM-DEREGISTERED state, the UE is not registered with a network. A UE context in an AMF device holds no valid location or routing information for the UE. Therefore, the UE may not be reachable by the AMF device. However, a portion of the UE context may be stored in the UE and the AMF device, for example, to avoid running an authentication procedure during every registration procedure.

In the RM-DEREGISTERED state, the UE may i) attempt to register with the selected PLMN using the initial registration procedure if the UE needs to receive a service that requires registration; ii) remain in the RM-DEREGISTERED state if the UE receives a registration reject upon initial registration; and iii) enter an RM-REGISTERED state in response to receiving a registration accept.

When a UE RM state of the AMF device is RM-DEREGISTERED, the AMF device may i), if applicable, accept the initial registration of the UE by sending a registration accept to the UE and enter the RM-REGISTERED state for the UE; or ii), if applicable, reject the initial registration of the UE by sending a registration reject to the UE.

2. RM-REGISTERED State

In the RM-REGISTERED state, the UE is registered with the network. In the RM-REGISTERED state, the UE may receive a service that requires registration with the network.

In the RM-REGISTERED state, the UE may i) perform a mobility registration update procedure if a current TAI of a servicing cell is absent in a list of TAIs that the UE receives from the network to maintain the registration and enable the AMF device to page the UE; ii) perform a periodic registration update procedure triggered by expiry of a periodic update timer to notify the network that the UE is still active; iii) perform a registration update procedure to update its capability information or to re-negotiate parameters with the network; iv) perform a deregistration procedure and enter the RM-DEREGISTERED state when the UE needs to be no longer registered with the PLMN (the UE may determine to deregister from the network at any time); and v) enter the RM-DEREGISTERED state in response to receiving a registration reject message or a deregistration message. The actions of the UE depend on a cause value in a registration rejection message or a deregistration message.

When the UE RM state of the AMF device is RM-REGISTERED, the AMF device may i) perform a deregistration procedure and enter the RM-DEREGISTERED state for the UE when the UE needs to be no longer registered with the PLMN (the network may determine to deregister the UE at any time); ii) perform an implicit deregistration at any time after expiry of an implicit deregistration timer, and enter the RM-DEREGISTERED state for the UE after the Implicit deregistration; and iii), if applicable, accept or reject a registration request or a service request from the UE.

3. Registration Area Management

The registration area management includes functions of allocating and reallocating a registration area to the UE. The registration area is managed per access type, for example, 3GPP access or non-3GPP access.

When the UE registers with the network over the 3GPP access, the AMF device may allocate a set of tracking areas included in a TAI list to the UE. When the AMF device allocates the registration area, that is, the set of tracking areas in the TAI list, to the UE, a variety of information (e.g., mobility pattern and allowed/non-allowed area) may be used. The AMF device having the whole PLMN as a serving area may alternatively allocate the whole PLMN ("all PLMN") as the registration area to the UE in a MICO mode.

The 5G system may support allocating a TAI list over different 5G-radio access technologies (RATs) in a single TAI list.

When the UE registers with the network over the non-3GPP access, the registration area for the non-3GPP access corresponds to a unique reserved TAI value (i.e., a value dedicated to the non-3GPP access). Thus, there is a unique tracking area for the non-3GPP access to 5GC, which is called N3GPP TAI.

When generating the TAI list, the AMF device may include only TAIs that are applicable on the access over which the TAI list is sent.

4. Support of UE Registered Over Both 3GPP Access and Non-3GPP Access

For a given serving PLMN, there may be a single RM context for the UE for each access, for example, when the UE is consecutively or simultaneously served by the 3GPP access and by the non-3GPP access (over the N3IWF) of the same PLMN. UDM may manage separate/independent UE registration procedures for each access.

When served by the same PLMN for the 3GPP access and the non-3GPP access, the UE may be served by the same AMF device except in a temporary situation after a mobility from EPS while the UE has PDU sessions associated with the non-3GPP access.

The AMF device may associate a plurality of access-specific RM contexts for the UE with i) a 5G-GUTI that is common to both the 3GPP access and the non-3GPP access (here, the 5G-GUTI is globally unique), ii) a registration state per access type (3GPP/non-3GPP), iii) a registration area per access type (one registration area for the 3GPP access and another registration area for the non 3GPP access. Here, the registration areas for the 3GPP access and the non-3GPP access are independent), iv) a periodic registration timer for the 3GPP access, and v) a non-3GPP implicit deregistration timer.

The AMF device may not provide the periodic registration timer for the UE over the non-3GPP access. Accordingly, the UE may not need to perform a periodic registration update procedure over the non-3GPP access. Instead, during the initial registration procedure and re-registration, the UE may be provided, over the network, with a UE non-3GPP deregistration timer that starts when the UE enters a non-3GPP CM-IDLE state.

The 5G-GUTI may be assigned or re-assigned over any of the 3GPP access and the non-3GPP access. The AMF device assigns, to the UE, a single 5G-GUTI that is used over the 3GPP access and the non-3GPP access of the same PLMN or equivalent PLMN (here, it is assumed that control and user plane connectivity is present between nodes of the registered PLMN and its equivalent PLMN). The 5G-GUTI is assigned in response to a successful registration of the UE and is valid over both the 3GPP access and the non-3GPP access to the same PLMN or equivalent PLMN for the UE. Once any initial access is performed over the non-3GPP access or over the 3GPP access, the UE provides the 5G-GUTI received in response to the earlier successful registration over any access of the same PLMN or equivalent PLMN. This enables the AN to select an AMF device that maintains a UE context created at a previous registration procedure and enables the AMF device to correlate the UE request to the existing UE context.

If the UE is performing registration over a single access and intends to perform registration over another access in the same PLMN or equivalent PLMN (e.g., the 3GPP access and the selected N3IWF are located in the same PLMN), the UE may not initiate the registration over the other access until the registration procedure over the first access is completed.

When the UE is successfully registered to one access (3GPP access or non-3GPP access) and the UE registers over the other access:

i) If the second access is located in the same PLMN or equivalent PLMN (e.g., the UE is registered over the 3GPP access and selects a N3IWF located in the same PLMN), the UE may use, for the registration to the PLMN associated with the new access, the 5G-GUTI that is provided to the UE at the previous registration for the first access in the same PLMN or equivalent PLMN.

ii) If the second access is located in a PLMN different from the registered PLMN of the first access (i.e., not the registered PLMN or equivalent PLMN of the registered PLMN), (e.g., the UE is registered to the 3GPP access and selects the N3IWF located in a PLMN different from the PLMN of the 3GPP access, or the UE is registered over the non-3GPP access and registers to the 3GPP access in the PLMN different from the PLMN of the N3IWF), the UE may use, for the registration to the PLMN associated with the new access, a 5G-GUTI only if the UE holds the 5G-GUTI that is previously received from the same PLMN. However, if the UE does not have the 5G-GUTI from the PLMN to which the UE is attempting to register or from the equivalent PLMN, a SUCI may be used for the new registration.

When the UE 5G-GUTI assigned during the registration procedure over the 3GPP access (e.g., the UE registers first over the 3GPP access) is location-dependent, the same UE 5G-GUTI may be re-used over the non-3GPP access when the selected N3IWF function is in the same PLMN as that of the 3GPP access. When the UE 5G-GUTI is assigned during the registration procedure performed over the non-3GPP access (e.g., the UE registers first over the non-3GPP access), the UE 5G-GUTI may not be location-dependent, so that the UE 5G-GUTI may not be valid for a NAS procedure over the 3GPP access and, in this case, a new AMF device may be allocated during the registration procedure over the 3GPP access.

When the UE is registered first over the 3GPP access, if the UE registers to the same PLMN over the non-3GPP access, the UE may send a globally unique AMF identifier (GUAMI) obtained over the 3GPP access to the N3IWF, which uses the received GUAMI to select the same AMF device as the 3GPP access.

The deregistration request indicates whether the deregistration request applies to the 3GPP access or the non-3GPP access, or both.

If the UE is registered on both the 3GPP access and the non-3GPP access and the UE is in a CM-IDLE state over the non-3GPP access, the UE or the AMF device may initiate a deregistration procedure over the 3GPP access to deregister the UE only on the non-3GPP access. Here, all the PDU sessions associated with the non-3GPP access may be released.

If the UE is registered on both the 3GPP access and the non-3GPP access and is in the CM-IDLE state over the 3GPP access and in a CM-CONNECTED over the non-3GPP access, the UE may initiate the deregistration procedure over the non-3GPP access to deregister the UE only on the 3GPP access. Here, all the PDU sessions associated with the 3GPP access may be released.

<Connection Management>

The connection management is used to establish or release a signaling connection between the UE and the AMF device. The connection management includes a function of establishing and releasing the signaling connection between the UE and the AMF device over N1. The signaling connection is used to enable NAS signaling exchange between the UE and the core network, and includes an access network (AN) signaling connection between the UE and the AN (a radio resource control (RRC) connection over a 3GPP access or a UE-N3IWF connection over a non-3GPP access) and an N2 connection for the UE between the AN and the AMF device.

The following CM states are used to reflect a NAS signaling connection between the AMF device and the UE:
 i) CM-IDLE; and ii) CM-CONNECTED.

The CM states for the 3GPP access and the non-3GPP access are mutually independent. That is, if one is in the CM-CONNECTED state, the other may be in the CM-IDLE state at the same time.

Figure 3:
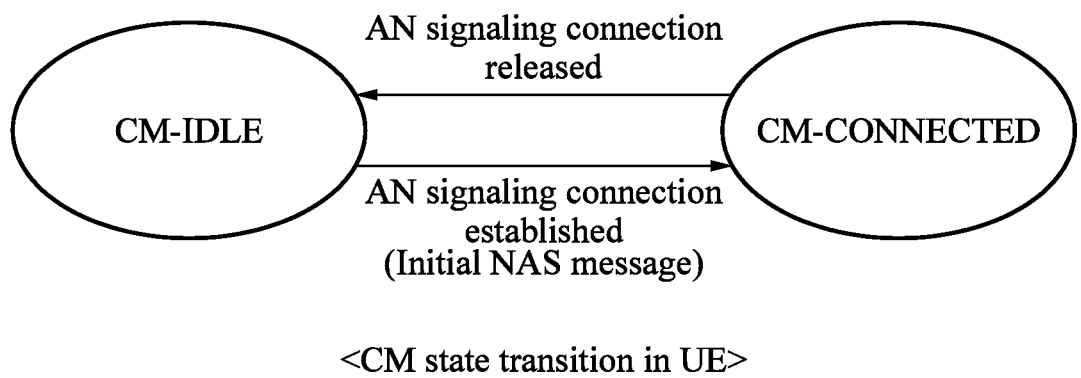
FIG. 3 illustrates an example of a connection management (CM) state transition in a UE according to an example embodiment.
Figure 4:
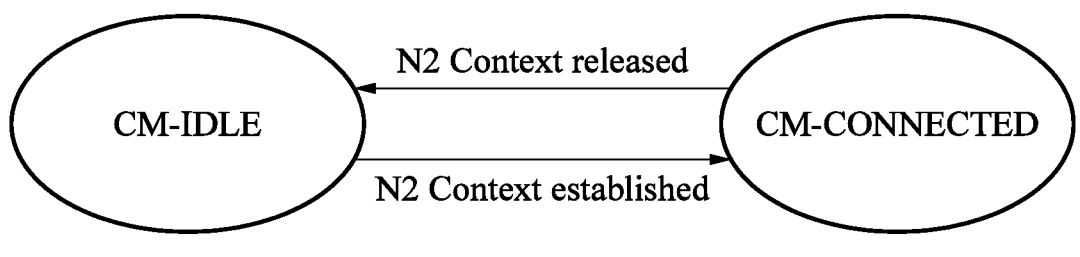
FIG. 4 illustrates an example of a CM state transition in an AMF device according to an example embodiment.

FIG. 3 illustrates an example of a connection management (CM) state transition in a UE according to an example embodiment, and FIG. 4 illustrates an example of a CM state transition in an AMF device according to an example embodiment.

1. CM-IDLE State

A UE in the CM-IDLE state has no signaling connection established with an AMF device over N1. The UE performs a cell selection/cell reselection and performs a PLMN selection.

The UE in the CM-IDLE state has no AN signaling connection, N2 connection, and N3 connection.

If the UE is in the CM-IDLE state and the RM-REGISTERED state, the UE may i) respond to paging by performing a service request procedure unless the UE is in a MICO mode; and ii) perform a service request procedure when the UE has uplink signaling or user data to be sent. Specific conditions are applied to LADN.

The UE may enter the CM-CONNECTED state every time an AN signaling connection is established between the UE and the AN. The UE may enter an RRC connected state over the 3GPP access or at the establishment of a UE-N3IWF connectivity over the non-3GPP access. Sending of an initial NAS message, for example, a registration request message, a service request message, or a deregistration request message, initiates a transition from the CM-IDLE state to the CM-CONNECTED state.

When the UE states in the AMF device are CM-IDLE and RM-REGISTERED, the AMF device may i) perform a network triggered service request procedure when the AMF device has signaling or mobile-terminated data to be sent to the UE by sending a paging request to the UE if the UE is not prevented from responding.

The AMF device may enter the CM-CONNECTED state for the UE every time an N2 connection is established for the UE between the AN and the AMF device.

Receiving of an initial N2 message, for example, an N2 initial UE message, initiates transition of the AMF device from the CM-IDLE state to the CM-CONNECTED state.

The UE and the AMF device may optimize the power efficiency and the signaling efficiency of the UE when the UE and the AMF device are in the CM-IDLE state.

2. CM-CONNECTED State

The UE in the CM-CONNECTED state has a NAS signaling connection with the AMF device over N1. The NAS signaling connection uses an RRC connection between the UE and an NG-RAN and an NGAP UE association between the AN and the AMF device. The UE may be in the CM-CONNECTED state with the NGAP UE association that is not bound to any TNLA between the AN and the AMF device. In response to completion of a NAS signaling procedure, the AMF device may determine to release the NAS signaling connection with the UE:

In the CM-CONNECTED state, the UE may i) enter the CM-IDLE state every time the AN signaling connection is released (enter an RRC idle state over the 3GPP access or when release of UE-N3IWF connectivity over the non-3GPP access is detected by the UE).

When a UE CM state in the AMF device is CM-CONNECTED, the AMF device may i) enter the CM-IDLE state for the UE every time a logical NGAP signaling connection and an N3 user plane connection for the UE are released in response to completion of the AN release procedure.

The AMF device may maintain the UE CM state in the AMF device to be in the CM-CONNECTED state until the UE deregisters from a core network.

The UE in the CM-CONNECTED state may be in an RRC inactive state. When the UE is in the RRC inactive state, the following applies i) UE reachability is managed by a RAN with assistance information from the core network; ii) UE paging is managed by the RAN; and iii) the UE monitors paging with a RAN identifier and CN (5G S-TMSI) of the UE.

<UE Mobility Restrictions>

The mobility restrictions limit mobility handling or service access of the UE in the 5G system. The mobility restriction functionality is provided from the UE, the radio access network, and the core network. The mobility restrictions only apply to the 3GPP access and do not apply to the non-3GPP access.

The mobility restrictions for a CM-IDLE state and for a CM-CONNECTED state when in an RRC inactive state are executed by the UE based on information received from the core network. The mobility restrictions for the CM-CONNECTED state when in an RRC-connected state are executed by the radio access network and the core network.

In the CM-CONNECTED state, the core network provides the mobility restrictions to the radio access network within a handover restriction list.

The mobility restrictions may include i) a RAT restriction, ii) a forbidden area, iii) a service area restriction, and iv) a core network type restriction as follows:

i) Rat Restriction:

The RAFT restriction defines a 3GPP radio access technology that does not allow the UE to access a PLMN. In a restricted RAT, the UE is based on subscription not permitted to initiate any communication for the PLMN. For the CM-CONNECTED state, when the radio access network determines a target RAT and a target PLMN during a handover procedure, per PLMN RAT restriction needs to be considered.

ii) Forbidden Area:

In the forbidden area under a given RAT, the UE is based on subscription not permitted to initiate any communication with the network for the PLMN. In terms of cell selection, RAT selection, and PLMN selection, a UE behavior depends on a network response that informs the UE of the forbidden area.

iii) Service Area Restriction:

The service area restriction defines areas in which the UE may or may not initiate communication with the network as follows: ① allowed area: In the allowed area under a given RAT, the UE is permitted to initiate communication with the network as allowed by the subscription. ② non-allowed Area: In the non-allowed area under the given RAT, the UE may be service area restricted based on subscription. The UE and the network are not allowed to initiate a service request or SM signaling to obtain user services (both in the CM-IDLE state and in the CM-CONNECTED state). RRC procedures while the UE is in the CM-CONNECTED state with the RRC inactive state are unchanged compared to when the UE is in the allowed area. RM procedures are unchanged compared to when the UE is in the allowed area. The UE in the non-allowed area may respond to core network paging with the service request and RAN paging.

iv) Core Network Type Restriction:

The core network type restriction defines whether the UE is allowed to connect to the 5GC for the PLMN.

For the given UE, the core network determines the mobility restrictions based on UE subscription information, a UE location, and a UE local policy. The mobility restriction may change due to, for example, subscription, location change and local policy of the UE. Optionally, the service area restrictions or the non-allowed area may be fine-tuned by a PCF device, for example, based on UE location, PEI, and network policies. The service area restrictions may be updated during a registration procedure or a UE configuration update procedure.

If the network sends the service area restrictions to the UE, the network may send either the allowed area or the non-allowed area, and may not send both the allowed area and the non-allowed area at the same time, to the UE. If the UE receives the allowed area from the network, any TA not part of the allowed area is considered by the UE as non-allowed. If the UE receives the non-allowed area from the network, any TA not part of the non-allowed area is considered by the UE as allowed. If the UE does not receive the service area restrictions, any TA in the PLMN is considered as allowed.

If the UE has overlapping areas between RAT restrictions, forbidden areas, service area restrictions, or any combination thereof, the UE may proceed in the following precedence order:

i) An evaluation of the RAT restrictions may take precedence over an evaluation of any other mobility restrictions.
ii) An evaluation of the forbidden areas may take precedence over an evaluation of the service area restrictions.

The UE may override the RAT restrictions, the forbidden area, and the non-allowed area restrictions whenever the UE accesses the network for regulatory prioritized services, such as emergency services and MPS. Also, the network may override the non-allowed area restrictions and the RAT restrictions for regulatory prioritized services, such as emergency services and MPS.

<Mobility Pattern>

The mobility pattern is a concept that may be used by the AMF device to characterize and optimize the UE mobility. The AMF device determines and updates the mobility pattern of the UE based on subscription of the UE, statistics of the UE mobility, a network local policy, and UE assisted information, or any combination thereof. The statistics of the UE mobility may be a historical or expected UE moving trajectory.

The UE mobility pattern may be used by the AMF device to optimize a mobility support provided to the UE, for example, a registration area allocation.

<UE Reachability in CM-IDLE State in 3GPP Access>

The reachability management functions to determine whether the UE is reachable and provide a UE location (i.e., access node) for the network to reach the UE. This functionality may be performed by paging UE and UE location tracking. The UE location tracking includes both UE registration area tracking (i.e., UE registration area update) and UE reachability tracking (i.e., UE periodic registration area update). Such functionalities may be either located at the 5GC (in case of a CM-IDLE state) or the NG-RAN (in case of a CM-CONNECTED state).

The UE and the AMF device negotiate UE reachability characteristics for the CM-IDLE state during registration and registration update procedures.

Two UE reachability categories are negotiated between the UE and the AMF device for the CM-IDLE state:

i) UE reachability allowing mobile terminated data while the UE is in the CM-IDLE state: ① The UE location may be known by the network on a tracking area list granularity. ② Paging procedures may apply to this category. ③ Mobile originating and mobile terminated data may apply to this category for both the CM-CONNECTED state and the CM-IDLE state.

ii) Mobile initiated connection only (MICO) mode: ① Mobile originated data may apply to this category for both the CM-CONNECTED state and the CM-IDLE state. ② Mobile terminated data may be supported when the UE is in the CM-CONNECTED state.

Whenever the UE in the RM-REGISTERED state enters the CM-IDLE state, a periodic registration timer starts according to a periodic registration timer value received from the AMF device during the registration procedure.

The AMF device allocates the periodic registration timer value to the UE based on local policies, subscription information, and information provided from the UE. After expiry of the periodic registration timer, the UE may perform a periodic registration. If the UE moves out of network coverage in response to the expiry of the periodic registration timer, the UE may perform the registration update when the UE returns to the coverage.

The AMF device runs a mobile reachable timer for the UE. The mobile reachable timer starts with a value greater than that of the periodic registration timer of the UE whenever a CM state for the UE in the RM-REGISTERED state changes to the CM-IDLE state. If the AMF device receives an elapsed time from a RAN when the RAN initiate a UE context release indicating that the UE is unreachable, the AMF device may need to deduce a mobile reachable timer value based on the elapsed time received from the RAN and a normal mobile reachable timer value. The AMF device may stop the mobile reachable timer, if the UE CM state of the AMF device changes to the CM-CONNECTED state. If the mobile reachable timer expires, the AMF device determines that the UE is not reachable.

However, since the AMF device is unaware of a period of time in which the UE remains not reachable, the AMF device may not immediately deregister the UE. Instead, after the expiry of the mobile reachable timer, the AMF device may clear a PPF flag and may start an implicit deregistration timer with a relatively great value. The AMF device may stop the implicit deregistration timer and set the PPF flag if the UE CM state of the AMF device changes to the CM-CONNECTED state.

If the PPF flag is not set, the AMF device may not page the UE and may reject any request for delivering DL signaling or data to the UE.

If the implicit deregistration timer expires before the UE contacts the network, the AMF device may implicitly deregister the UE.

As a part of deregistration for a particular access (the 3GPP access or the non-3GPP access), the AMF device may request an SMF device related to the UE to release a PDU sessions established on the corresponding access.

<UE Reachability in CM-IDL State in 3GPP Access: UE Reachability Allowing Mobile Terminated while UE is in CM-IDLE State>

The AMF device may consider the UE in an RM-REGISTERED state to be reachable by CN paging if a UE CM state of the AMF device is a CM-IDLE state unless the UE applies a MICO mode.

<Paging Strategy Handling in 3GPP Access>

Based on an operator configuration, the 5GS supports the AMF device and the NG-RAN to apply different paging strategies for different types of traffic.

In the case of the UE in a CM-IDLE state, the AMF device performs paging and determines the paging strategy based on, for example, a local configuration that causes an NF to trigger the paging and information available in the request that triggers the paging.

In the case of the UE in a CM-CONNECTED state with an RRC inactive state, the NG-RAN performs paging and determines the paging strategy based on, for example, a local configuration and information received from the AMF device and the SMF device.

In the case of a network triggered service request from the SMF device, the SMF device determines 5QI and ARP based on downlink data or a notification of downlink data received from a UPF device. The SMF device includes 5QI and ARP corresponding to a received downlink PDU in the request that is sent to the AMF device. If the UE is in the CM IDLE state, the AMF device may use, for example, the 5QI and ARP to derive different paging strategies.

<Paging Policy Differentiation in 3GPP Access>

Paging policy differentiation (PPD) refers to an optional feature that allows the AMF device, based on an operator configuration, to apply different paging strategies for different traffic or service types provided within the same PDU session. This feature may apply only to a PDU session of an IP type.

When the 5GS supports the paging policy differentiation (PPD) feature, a DSCP value (TOS in IPv4/TC in IPv6) may be set by an application to inform the 5GS of a paging policy that needs to be applied for a specific IP packet.

The operator may configure the SMF device in such a way that the PPD feature only applies to specific HPLMNs, DNNs, and 5QIs. In the case of HR roaming, this configuration may be performed by the SMF device in a VPLMN.

In the case of the network triggered service request and a UPF buffering downlink data packet, the UPF device may include the DSCP in a TOS (IPv4)/TC (IPv6) value from an IP header of the downlink data packet and an indication of a corresponding QoS flow in a data notification message sent to the SMF device.

When the PPD applies, the SMF device determines a paging policy indicator (PPI) based on information received from the UPF device. In the case of the network triggered service request and a SMF buffering downlink data packet, when the PPD applies, the SMF device determines the PPI based on the DSCP in a TOS (IPv4)/TC (IPv6) value from an IP header of the received downlink data packet and an indication of the corresponding QoS flow. The SMF device includes the PPI, the ARP and the 5QI in an N11 message sent to the AMF device. If the UE is in the CM IDLE state, the AMF device uses this information to derive a paging strategy and sends paging messages to the NG-RAN over N2. The paging messages sent to NG-RAN may include the PPI.

The SMF device configures the UPF device to put in different QoS flow traffic with different paging differentiation requirements and may indicate over N2 to the NG-RAN the paging policy indicator (PPI) for a QoS flow (QFI) of a PDU session. For the UE in the RRC inactive state, the NG-RAN may, based on 5QI, ARP and this PPI associated with the QFI of an incoming DL PDU enforce specific paging policies applied in case of NG-RAN paging.

<Paging Priority in 3GPP Access>

The paging priority is a feature that allows the AMF device to include an indication in a paging message sent to the NG-RAN that the UE may be paged with priority. The AMF device determines whether to include the paging priority in the paging message based on an ARP value in the message received from the SMF device for an IP packet waiting to be delivered in the UPF device. If the ARP value is associated with select priority services (e.g., MPS, MCS), the AMF device includes the paging priority in the paging message. When the NG-RAN receives the paging message with the paging priority, the NG-RAN handles the page with priority.

While waiting for the UE to respond to paging sent without priority, the AMF device receives another message from the SMF device with an ARP associated with select priority services (e.g., MPS, MCS) and the AMF device sends another paging message to the (R)AN including the paging priority.

For the UE in the RRC inactive state, the NG-RAN determines the paging priority based on the ARP associated with the QoS flow as provisioned by the operator policy and the core network assisted RAN paging information from the AMF device.

<Registration Management in Non-3GPP Access>

The UE may enter a RM-DEREGISTERED state and the AMF device may enter the RM-DEREGISTERED state for the UE over the non-3GPP access as follows:

i) at the UE and at the AMF device, after performing an explicit deregistration procedure; ii) at the AMF device, after the network non-3GPP implicit deregistration timer expires; or iii) at the UE, after the UE non-3GPP deregistration timer expires.

Whenever the UE registered over the non-3GPP access enters a CM-IDLE state for the non-3GPP access, the UE starts the UE non-3GPP deregistration timer according to a value received from the AMF device during a registration procedure.

Over the non-3GPP access, the AMF device runs the network non-3GPP implicit deregistration timer. The network non-3GPP implicit deregistration timer is initiated with a value greater than the non-3GPP deregistration timer of the UE, whenever the CM state for the UE registered over the non-3GPP access changes to the CM-IDLE state for the non-3GPP access.

For the UE that is registered over the non-3GPP access, a change of a point of attachment (e.g., a change of a WLAN AP) may not lead the UE to perform a registration update procedure.

The UE may not provide 3GPP-specific parameters (e.g., indication of a preference for a MICO mode) during registration over the non-3GPP access.

<Connection Management in Non-3GPP Access>

A UE that successfully establishes an NWu connection over an untrusted non-3GPP access transitions to a CM-CONNECTED state for the untrusted non-3GPP access.

In the case of the untrusted non-3GPP access to the 5GC, NWu signaling is released either as a result of an explicit deregistration procedure or an AN release procedure. In addition, the N3IWF may explicitly release the NWu signaling connection due to an NWu connection failure. The release of the NWu signaling connection between the UE and the N3IWF may be interpreted as follows:

i) By the N3IWF as a criterion to release an N2 connection.

ii) By the UE as a criterion for the UE to transition to a CM-IDLE state. The UE registered over the non-3GPP access remains in an RM-REGISTERED state, unless the NWu connection release occurs as part of a deregistration procedure over the non-3GPP access in which case the UE enters a RM-DEREGISTERED state. When the UE in the RM-REGISTERED state transitions to the CM-IDLE state, the UE non-3GPP deregistration timer starts running in the UE. The UE non-3GPP deregistration timer stops when the UE moves to the CM-CONNECTED state or to the RM-DEREGISTERED state.

In the case of the untrusted non-3GPP access, when the AMF device releases an N2 interface, the N3IWF may release all the resources associated with the UE including the NWu connection with the UE. The release of the N2 connection by the AMF device may set the CM state for the UE in the AMF device to be the CM-IDLE state.

The UE may not be paged on the untrusted non-3GPP access.

When the UE registered simultaneously over the 3GPP access and the non-3GPP access moves all the PDU sessions to one of the accesses, whether the UE initiates a deregistration procedure in an access that has no PDU sessions is up to the UE implementation.

Release of PDU sessions over the non-3GPP access does not indicate the release of the N2 connection.

When the UE has PDU sessions routed over the non-3GPP access and the UE enters the CM-IDLE state for the non-3GPP access, these PDU sessions are not released to enable the UE to move the PDU sessions over the 3GPP access based on UE policies. The core network maintains the PDU sessions but deactivates an N3 user plane connection for such PDU sessions.

<UE Reachability in CM-IDLE State in Non-3GPP Access>

The UE may not be paged over the untrusted non-3GPP access.

If states of the UE in the AMF device correspond to a CM-IDLE state and an RM-REGISTERED state for the non-3GPP access, there may be PDU sessions that are last routed over the non-3GPP access and without user plane resources. If the AMF device receives a data notification with a non-3GPP access type indication from the SMF device for a PDU session corresponding to the UE that is in the CM-IDLE state for the non-3GPP access, and the UE is registered over the 3GPP access in the same PLMN as one registered over the non-3GPP access, a network triggered service request may be performed over the 3GPP access independently of whether the UE is in the CM-IDLE state or a CM-CONNECTED state over the 3GPP access. In this case, the AMF device provides an indication that the procedure relates to pending downlink data for the non-3GPP access. If the UE is in the CM-IDLE state over the 3GPP access, the AMF device does not include a PDU session ID of a specific PDU session for which access type is set to the non-3GPP access.

<UE Reachability in CM-CONNECTED in Non-3GPP Access>

For the UE in a CM-CONNECTED state, i) the AMF device is aware of a UE location on a N3IWF node granularity, and ii) the N3IWF releases an N2 connection when the UE becomes unreachable from an N3IWF point of view, i.e., in response to NWu release.

<Session Management>

A 5G core network supports a PDU connectivity service. The PDU connectivity service is supported through PDU sessions that are established in response to a request from the UE.

Subscription information may include a plurality of data network names (DNNs) and a default DNN. The UE is assigned to the default DNN if a valid DNN is not provided in a PDU session establishment request sent to the 5G core network.

Each PDU session supports a single PDU session type. That is, each PDU session supports exchange of a single type of a PDU session requested by the UE at the establishment of the PDU session.

The PDU session may be established in response to a request from the UE, modified response to a request from the UE and the 5GC, and released in response to a request from the UE and the 5GC using NAS SM signaling exchanged over N1 between the UE and the SMF device. In response to a request from an application server, the 5GC may trigger a specific application in the UE. In response to receiving that trigger message, the UE may transfer the received message to an application identified in the UE. The identified application may establish a PDU session with respect to a specific DNN.

The SMF device may support a PDU session for a LADN in which an access to a data network is available in a specific LADN service area.

The SMF device may verify whether a UE request is compliant with a user subscription. For this purpose, the SMF device may retrieve and request update notifications on SMF device level subscription data from a UDM. Such data may indicate the following per DNN and, if applicable, per single network slice selection assistance information (S-NSSAI) i) allowed PDU session types and a default PDU session type; ii) allowed SSC modes and a default SSC mode; iii) QoS information, such as subscribed session-AMBR, default 5QI and default allocation and retention priority (ARP); and iv) a static IP address/prefix.

The UE that is registered over multiple accesses selects an access used to establish a corresponding PDU session. An HPLMN may send a policy to the UE to guide the UE selection of the access over which to establish the corresponding PDU session.

The UE may request to move a PDU session between the 3GPP access and the non-3GPP access. A determination to move the PDU session between the 3GPP access and the non-3GPP access is made based on a PDU session unit. That is, the UE may have some PDU sessions using the 3GPP access at a given time, while other PDU sessions are using the non-3GPP access.

In a PDU session establishment request sent to the network, the UE may provide a PDU session identifier (ID). The PDU session ID is unique per UE and is used to uniquely identify a single PDU session from among PDU sessions of the UE. The PDU session ID may be stored in the UDM to support a handover between the 3GPP access and the non-3GPP access. The UE may also provide i) a PDU session type; ii) S-NSSAI; iii) a DNN; and iv) an SSC mode.

The UE may establish a plurality of PDU sessions in the same data network or different data networks, through 3GPP and non-3GPP access networks at the same time.

The UE may establish the plurality of PDU sessions in the same data network and may be served by a different UPF device that terminates N6.

The UE with the established plurality of PDU sessions may be served by a different SMF device.

The SMF device may be registered and deregistered based on a unit of a PDU session granularity in the UDM.

User plane paths of different PDU sessions (to the same or to different DNNs) belonging to the same UE may be completely disjointed between the AN and the UPF device interfacing with the DN.

<Session Management: Interaction Between AMF Device and SMF Device>

The AMF device and the SMF device are separate network functions.

N1 related interaction with the SMF device is as follows:

i) A single N1 termination point is located in the AMF device. The AMF device forwards SM related NAS information to the SMF device based on a PDU session ID of a NAS message. Also, SM NAS exchanges (e.g., SM NAS message responses) for N1 NAS signaling received by the AMF device over an access (e.g., the 3GPP access or the non-3GPP access) are transported over the same access. ii) A serving PLMN ensures that subsequent SM NAS exchanges (e.g., SM NAS message responses) for N1 NAS signaling received by the AMF device over an access (e.g., the 3GPP access or the non-3GPP access) are transported over the same access. iii) The SMF device handles a session management part of NAS signaling exchanged with the UE. iv) The UE may initiate a PDU session establishment in an RM-REGISTERED state. v) In response to the SMF device being selected to serve a specific PDU session, the AMF device needs to ensure that all NAS signaling related within the specific PDU session is handled by the same SMF device instance. vi) In response to a successful PDU session establishment, the AMF device and the SMF device store an access type with which the PDU session is associated.

N11 related interaction with the SMF device is as follows:
i) The AMF device reports a reachability of the UE based on a subscription from the SMF device, including UE location information with respect to an area of interest indicated by the SMF device. ii) The SMF device indicates to the AMF device when a PDU session is released; iii) In response to a successful PDU session establishment, the AMF device stores an identifier of a serving SMF device of the UE and the SMF device stores an identifier of a serving AMF device of the UE including an AMF device set. When attempting to reach the AMF device serving the UE, the SMF device may need to apply a behavior described in "the other CP NFs."

N2 related interaction with the SMF device is as follows:
i) Some N2 signaling (e.g., handover related signaling) may require an action of the AMF device and the SMF device. In this case, the AMF device needs to ensure coordination between the AMF device and the SMF device. The AMF device may forward SM N2 signaling towards the corresponding SMF device based on the PDU session ID in N2 signaling. ii) The SMF device may provide the PDU session type and the PDU session ID to NG-RAN to facilitate the NG-RAN to apply a suitable header compression mechanism to a packet of a different PDU type.

N3 related interaction with the SMF device is as follows:
i) Selective activation and deactivation of UP connection of an existing PDU session is defined.

N4 related interaction with the SMF device is as follows:
i) When the UPF device is aware of arrival of some DL data for the UE without downlink N3 tunnel information, the SMF device interacts with the AMF device to initiate Network triggered service request procedure. In this case, if the SMF device is aware that the UE is unreachable or if the UE is reachable only for a regulatory prioritized service and the PDU session is not for the regulatory prioritized service, the SMF device does not inform DL data notification to the AMF device.

The AMF device may select the SMF device per procedure. For this purpose, the AMF device may acquire subscription data from the UDM. Also, the AMF device may retrieve the subscribed UE-AMBR from the UDM and may send the retrieved UE-AMBR to the (R)AN.

The interaction between the AMF device and the SMF device to support the LADN is defined as follows:

To support charging data collection and to fulfill regulatory requirements (to provide network provided location information (NPLI)) related with set-up, modification, and release of IMS voice calls or with SMS device transfer, the following applies:
i) At the time of PDU session establishment, the AMF device provides the SMF device with a PEI of the UE if the PEI is available at the AMF device; Alternatively, ii) when forwarding UL NAS or N2 signaling to a peer NF (e.g., to the SMF device or SMSF) or during UP connection activation of a PDU session, the AMF device provides user location information received from the 5G-AN, an access type (3GPP or non-3GPP) of the AN over which the UL NAS or N2 signaling is received, and a corresponding UE time zone.

The User Location information, the access type, and the UE time zone may be further provided from the SMF device to the PCF. The PCF may acquire information from the SMF device to provide NPLI to an application (e.g., IMS) that requests the information.

The user location information may correspond to the following:
i) In the case of NG-RAN: Cell-Id. ii) In the case of N3IWF: UE local IP address (used to reach the N3IWF) and optionally UDP or TCP source port number (if NAT is detected).

<Single PDU Session with Plurality of PDU Session Anchors>

To support selective traffic routing to the DN or SSC mode 3, the SMF device may control a data path of a PDU session so that the PDU session may simultaneously correspond to a plurality of N6 interfaces. The UPF device may terminate the plurality of N6 interfaces to support PDU session anchor functionality. Each PDU session anchor supporting a PDU session provides a different access to the same DN. Also, the PDU session anchor assigned at the establishment of the PDU session is associated with an SSC mode of the PDU session. Additional PDU session anchors assigned within the same PDU session, for example, for selective traffic routing to the DN, are independent of the SSC mode of the PDU session.

Selective traffic routing to the DN supports, for example, deployments in which some selected traffic is forwarded on an N6 interface to the DN that is close to an access network serving the UE.

Figure 6:
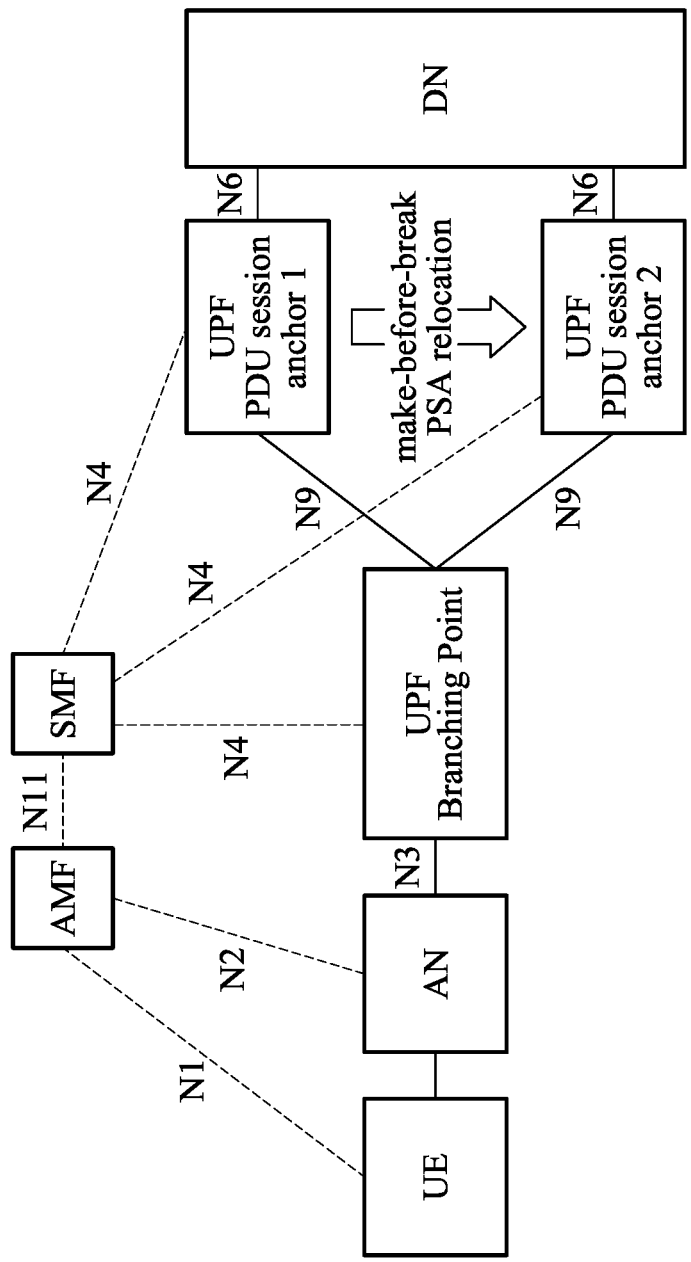
FIG. 6 illustrates an example of a multi-homed PDU session used to support a service continuity according to an example embodiment.
Figure 7:
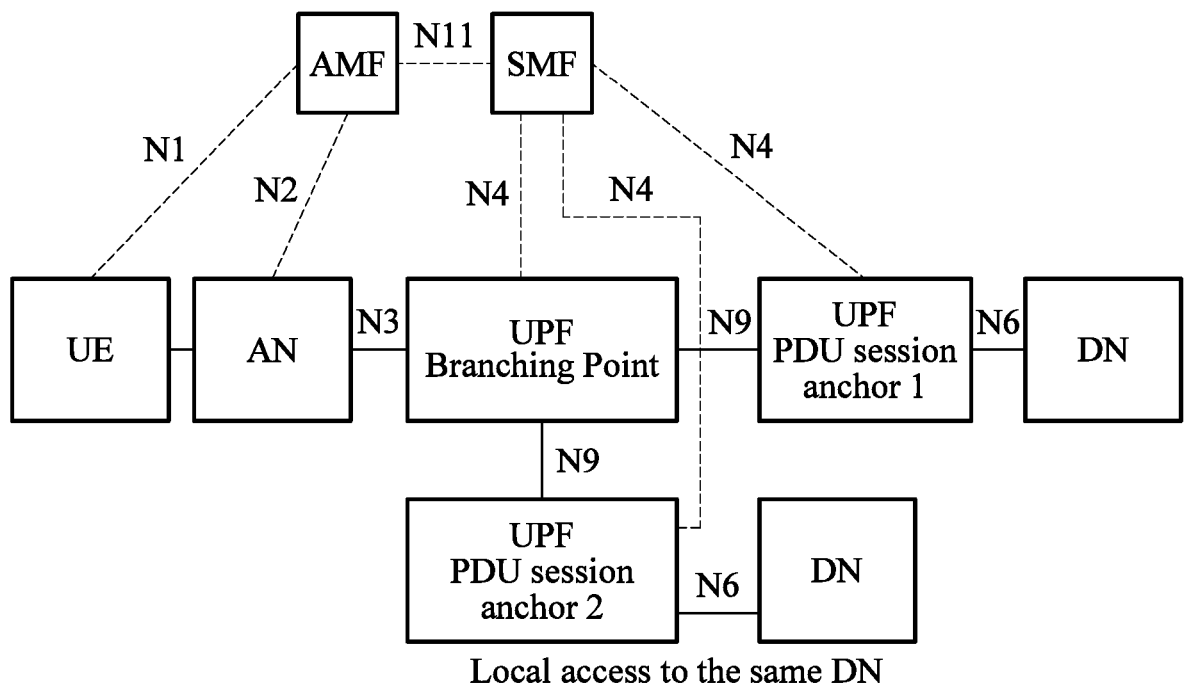
FIG. 7 illustrates an example of a multi-homed PDU session used to support a local access to the same data network according to an example embodiment.

The following two schemes may be used for processing the PDU session:
(1) usage of a UL classifier functionality for a PDU session as shown in FIG. 5; and
(2) usage of an IPv6 multi-homing for a PDU session as shown in FIGS. 6 and 7.

<Usage of UP Classifier for PDU Session>

Figure 5:
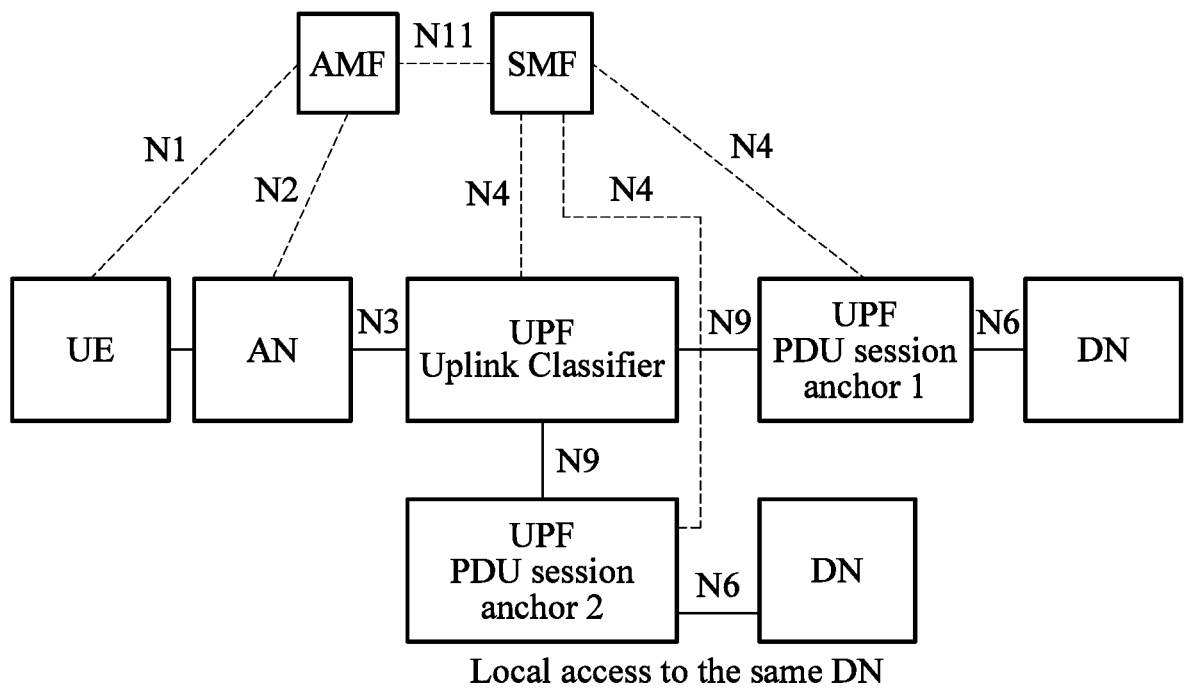
FIG. 5 illustrates an example of a user plane (UP) architecture of an uplink classifier according to an example embodiment.

FIG. 5 illustrates an example of a user plane (UP) architecture of an uplink classifier according to an example embodiment.

Referring to FIG. 5, in PDU sessions of IPv4, IPv6, or Ethernet, an SMF device may insert a uplink classifier (UL CL) in a data path of a PDU session. Inserting the UL CL indicates inserting a UPF device corresponding to the UL CL in a data path from a UE to a data network (DN) in a 5G core network. The SMF device may determine to insert a UPF device supporting a UL CL functionality in a data path of the PDU session during or after PDU session establishment, or to remove the UPF device supporting the UL CL functionality from the data path of the PDU session after the PDU session establishment. The SMF device may include at least one UPF device supporting the UL CL functionality in the data path of the PDU session. The UL CL is a functionality supported by the UPF that aims at diverting (locally) some traffic matching traffic filters provided from the SMF device. Insertion and removal of the UL CL is determined or controlled by the SMF device using generic N4 and UPF capabilities. The SMF device includes at least one UPF device supporting the UL CL functionality in the data path of the PDU session.

The UE is unaware of traffic diversion by the UL CL. The UE does not involve in both the insertion and the removal of the UL CL. In a PDU session of IPv4 or IPv6 type, the UE associates the PDU session with either a single IPv4 address or a single IPv6 prefix allocated by the network.

When the UL CL functionality is inserted in the data path of the PDU session, there are a plurality of PDU session anchors for the PDU session. Each of the PDU session anchors provides a different access to the same DN. In the PDU session of the IPv4 or IPv6 type, only a single PDU session anchor is an IP anchor point for the IPv4 address/IPv6 prefix of the PDU session provided to the UE.

The UL CL provides forwarding of UL traffic towards different PDU session anchors. The UL CL merges DL traffic towards the UE. Here, traffic from different PDU session anchors is merged on a link towards the UE. Merging of traffic is based on traffic detection and traffic forwarding rules provided from the SMF device.

The UL CL applies a filtering rule and determines how a packet needs to be routed. The filtering rule refers to examining a destination IP address/prefix of UL IP packets sent by the UE. The UPF device supporting the UL CL may be controlled by the SMF device to support traffic measurement for charging, traffic replication for LI, and bit rate enforcement per PDU session AMBR.

The UPF device supporting the UL CL may also support a PDU session anchor for connectivity to a local access to the DN (including, for example, support of tunneling or NAT on N6). It may be controlled by the SMF device.

Additional UL CLs (and additional PDU session anchors) may be inserted in the data path of the PDU session to create a new data path for the same PDU session. A method of organizing data paths of all UL CLs in the PDU session depends on an operator configuration and an SMF device logic. Only a single UPF device supports the UL CL connecting to the (R)AN through an N3 interface.

The insertion of the UL CL in the data path of the PDU session is shown in FIG. 5.

According to an example embodiment, if the UE in an IDLE state moves to a new registration area, the UE may connect to a network temporarily for registration to a new network in response to a change in a registration area. Here, active traffic may be absent. During registration to the new network, the AMF device and the SMF device may manage a location of the UE and the SMF device may determine control of a UPF device, such as intermediate UPF (I-UPF) insertion, removal, and relocation. Based on the determination, an operation, such as I-UPF insertion, removal, and relocation may be performed in a session idle state. That is, during registration to the new network in the session idle state, the UPF device may be controlled and thus, potential interruption may be reduced when providing an actual service.

According to an example embodiment, in the case of performing I-UPF control, such as I-UPF insertion, removal, and relocation, in a session idle state, control of the UPF device may be performed and interface between a base station and the UPF device may not be updated. Accordingly, signaling load between a RAN and a core network may be reduced by not updating in the session idle state.

According to an example embodiment, relocation of a PDU session anchor (PSA) that is a UPF device serving as an anchor gateway of a corresponding PDU session based on a session may be performed to not fix a 5G network and manage a flexible data path. Also, to support a network in which the base station and the PSA are not directly connected, at least one I-UPF device may be inserted between the base station and the PSA.

<Usage of IPv6 Multi-Homing for PDU Session>

FIG. 6 illustrates an example of a multi-homed PDU session used to support a service continuity according to an example embodiment, and FIG. 7 illustrates an example of a multi-homed PDU session used to support a local access to the same data network according to an example embodiment.

A PDU session may be associated with a plurality of IPv6 prefixes. It is referred to as a multi-homed PDU session. The multi-homed PDU session provides an access to a data network through one or more PDU session anchors. Different user plane paths that lead to different PDU session anchors branch out at a common UPF referred to as a UPF device supporting "branching point functionality." The branching point forwards UP traffic towards the different PDU session anchors and merges traffic from the different PDU session anchors on a link towards the UE.

The UPF device supporting the branching point functionality may be controlled by the SMF device to support traffic measurement for charging, traffic replication for LI, and bit rate enforcement per PDU session AMBR. Insertion and removal of the UPF device supporting the branching point is determined or controlled by the SMF device using generic N4 and UPF capabilities. The SMF device may determine to insert, in a data path of the PDU session, a UPF device supporting the branching point functionality during or after a PDU session establishment. The SMF device may determine to remove, from the data path of the PDU session, the UPF device supporting the branching point functionality after the PDU session establishment.

Multi-homing of the PDU session may apply for PDU sessions of IPv6 type. A request of PDU session type "IP" or "IPv6" indicates support of a multi-homed PDU session for IPv6 in the UE.

The use of the plurality of IPv6 prefixes in the PDU session may have the following characteristics.

The UPF device supporting the branching point functionality is configured by the SMF device to spread UL traffic between IP anchors based on a source prefix of a PDU. Here, the source prefix of the PDU may be selected by the UE based on routing information and preferences received from the network.

Internet Engineering Task Force (IETF) request for Comments (RFC) 4191 is used to configure routing information and preferences in the UE to influence a selection of the source prefix. It corresponds to scenario 1 defined in IETF RFC "IPv6 multi-homing without network address translation." Accordingly, the branching point unaware of routing tables in the data network may be created and a first hop router function in the IP anchors may be maintained.

According to an example embodiment, if a UE in an IDLE state moves to a new registration area, the UE may connect to a network temporarily for registration to a new network in response to a change in a registration area. Here, active traffic may be absent. During registration to the new network, the AMF device and the SMF device may manage a location of the UE and the SMF device may determine control of a UPF device, such as I-UPF insertion, removal, and relocation. Based on the determination, an operation, such as I-UPF insertion, removal, and relocation may be performed in a session idle state. That is, during registration to the new network in the session idle state, the UPF device may be controlled and thus, potential interruption may be reduced when providing an actual service.

According to an example embodiment, in the case of performing I-UPF control, such as I-UPF insertion, removal, and relocation, in a session idle state, control of the UPF device may be performed and interface between a base station and the UPF device may not be updated. Accordingly, signaling load between a RAN and a core network may be reduced by not updating in the session idle state.

According to an example embodiment, relocation of a PDU session anchor (PSA) that is a UPF device serving as an anchor gateway of a corresponding PDU session based on a session may be performed to not fix the 5G network and manage a flexible data path. Also, to support a network in which the base station and the PSA are not directly connected, at least one I-UPF device may be inserted between the base station and the PSA.

<Selective Activation and Deactivation of UP Connection of Existing PDU Session>

This applies to a case in which the UE establishes a plurality of PDU sessions. An activation of a UP connection of an existing PDU session may cause an activation of its UE-CN user plane connection (i.e., a data radio bearer and an N3 tunnel).

For the UE in a CM-IDLE state in the 3GPP access, either the UE or network triggered service request procedure may support an independent activation of UP connection of existing PDU sessions. For the UE in the CM-IDLE state in the non-3GPP access, the UE triggered service request procedure may allow a re-activation of UP connection of existing PDU sessions and may support the independent activation of UP connection of existing PDU sessions.

The UE in a CM-CONNECTED state may invoke a service request procedure to request the independent activation of the UP connection of existing PDU sessions.

Network triggered re-activation of UP connection of existing PDU sessions is handled as follows:

i) If the UE CM state in the AMF device is already CM-CONNECTED on an access (e.g., the 3GPP access, the non-3GPP access) associated with a PDU session in the SMF device, the network may re-activate the UP connection of the PDU session using the network triggered service request procedure.

Otherwise:

ii) If the UE is registered in both the 3GPP access and the non-3GPP accesses and the UE CM state in the AMF device is CM-IDLE in the non-3GPP access, the UE may be paged or notified through the 3GPP access for the PDU session associated with the 3GPP access or with the non-3GPP access in the SMF device: ① If the UE CM state in the AMF device is CM-IDLE in the 3GPP access, a paging message may include an access type associated with the PDU session in the SMF device. In response to receiving the paging message including the access type, the UE may reply to the 5GC over the 3GPP access using a NAS service request message, which may include a list of PDU sessions associated with the received access type and of which UP connections may be re-activated over the 3GPP access (i.e., the list of PDU session does not include the PDU sessions of which UP connections may not be re-activated on the 3GPP access based on UE policies). If a PDU session for which the UE is paged is included in the list of PDU sessions provided in the NAS service request, the 5GC may re-activate a PDU session UP connection over the 3GPP access. ② If the UE CM state in the AMF device is CM-CONNECTED in the 3GPP access, a notification message may include a PDU session ID. In response to receiving the notification message, the UE may reply to the 5GC over the 3GPP access using the NAS service request message, which may include an indication on whether the PDU session UP connection may be re-activated over the 3GPP access.

ii) If the UE is registered in both the 3GPP access and the non-3GPP access served by the same AMF device and the UE CM state in the AMF device is CM-IDLE in the 3GPP access and is CM-CONNECTED in the non 3GPP access, the UE may be notified through the non-3GPP access for a PDU session associated in the SMF device (i.e., last routed) with the 3GPP access. The notification message includes the PDU session ID. In response to receiving the notification message, the UE may reply to the 5GC over the 3GPP access using the NAS service request message when the 3GPP access is available.

A deactivation of UP connection of an existing PDU session causes the corresponding data radio bearer and N3 tunnel to be deactivated. The UP connection of different PDU sessions may be deactivated independently when the UE is in the CM-CONNECTED state in the 3GPP access or the non-3GPP access.

<Session and Service Continuity (SSC)>

Support for session and service continuity (SSC) in the 5G system architecture may address various continuity requirements of different applications and services for the UE. The 5G system supports different SSC modes. An SSC mode associated with the PDU session does not change during the lifetime of the PDU session.

i) In SSC mode 1, the network preserves a continuity service provided to the UE. In the PDU session of IPv4 or IPv6 type, an IP address may be preserved. ii) In SSC mode 2, the network may release the connectivity service delivered to the UE and may release the PDU session corresponding to the connectivity service. In the IPv4 or IPv6 type, the network may release IP addresses allocated to the UE. iii) In SSC mode 3, a change to the user plane may be visible to the UE, while the network ensures that no loss of connectivity occurs in the UE. A connection through a new PDU session anchor point may be established before a previous connection is terminated for a better service connectivity. In the IPv4 or IPv6 type, the IP address may not be preserved in the SSC mode 3 when the PDU session anchor changes.

An addition process or a removal process of a PDU session anchor in a PDU session for local access to a DN may be independent from an SSC mode of the PDU session.

<SSC Mode>

(1) SSC Mode 1

With respect to a PDU session of SSC mode 1, the UPF device acting as the PDU session anchor at establishment of the PDU session may be maintained regardless of access technology (e.g., access type and cells) for the UE to a successful network access.

In the PDU session of the IPv4 or IPv6 type, IP continuity may be supported regardless of a UE mobility event.

Here, when IPv6 multi-homing or a UL CL applies to the PDU session of SSC mode 1 and the network allocates additional PDU session anchors to the PDU session, the additional PDU session anchors may be released or allocated. The UE does not expect that an additional IPv6 prefix is maintained during the lifetime of the PDU session. SSC mode 1 may apply to any PDU session type or any access type.

(2) SSC Mode 2

If a PDU session of SSC mode 2 has a single PDU session anchor, the network may trigger release of the PDU session and may instruct the UE to establish a new PDU session in the same DN immediately. A trigger condition depends on an operator policy, for example, a request from an application function based on a load status. At establishment of the new PDU session, a new UPF device acting as the PDU session anchor may be selected.

On the contrary, if the PDU session of SSC mode 2 has the plurality of PDU session anchors (e.g., in the case of a multi-homed PDU session or if a UL CL applies to the PDU session of SSC mode 2), additional PDU session anchors may be released or allocated.

SSC mode 2 may apply to any PDU session type and any access type. In a UL CL mode, the UE may not be involved in PDU session anchor reallocation so that existence of the plurality of PDU session anchors is not visible to the UE.

(3) SSC Mode 3

With respect to a PDU session of SSC mode 3, the network allows establishment of UE connectivity through a new PDU session anchor in the same data network (DN) before connectivity between the UE and a previous PDU session anchor is released. If the trigger condition applies, the network may determine whether to select a PDU session anchor UPF suitable for the new condition of the UE (e.g., a point of attachment to the network).

SSC mode 3 may apply to any PDU session type or any access type.

With respect to a PDU session of IPv4 or IPv6 type, during a change procedure of the PDU session anchor, the following applies:

i) A new IP prefix anchored on the new PDU session anchor may be allocated within the same PDU session based on IPv6 multi-homing. ii) Alternatively, a new IP address or the new IP prefix may be allocated within the new PDU session that the UE is triggered to establish.

After the new IP address or the new IP prefix is allocated, an old IP address or an old IP prefix is maintained during a specific time indicated to the UE and then released.

If the PDU session of SSC mode 3 has the plurality of PDU session anchors (e.g., in the case of multi-homed PDU sessions, or if a UL CL applies to the PDU session of SSC mode 3, the additional PDU session anchors may be released or allocated.

<SSC Mode Selection>

An SSC mode selection policy is used to i) determine a type of a session or ii) determine a type of an SSC mode associated with an application or a group of applications for the UE.

An operator may provide the SSC mode selection policy to the UE. The SSC mode selection policy includes one or more SSC mode selection policy rules that may be used by the UE to determine the type of the SSC mode associated with the application or the group of applications. The SSC mode selection policy may include a default SSC mode selection policy rule that matches all applications of the UE.

When an application requests a data transmission (e.g., opens a network socket) and, here, the application does not specify a required SSC mode, the UE may select the SSC mode associated with the application based on the SSC mode selection policy. In addition, the following behaviors apply to the UE and the network:

a) If the UE already has an established PDU session that matches the SSC mode associated with the application, the UE may route data of the application within the established PDU session unless the UE permits the use of the established PDU session. On the contrary, if the UE does not have the established PDU session that matches the SSC mode associated with the application, the UE may request establishment of a new PDU session that matches the SSC mode associated with the application.

b) The SSC mode associated with the application is either an SSC mode included in a non-default SSC mode selection policy rule that matches the application or an SSC mode included in a default SSC mode selection policy rule, if present. If the SSC mode selection policy does not include the default mode selection policy rule and no other SSC mode selection policy rules match the application, the UE may request the PDU session without providing the SSC mode. In this case, the network may determine the SSC mode of the PDU session.

The SSC mode selection policy rule provided to the UE may be updated by the operator.

The SMF device may receive a list of SSC modes and a default SSC mode per DNN per S-NSSAI as a portion of subscription information from a unified data management (UDM) device.

If the UE provides an SSC mode when requesting a new PDU session, the SMF device may select the SSC mode by accepting the requested SSC mode or by modifying the requested SSC mode based on subscription and/or local configuration.

If the UE does not provide the SSC mode when requesting the new PDU session, the SMF device may select the default SSC mode for a data network listed in the subscription or may apply the local configuration to select the SSC mode.

When a static IP address/IP prefix is allocated to the PDU session, SSC mode 1 may be allocated to the PDU session based on static IP address/IP prefix subscription for the DNN and single network slice selection assistance information (S-NSSAI).

<Description of Network Functions: AMF Device>

The AMF device may perform the following functionalities. A portion or all of the functionalities of the AMF device may be supported in a single instance of the AMF device:

1) Termination of a RAN CP interface (N2); 2) termination of NAS (N1), NAS ciphering and integrity protection; 3) registration management; 4) connection management; 5) reachability management; 6) mobility management; 7) lawful intercept (for AMF device events and an interface to LI system); 8) sending of SM messages between the UE and the SMF device; 9) transparent proxy for routing SM messages; 10) access authentication; 11) access authorization; 12) sending of SMS messages between the UE and SMS function (SMSF); 13) security anchor functionality (SEAF) that interacts with the AUSF and the UE, receives an intermediate key established as a result of a UE authentication process, and enables the AMF device to retrieve a security material from the AUSF in the case of a USIM-based authentication; 14) security context management (SCM) that receives, from the SEAF, a key used to derive an access-network specific key; 15) location service management for regulatory services; 16) sending of location service messages between the UE and the LMF as well as between the RAN and the LMF; and 17) evolved packet system (EPS) bearer ID allocation for interworking with EPS.

Regardless of a number of network functions, a single NAS interface instance is present per access network between the UE and the CN and is terminated at one of the network functions that implement at least NAS security and mobility management.

In addition to the aforementioned functionalities of the AMF device, the AMF device may include the following functionalities to support a non-3GPP access network:

i) Support of an N2 interface with N3IWF: Through this interface, a portion of information (e.g., 3GPP cell identification) and procedures (e.g., a handover related procedure) defined over the 3GPP access may not be applied and non-3GPP access specific information that does not apply to the 3GPP access may be applied. ii) Support of NAS signaling with the UE over N3IWF: A portion of procedures supported by NAS signaling over the 3GPP access may not be applied to an untrusted non-3GPP (e.g., paging) access. iii) Support of authentication of UEs connected over N3IWF. iv) Management of mobility, authentication, and a separate security context state of the UE connected over the 3GPP access and or simultaneously connected over 3GPP access and the non-3GPP access. v) Support of a coordinated RM management context over the 3GPP access and the non-3GPP access. vi) Support of a dedicated CM management context for the UE for connectivity over the non-3GPP access.

<Description of Network Functions: SMF Device>

The SMF device may perform the following functionalities. A portion or all of the functionalities of the SMF device may be supported in a single instance of the SMF device:

i) The SMF device may perform a session management, for example, establishment, modification, and release of a session, including a tunnel maintained between the UPF device and an AN node. ii) The SMF device may perform a UE IP address allocation and management (optional authorization). iii) The SMF device may perform DHCPv4 (server and client) and DHCPv6 (server and client) functions. iv) The SMF device may perform ARP proxying specified in IETF RFC 1027 and/or IPv6 neighbor solicitation proxying specified in IETF RFC 4861 functionality for Ethernet PDUs. The SMF device may respond to the ARP and/or IPv6 neighbor solicitation request by providing a MAC address corresponding to an IP address sent in the request. v) The SMF device may perform a selection and a control of a UP function, including controlling the UPF device to a proxy ARP or IPv6 neighbor discovery, or to forward all of ARP/IPv6 neighbor solicitation traffic to the SMF device, for Ethernet PDU sessions. vi) The SMF device may configure traffic steering at the UPF device to route traffic to a proper destination. The SMF device may terminate interfaces towards policy control functions. The SMF device may perform lawful intercept (SM events and an interface to LI system). vii) The SMF device may perform charging data collection and support of charging interfaces. The SMF device may perform control and coordination of the charging data collection at the UPF device. The SMF device may perform termination of SM parts of NAS messages. The SMF device may perform a downlink data notification. The SMF device may be an initiator of AN specific SM information that is sent through the AMF device over N2 to the AN. The SMF device may determine an SSC mode of a session. viii) The SMF device may perform a roaming functionality, for example, (1) handling of local enforcement to apply QoS SLAs (VPLMN), (2) charging data collection and charging intercept (VPLMN), (3) lawful intercept (in VPLMN for SM events and the interface to LI system), and (4) support for interaction with an external DN for transport of signaling for PDU session authentication/authorization by the external DN.

Not all of the functionalities are required to be supported in an instance of a Network slice.

<Description of Network Functions: UPF Device>

The UPF device may perform the following functionalities. A portion or all of the functionalities of the UPF device may be supported in a single instance of the UPF device:

i) If applicable, the UPF device may perform a function of an anchor point for intra-/inter-RAT mobility. The UPF device may perform a function of an external PDU session point of interconnection to a data network. ii) The UPF device may perform packet routing and forwarding. For example, the UPF device may support a UP CL to route traffic flows to an instance of the data network and may support a branching point to support a multi-homed PDU session. iii) The UPF device may perform a packet inspection. For example, the UPF device may perform an application detection based on a service data flow template and optical PDFs additionally received from the SMF device. iv) The UPF device may perform a user plane part of policy rule enforcement, for example, grating, redirection, and traffic steering. The UPF device perform lawful intercept (UP collection). The UPF device may perform traffic usage reporting. The UPF device may perform QoS handling for a user plane, for example, UL/DL rate enforcement and reflective QoS marking in a DL. The UPF device may perform uplink traffic verification (SDF device to QoS flow mapping). The UPF device may perform datalink packet buffering and downlink data notification triggering. The UPF device may send and forward at least one "end marker" to a source NG-RAN node. v) The UPF device may perform ARP proxying specified in IETF RFC 1027 and/or IPv6 neighbor solicitation proxying specified in IETF RFC 4861 functionality for Ethernet PDUs. The UPF device may respond to an ARP and/or IPv6 neighbor solicitation request by providing a MAC address corresponding to an IP address sent in the request.

Not all of the UPF functionalities are required to be supported in an instance of a user plane function of a network slice.

<System Procedures>

<General>

Hereinafter, procedures and network function services for the 5GS according to example embodiments by end-to-end information flows are described. The information flows may use NF service operations for communication within a 5GC control plane.

<Connection, Registration, and Mobility Management Procedures>

<General>

The connection management may be used to establish and release a control plane signaling connection between the UE and the AMF device. The registration management may be used to register or deregister the UE/user to or from the 5GS. The mobility management may be used to continuously track a current location of the UE. The 5GS according to example embodiments may provide the following connection, registration, and mobility management functionality.

<N4 Session Management Procedures>

The N4 session management procedures are used to control the functionality of the UPF device. The SMF device may create, update, and remove an N4 session context in the UPF device. The N4 session management procedures, that is, N4 session establishment procedure, N4 session modification procedure, and N4 session release procedure, are initiated by the SMF device:

1. N4 Session Establishment Procedure

The N4 session establishment procedure is used to create an initial N4 session context for a PDU session at the UPF device. The SMF device assigns a new N4 session ID and provides the assigned new N4 session ID to the UPF device. The N4 session ID is stored in the SMF device and the UPF device and used to identify the N4 session context during an interaction between the SMF device and the UPF device. Also, the SMF device stores a relationship between the N4 session ID and the PDU session for the UE.

Figure 8:
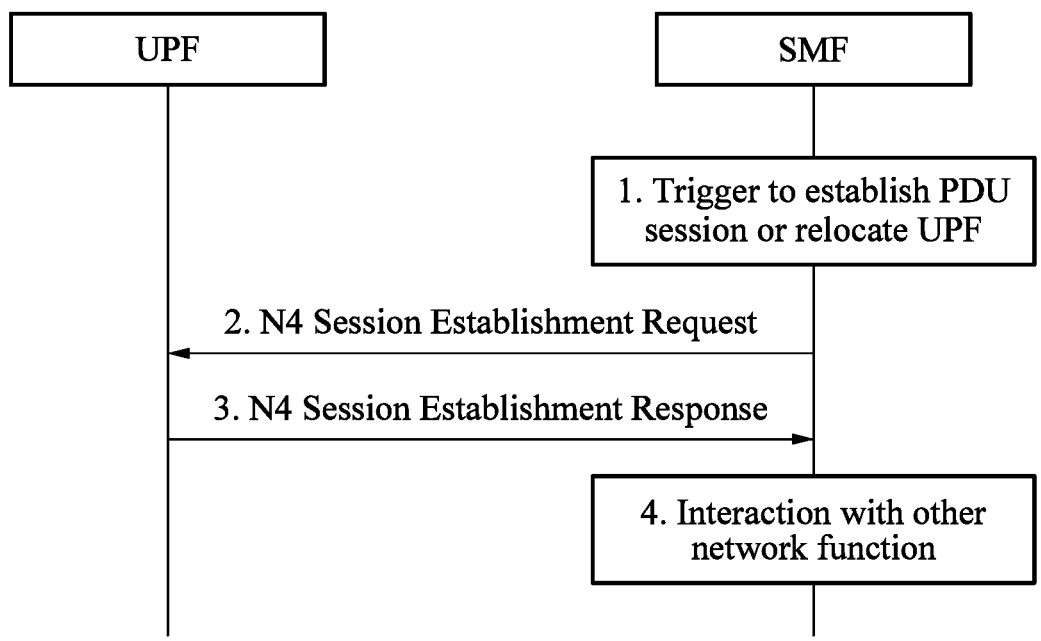
FIG. 8 illustrates an example of an N4 session establishment procedure according to an example embodiment.

FIG. 8 illustrates an example of the N4 session establishment procedure according to an example embodiment.

Referring to FIG. 8, in operation 1, the SMF device receives a trigger to establish a new PDU session or change, for example, relocate the UPF device for an established PDU session.

In operation 2, the SMF device sends an N4 session establishment request message to the UPF device, including structured control information used to define how the UPF device needs to behave.

In operation 3, the UPF device responds with an N4 session establishment response message including information that the UPF device needs to provide to the SMF device in response to the received control information.

In operation 4, the SMF device interacts with a network entity that triggers the N4 session establishment procedure.

2. N4 Session Modification Procedure

The N4 session modification procedure is used to update an N4 session context of an existing PDU session at the UPF device, which is executed between the SMF device and the UPF device every time PDU session related parameters need to be modified.

Figure 9:
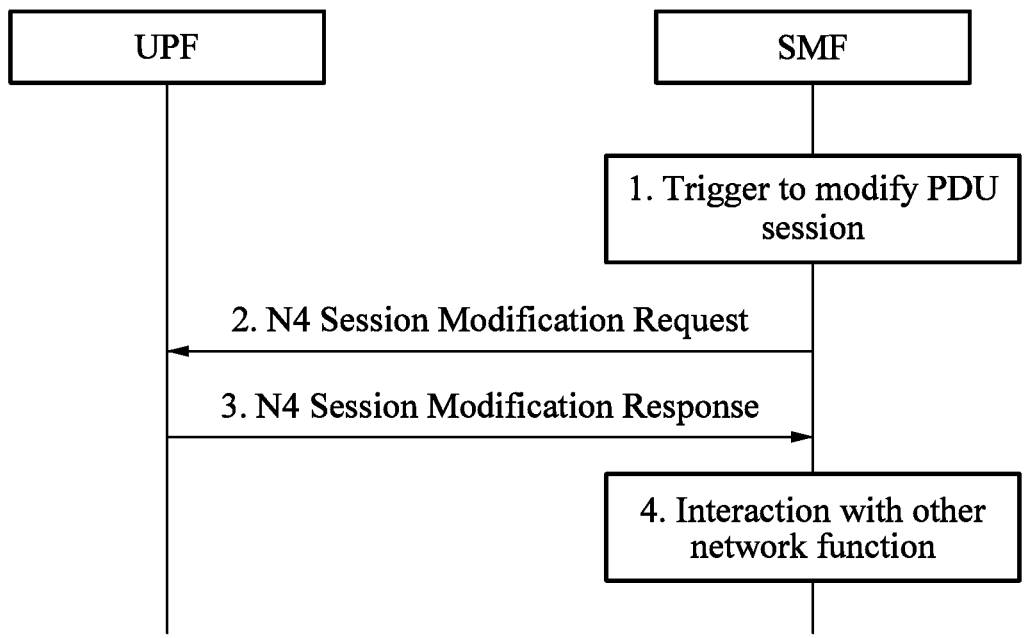
FIG. 9 illustrates an example of an N4 session modification procedure according to an example embodiment.

FIG. 9 illustrates an example of the N4 session modification procedure according to an example embodiment.

Referring to FIG. 9, in operation 1, the SMF device receives a trigger to modify the existing PDU session.

In operation 2, the SMF device sends an N4 session modification request message to the UPF device, including update for structured control information used to define how the UPF device needs to behave.

In operation 3, the UPF device identifies the N4 session context to be modified based on an N4 session ID and updates parameters of the N4 session context based on a list of parameters sent from the SMF device. The UPF device responds with an N4 session modification response message including information that the UPF device needs to provide to the SMF device in response to the received control information.

In operation 4, the SMF device interacts with a network entity (e.g., AMF or PCF) that triggers the N4 session modification procedure.

3. N4 Session Release Procedure

The N4 session release procedure is used to remove an N4 session context of an existing PDU session at the UPF device.

Figure 10:
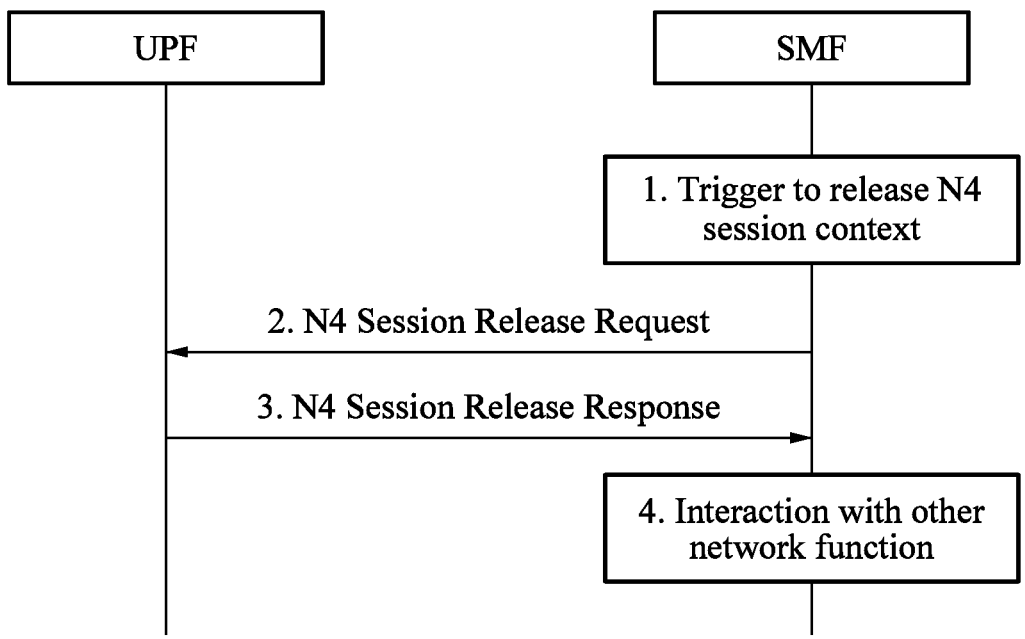
FIG. 10 illustrates an example of an N4 session release procedure according to an example embodiment.

FIG. 10 illustrates an example of the N4 session release procedure according to an example embodiment.

Referring to FIG. 10, in operation 1, the SMF device receives a trigger to release an N4 session context for the existing PDU session.

In operation 2, the SMF device sends an N4 session release request message to the UPF device.

In operation 3, the UPF device identifies the N4 session context to be removed based on an N4 session ID and removes the entire session context. The UPF device responds with an N4 release response message including information that the UPF device needs to provide to the SMF device.

In operation 4, the SMF device interacts with a network entity (e.g., AMF or PCF) that triggers the N4 session release procedure.

<Service Request Procedure: UE Triggered Service Request>

Figure 11A:
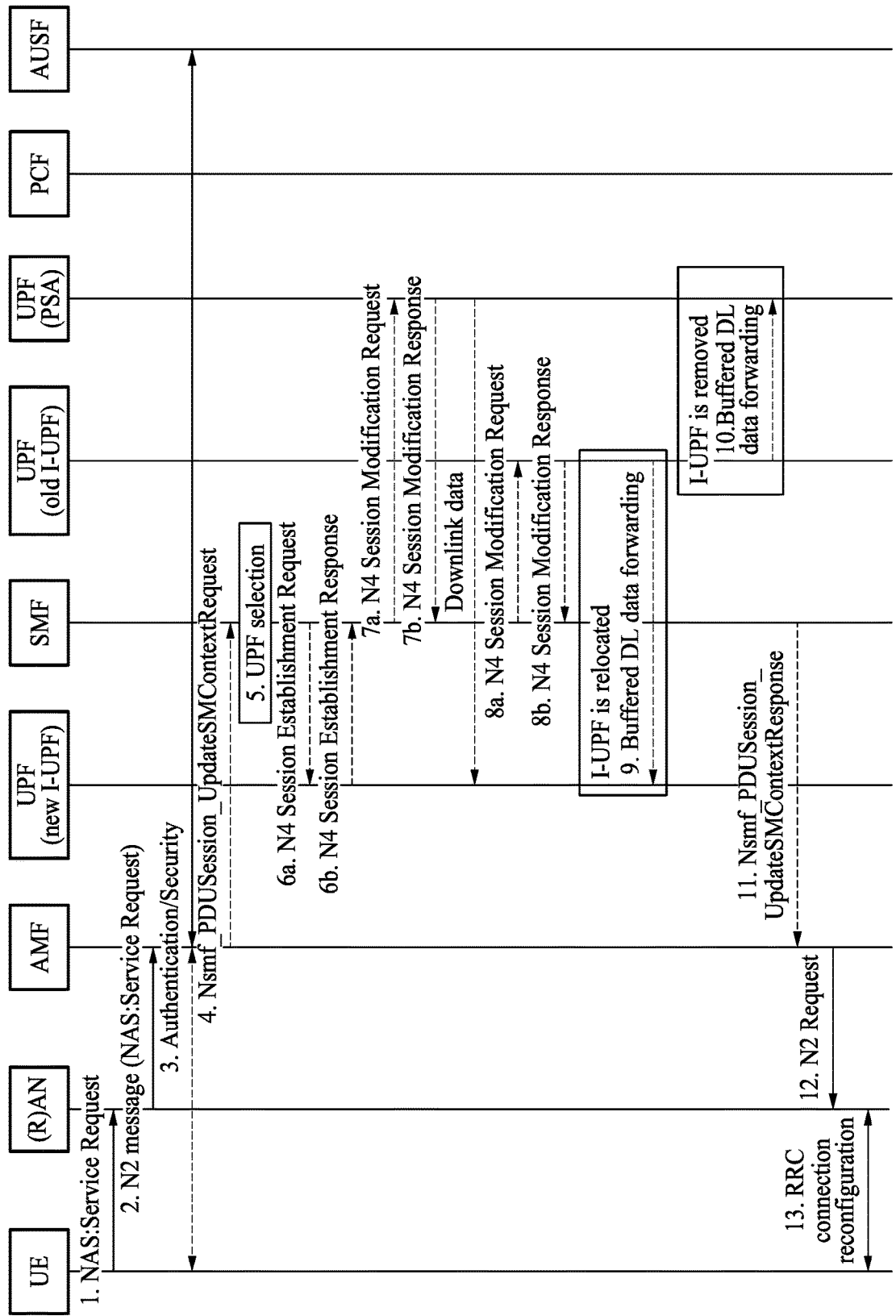
FIGS. 11A and 11B illustrate an example of a user equipment (UE) triggered service request procedure according to an example embodiment.
Figure 11B:
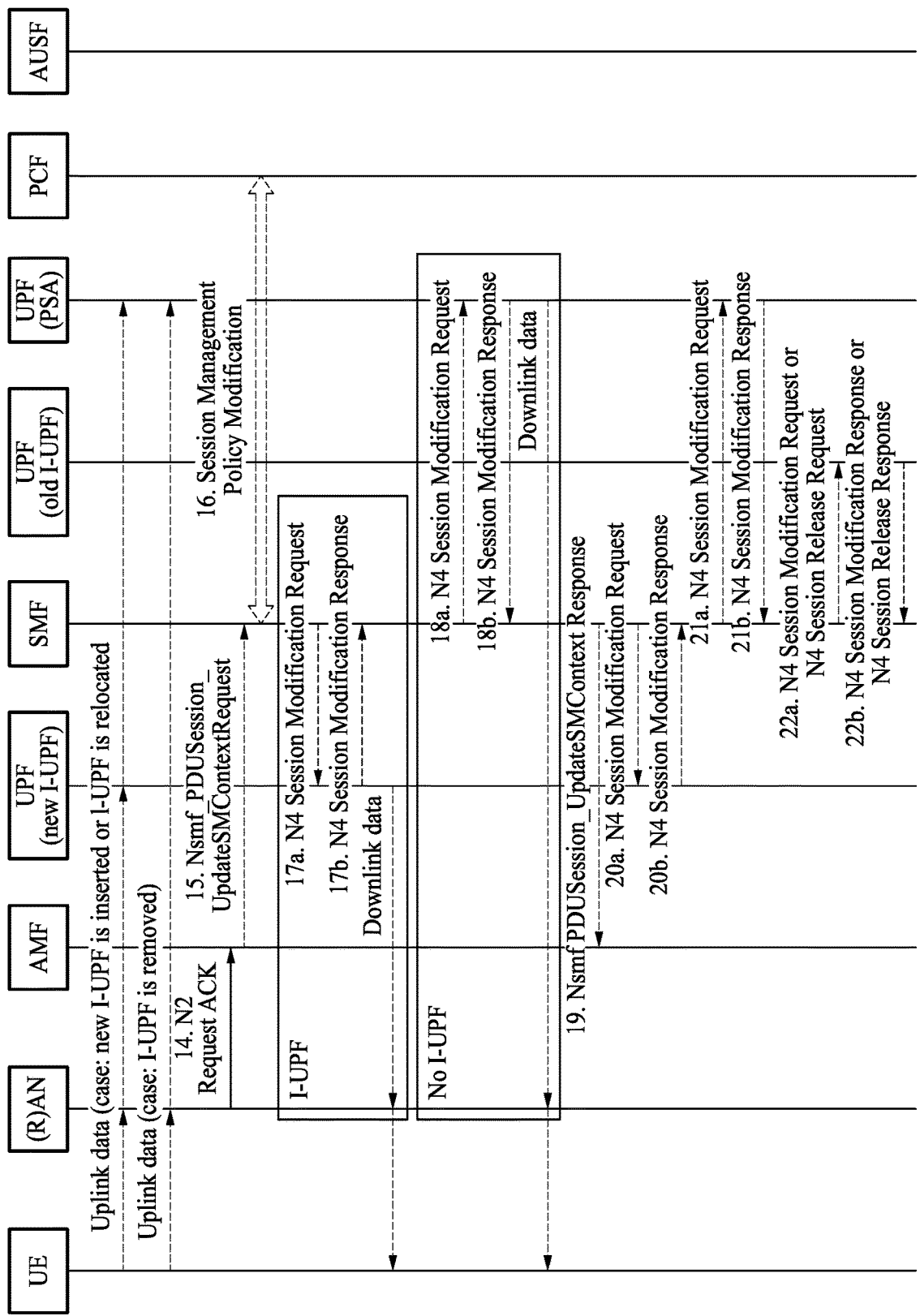

FIGS. 11A and 11B illustrate an example of a UE triggered service request procedure according to an example embodiment.

The UE in a CM-IDLE state initiates the service request procedure to send an uplink signaling message and user data as a response to a network paging request. After receiving a service request message, the AMF device may perform authentication. After establishment of a signaling connection to the AMF device, the UE or the network may send a signaling message, for example, PDU session establishment from the UE to the SMF device, through the AMF device.

The service request procedure is used by the UE in a CM-CONNECTED state to request activation of user plane connection for PDU sessions and to respond to a NAS notification message from the AMF device.

For any service request, the AMF device may respond with a service accept message to synchronize a PDU session status between the UE and the network, if necessary. The AMF device may respond with a service reject message to the UE, if the service request may not be accepted by the network. The service reject message may include an indication or a cause code requesting the UE to perform a registration update procedure.

For the registration update procedure, the impacted SMF device and the UPF device may be all under control of a PLMN serving the UE. For example, in a home routed roaming case, the SMF device and the UPF device in an HPLMN may not be involved.

In the case of a service request by the user data, the network may take further actions if user plane connection activation is not successful.

The UE triggered service request procedure may be applied to a scenario with or without an intermediate UPF device, and with or without reselecting the intermediate UPF device.

Referring to FIGS. 11A and 11B, in operation 1, the UE may send, to the (R)AN, an AN message (AN parameters, MM NAS service request (list Of PDU sessions to be activated, list of allowed PDU sessions, security parameters, PDU session status)).

The list Of PDU sessions to be activated may be provided from the UE when the UE desires to re-activate the PDU session(s). The list of allowed PDU sessions may be provided from the UE when the service request is a response of a paging or a NAS notification for a PDU session associated with a non-3GPP access, and may identify PDU sessions that may be transferred to a 3GPP access.

In the case of NG-RAN:

i) The AN parameters may include a selected PLMN ID and an establishment cause. The establishment cause may provide a reason for requesting establishment of an RRC connection. ii) The UE may send a NAS service request message towards the AMF device encapsulated in an RRC message to the RAN. The RRC message may be used to carry 5G-GUTI and the NAS message.

If the service request is triggered for user data, the UE may identify, using the list of PDU sessions to be activated, the PDU session(s) for which the UP connections are to be activated in the NAS service request message. If the service request is triggered for signaling only, the UE may not identify the PDU sessions to be activated. If this procedure is triggered for paging response and, at the same time, the UE has user data to be transferred, the UE may identify the PDU session(s) for which the UP connections are to be activated in an MM NAS service request message, by the list of PDU sessions to be activated. Otherwise, the UE may not identify PDU session(s) in the service request message for paging response.

If the service request over the 3GPP access is triggered in response to the paging indicating the non-3GPP access, the NAS service request message may identify a list of PDU sessions associated with the non-3GPP access that may be re-activated over 3GPP in the list of allowed PDU sessions.

The PDU session status indicates PDU sessions available in the UE.

The UE may not trigger a service request procedure for a PDU session corresponding to a LADN when the UE is outside a service area of the LADN. The UE may not identify the PDU session(s) in the list of PDU sessions to be activated, if the service request is triggered for other reasons.

For the UE in a CM-CONNECTED state, only the list Of PDU sessions to be activated and the list of allowed PDU sessions need to be included in an MM NAS service request.

In operation 2, the (R)AN may send an N2 message (N2 parameters, MM NAS service request) to the AMF device. If the AMF device is incapable of handling the service request, the AMF device may reject the service request.

When the NG-RAN is used, the N2 parameters may include the 5G-GUTI, the selected PLMN ID, location information, the RAT type, and the establishment cause.

If the UE is in a CM-IDLE state, the RAN may obtain the 5G-GUTI in an RRC procedure. The RAN may select the AMF device based on the 5G-GUTI. The location information and the RAT type may relate to a cell in which the UE is camping.

Based on a PDU session status, the AMF device may initiate a PDU session release procedure in the network for the PDU sessions of which PDU session ID(s) are indicated by the UE as not available.

In operation 3, if the service request is not sent integrity protected or integrity protection verification failed, the AMF device may initiate a NAS authentication/security procedure.

If the UE in the CM-IDLE state triggers the service request to establish a signaling connection only, the UE and the network may exchange NAS signaling after successful establishment of the signaling connection. Here, operations 4 to 10 and 13 to 20 may be omitted.

In operation 4 that is conditionally performed, the AMF device may send, to the SMF device, an Nsmf_PDUSession_UpdateSMContext request (PDU session ID(s), cause(s), UE location information, access type).

The Nsmf_PDUSession_UpdateSMContext request may be invoked:

i) This procedure is triggered if the UE identifies PDU session(s) to be activated in the NAS service request message. ii) This procedure is triggered by the SMF device, however, the PDU session(s) identified by the UE may correlate to other PDU session ID(s) than the PDU session ID triggering the procedure. Alternatively, iii) this procedure is triggered by the SMF device, however, a current UE location may be outside the "area of validity for N2 information" provided from the SMF device. In this case, the AMF device may not send N2 information provided from the SMF device.

The AMF device may determine the PDU session(s) to be activated and may send an Nsmf_PDUSession_UpdateSMContext request to the SMF device(s) associated with the PDU session(s) with a cause set to indicate "establishment of user plane resources" for the PDU session(s).

If the procedure is triggered in response to paging indicating the non-3GPP access, and the PDU session for which the UE is paged is absent in the list of allowed PDU sessions provided from the UE, the AMF device may notify the SMF device that the user plane for the PDU session may not be re-activated. For other PDU sessions in the list of allowed PDU sessions, the service request procedure may succeed without re-activating the user plane of any PDU sessions and the AMF device may notify the UE.

The AMF device may receive a service request to establish another NAS signaling connection through a NG-RAN while maintaining an old NAS signaling connection for the UE through the NG-RAN. In this case, the AMF device may trigger an AN release procedure towards the old NG-RAN to release the old NAS signaling connection as defined in the following logic:

i) For the PDU sessions indicated in the "PDU sessions to be activated," the AMF device may request the SMF device to activate the PDU session(s) immediately by performing operation 4. ii) For the PDU sessions indicated in the "list of PDU session ID(s) with active N3 user plane" but not in the "PDU sessions to be activated," the AMF device may request the SMF device to deactivate the PDU session(s).

In operation 5, if the PDU session ID corresponds to a LADN and the SMF device determines that the UE is outside a service area of the LADN based on a UE location change notification from the AMF device, the SMF device may determine to (based on local policies) perform either of the following:

i) To maintain the PDU session, but reject the activation of user plane connection for the PDU session and to inform the AMF device about the above event: If the procedure is triggered by a network triggered service request, the SMF device may notify the UPF device to discard downlink data for the PDU sessions and/or to not provide further a data notification message. Alternatively, ii) to release the PDU session: The SMF device may release the PDU session and may inform the AMF device that the PDU session is released.

In any of the above two cases, the SMF device may respond to the AMF device in operation 10 with an appropriate reject cause and the user plane activation of PDU session may be stopped.

Otherwise, the SMF device may verify UPF selection criteria based on location information received from the AMF device, and may determine to perform one of the following:

i) Accept activation of UP connection and continue using a current UPF device. ii) Accept the activation of UP connection and select a new (intermediate) UPF device (or add/remove an intermediate UPF device), if the UE is outside a service area of the UPF device that is previously connected to the AN, while maintaining a UPF device acting as a PDU session anchor. The operations of performing I-UPF addition/change/removal are described as conditional operations in the following of the current procedure. iii) Reject the activation of UP connection of a PDU session of SSC mode 2, and trigger re-establishment of the PDU session after the service request procedure to perform allocation of a new UPF to act as the PDU session anchor. For example, the UE may be outside the service area of the anchor UPF device that is connecting to the RAN.

In operation 6a that is conditionally performed, an N4 session establishment request may be sent from the SMF device to a new UPF device, for example, the intermediate UPF device.

If the SMF device selects the new UPF device to act as the intermediate UPF device for the PDU session, or if the SMF device selects insertion of the intermediate UPF device for the PDU session that does not have the intermediate UPF device, an N4 session establishment request message may be sent to the new UPF device, providing packet detection, data forwarding, enforcement and reporting rules to be installed on the intermediate UPF device. PDU session anchor addressing information (on N9) for this PDU session may be provided to the intermediate UPF device.

If the new UPF device is selected by the SMF device to replace the old (intermediate) UPF device, the SMF device may include the data forwarding indication. The data forwarding indication indicates to the UPF device that a second tunnel endpoint needs to be reserved for buffered DL data from the old I-UPF device.

In operation 6*b*, an N4 session establishment response may be sent from the new UPF device, for example, the intermediate UPF device, to the SMF device. The new (intermediate) UPF device may send an N4 session establishment response message to the SMF device. If the UPF device allocates CN tunnel information, the UPF device may provide DL CN tunnel information for the UPF device acting as the PDU session anchor and UL CN tunnel information (i.e., CN N3 tunnel information) to the SMF device. If the data forwarding indication is received, the new (intermediate) UPF device acting as an N3 terminating point may send DL CN tunnel information for the old (intermediate) UPF device to the SMF device. The SMF device may start a timer to be used in operation 20*a* of releasing a resource in an old (intermediate) UPF device.

In operation 7*a* that is conditionally performed, the SMF device may send an N4 session modification request to the UPF (PSA) device.

If the SMF device selects the new (intermediate) UPF device for the PDU session or removes the I-UPF device, the SMF device may send an N4 session modification request message to the PDU session anchor UPF device, providing the data forwarding indication and DL tunnel information from the new (intermediate) UPF device.

If the new (intermediate) UPF device is added for the PDU session, the UPF (PSA) device may start to send DL data to the new I-UPF device as indicated in the DL tunnel information.

If the service request is triggered by the network and the SMF device removes the old I-UPF device but does not replace the old I-UPF device with the new I-UPF device, the SMF device may include the data forwarding indication in the request. The data forwarding indication may indicate to the UPF (PSA) device that a second tunnel endpoint needs to be reserved for buffered DL data from the old I-UPF device. In this case, the UPF (PSA) device may start to buffer the DL data that is simultaneously received from an N6 interface. An N4 session modification response may be sent from the UPF (PSA) device to the SMF device.

In operation 7*b*, the UPF (PSA) device may send an N4 session modification response message to the SMF device.

If the data forwarding indication is received, the UPF (PSA) device may act as an N3 terminating point and may send CN DL tunnel information for the old (intermediate) UPF device to the SMF device. The SMF device may start a timer to be used in operation 20*a* of releasing the resource in the old (intermediate) UPF device.

If the N3 UPF device is the UPF (PSA) device, and if the SMF device finds that the PDU session is activated in response to receiving the Nsmf_PDUSession_UpdateSMContext request in operation 4 with the Cause set to indicate "establishment of user plane resources" for the PDU session(s), the SMF device may delete RAN tunnel information and initiate an N4 session modification procedure to remove tunnel information of the AN in the UPF device.

In operation 8*a* that is conditionally performed, the SMF device may send an N4 session modification request (new UPF address, new UPF DL tunnel ID) to the old (intermediate) UPF device.

If the service request is triggered by the network and the SMF device removes the old (intermediate) UPF device, the SMF device may send the N4 session modification request message to the old (intermediate) UPF device, providing the DL tunnel information for the buffered DL data. If the SMF device allocates the new I-UPF device, the DL tunnel information may be received from the new (intermediate) UPF device acting as the N3 terminating point. If the SMF device does not allocate the new I-UPF device, the DL tunnel information may be received from the new UPF (PSA) device acting as the N3 terminating point. The SMF device may start a timer to monitor a forwarding tunnel.

If the SMF device finds that the PDU session is activated in response to receiving the Nsmf_PDUSession_UpdateSMContext request in operation 4 with a cause set to indicate "establishment of user plane resources" for the PDU session(s), the SMF device may delete RAN tunnel information and may initiate the N4 session modification procedure to remove tunnel information of the AN in the UPF device.

In operation 8*b*, the old (intermediate) UPF device may send an N4 session modification response to the SMF device. The old (intermediate) UPF device may send an N4 session modification response message to the SMF device.

In operation 9 that is conditionally performed, the old (intermediate) UPF device may forward buffered downlink data to the new (intermediate) UPF device.

If the I-UPF device is changed and forwarding tunnel is established in the new I-UPF device, the old (intermediate) UPF device may forward the buffered data to the new (intermediate) UPF device acting as the N3 terminating point.

In operation 10 that is conditionally performed, the old (intermediate) UPF may forward the buffered downlink data to the UPF (PSA) device.

If the old I-UPF device is removed, no new I-UPF device is assigned for the PDU session, and the forwarding tunnel is established in the UPF (PSA) device, the old (intermediate) UPF device may forward the buffered data to the UPF (PSA) device acting as the N3 terminating point.

In operation 11 that is performed conditionally, the SMF device may send, to the AMF device, an Nsmf_PDUSession_UpdateSMContext response (N2 SM information (PDU session ID. QFI(s), QoS profile(s), CN N3 tunnel information, S-NSSAI), cause).

For the PDU session for which the SMF device determines to accept activation of UP connection in operation 5, the SMF device may create only N2 SM information and may send the Nsmf_PDUSession_UpdateSMContext response to the AMF device to establish the user plane(s). The N2 SM information may include information that the AMF device may provide to the RAN. If the SMF device determines to perform PSA UPF relocation for the SSC mode 3 PDU session, the SMF device may trigger a relocation of the SSC mode 3 PDU session anchor after accepting the activation of UP of the PDU session.

In the following cases, the SMF device may reject the activation of UP of the PDU session by including a cause in the Nsmf_PDUSession_UpdateSMContext response:

i) if the PDU session corresponds to a LADN and the UE is outside the service area of the LADN; ii) if the AMF device notifies the SMF device that the UE is reachable only for a regulatory prioritized service, and the PDU session to be activated is not for the regulatory prioritized service; or iii) if the SMF device determines to change the PSA UPF device for the requested PDU session as described in operation 5. In this case, after sending the Nsmf_PDUSession_UpdateSMContext response, the SMF device may trigger another procedure to instruct the UE to re-establish the PDU session as described in operation 5 for SSC mode 2.

In operation 12, the AMF device may send, to the (R)AN, an N2 request (N2 SM information received from the SMF device, security context, AMF signaling connection ID, handover restriction list, subscribed UE-AMBR, MM NAS service accept, list of recommended cells/TAs/NG-RAN node identifiers).

For the UE in a CM-CONNECTED state, if the service request procedure is triggered by the UE, only N2 SM information received from the SMF device and MM NAS service accept may be included in the N2 request. If the service request procedure is triggered by the network as described, only N2 SM information received from the SMF device may be included in the N2 request.

For the UE in a CM-IDLE state, the RAN may store the security context, the AMF signaling connection ID, QoS information for QoS flows of PDU sessions that are activated and N3 tunnel IDs in the UE RAN context.

The MM NAS service accept may include a PDU session status in the AMF device. If the activation of UP of the PDU session is rejected by the SMF device, the MM NAS service accept may include the PDU session ID and a cause why the user plane resources are not activated (e.g., LADN not available). Any local PDU session release during the session request procedure may be indicated to the UE using the session status.

If the plurality of PDU sessions are involved with the plurality of SMF devices, the AMF device may not need to wait for responses from all SMF devices in operation 3 before sending N2 SM information to the UE. However, the AMF device may wait for all responses from the SMF devices before sending an MM NAS service accept message to the UE.

The AMF device may include at least one piece of N2 SM information from the SMF device if this operation is triggered for the PDU session user plane activation. The AMF device may send additional N2 SM information from the SMF device in a separate N2 message (e.g., N2 tunnel setup request). Alternatively, if the plurality of SMF devices are involved, the AMF device may send a single N2 request message to the (R)AN after all the Nsmf_PDUSession_UpdateSMContext response service operations from all the SMF devices associated with the UE are received. In this case, the N2 request message may include N2 SM information received in each of the Nsmf_PDUSession_UpdateSMContext response and PDU session ID to enable the AMF device to associate responses with relevant SMF devices.

If the NG-RAN node provides a list of recommended cells/TAs/NG-RAN node identifiers during the AN release procedure, the AMF device may include the provided list in the N2 request. The RAN may use this information to allocate a RAN notification area when the RAN determines to enable an RRC inactive state for the UE.

In operation 13, the (R)AN may perform the following with respect to the UE. The RAN may perform an RRC connection reconfiguration with the UE based on QoS information for all the QoS flows of PDU sessions of which UP connections are activated and data radio bearers. For the UE in the CM-IDLE state, the user plane security may be established in operation 13.

If the N2 request includes an MM NAS service accept message, the RAN may forward the MM NAS service accept to the UE. The UE may locally delete context of PDU sessions that are not available in the 5GC. Receiving of the service accept message may not indicate a successful activation of user plane radio resources.

Once the user plane radio resources are set up, uplink data from the UE may be forwarded to the RAN. The NG-RAN may send the uplink data to the UPF address and tunnel ID provided in operation 4.

In operation 14 that is conditionally performed, the (R)AN may send, to the AMF device, an N2 request acknowledgement (ACK) (N2 SM information (AN tunnel information, a list of accepted QoS flows for the PDU sessions of which UP connections are activated, a list of rejected QoS flows for the PDU sessions of which UP connections are activated)).

The message may include N2 SM information, e.g., AN tunnel information. The RAN may respond N2 SM information with a separate N2 message (e.g., N2 tunnel setup response) if the AMF device sends the separate N2 message in operation 11.

If a plurality of pieces of N2 SM information are included in the N2 request message in operation 11, the N2 request ACK may include the plurality of pieces of N2 SM information and information to enable the AMF device to associate the response to a relevant SMF device.

In operation 15 that is conditionally performed, the AMF device may send, to the SMF device, an Nsmf_PDUSession_UpdateSMContext request (N2 SM information, RAT type) per PDU session.

If the AMF device receives at least one piece of N2 SM information in operation 14, the AMF device may forward the N2 SM information to the relevant SMF device. If a UE time zone changes compared to a last reported UE time zone, the AMF device may include a UE time zone IE in this message.

In operation 16 that is optionally performed, the SMF device may perform the following with respect to the PCF device. For example, if dynamic PCC is deployed, the SMF device may initiate a notification about new location information with respect to the PCF device (if subscribed) by performing a session management policy modification procedure. The PCF device may provide updated policies.

In operation 17*a* that is conditionally performed, the SMF device may send, to the new (intermediate) UPF device, an N4 session modification request (AN tunnel info and a list of accepted QFI(s)).

If the SMF device selects the new UPF device to act as the intermediate UPF device for the PDU session in operation 5, the SMF device may initiate the N4 session modification procedure with respect to the new I-UPF and provide AN tunnel information. Downlink data from the new I-UPF device may be forwarded to the RAN and the UE.

In operation 17*b* that is conditionally performed, the UPF device may send an N4 session modification response to the SMF device.

In operation 18*a* that is conditionally performed, the SMF device may send the N4 session modification request (AN tunnel information, list of rejected QoS flows) to the UPF (PSA) device.

If a user plane is to be set up or modified and no I-UPF device is present after the modification, the SMF device may initiate the N4 session modification procedure with respect to UPF (PSA) and may provide AN tunnel information. The downlink data from the UPF (PSA) device may be forwarded to the RAN and the UE.

For QoS flows in the list of rejected QoS flows, the SMF device may instruct the UPF device to remove rules (e.g., packet detection rules etc.) that are associated with the QoS flows.

In operation 18*b* that is conditionally performed, the UPF device may send an N4 session modification response to the SMF device. In operation 19 that is conditionally performed, the SMF device may send a Nsmf_PDUSession_UpdateSMContext response to the AMF device.

In operation 20a that is conditionally performed, the SMF device may send the N4 session modification request to the AMF device. If forwarding tunnel is established with respect to the new I-UPF device and if the timer SMF set for the forwarding tunnel in operation 8a expires, the SMF device may send the N4 session modification request to the new (intermediate) UPF device acting as the N3 terminating point to release the forwarding tunnel.

In operation 20b that is conditionally performed, the new (intermediate) UPF device may send an N4 session modification response to the SMF device. The new (intermediate) UPF device acting as the N3 terminating point may send the N4 session modification response to the SMF device.

In operation 21a that is conditionally performed, the SMF device may send the N4 session modification request to the UPF (PSA) device.

If forwarding tunnel is established to the UPF (PSA) device and if the timer SMF set for the forwarding tunnel in operation 7a expires, the SMF device may send the N4 session modification request to the UPF (PSA) device acting as the N3 terminating point to release the forwarding tunnel.

In operation 21b that is conditionally performed, the UPF (PSA) device may send the N4 session modification response to the SMF device. The UPF (PSA) device acting as the N3 terminating point may send the N4 session modification response to the SMF device.

In operation 22a that is conditionally performed, the SMF device may send the N4 session modification request or N4 session release request to the old UPF device.

If the SMF device determines to continue using the old UPF in operation 5, the SMF device may send the N4 session modification request, providing AN tunnel information.

If the SMF device determines to select a new UPF device to act as the intermediate UPF device in operation 5, and the old UPF device is not PSA UPF device, the SMF device may initiate resource release, after the timer in operation 6b expires, by sending the N4 session release request (release cause) to the old (intermediate) UPF device.

In operation 22b, the old (intermediate) UPF device may send the N4 session modification response or the N4 session release response to the SMF device.

The old UPF device may make acknowledgement with the N4 session modification response or N4 session release response message to verify modification or release of resources.

Once the procedure is completed, the AMF device may invoke the Namf_EventExposure_Notify service operation to notify the mobility related events.

In response to receiving Namf_EventExposure_Notify with an indication that the UE is reachable, if the SMF device has pending DL data, the SMF device may invoke the Namf_Communication_N1N2MessageTransfer service operation to the AMF device to establish the user plane(s) for the PDU sessions. Otherwise, the SMF device may resume sending DL data notifications to the AMF device in case of DL data.

According to an example embodiment, if the UE in an IDLE state moves to a new registration area, the UE may connect to a network temporarily for registration to a new network in response to a change in a registration area. Here, active traffic may be absent. During registration to the new network, the AMF device and the SMF device may manage a location of the UE and the SMF device may determine control of a UPF device, such as I-UPF insertion, removal, and relocation. Based on the determination, an operation, such as I-UPF insertion, removal, and relocation may be performed in a session idle state. That is, during registration to the new network in the session idle state, the UPF device may be controlled and thus, potential interruption may be reduced when providing an actual service.

According to an example embodiment, in the case of performing I-UPF control, such as I-UPF insertion, removal, and relocation, in a session idle state, control of the UPF device may be performed and interface between a base station and the UPF device may not be updated. Accordingly, signaling load between a RAN and a core network may be reduced by not updating in the session idle state.

According to an example embodiment, relocation of a PDU session anchor (PSA) that is a UPF device serving as an anchor gateway of a corresponding PDU session based on a session may be performed to not fix a 5G network and manage a flexible data path. Also, to support a network in which the base station and the PSA are not directly connected, at least one intermediate UPF device may be inserted between the base station and the PSA.

<Network Triggered Service Request>

Figure 12:
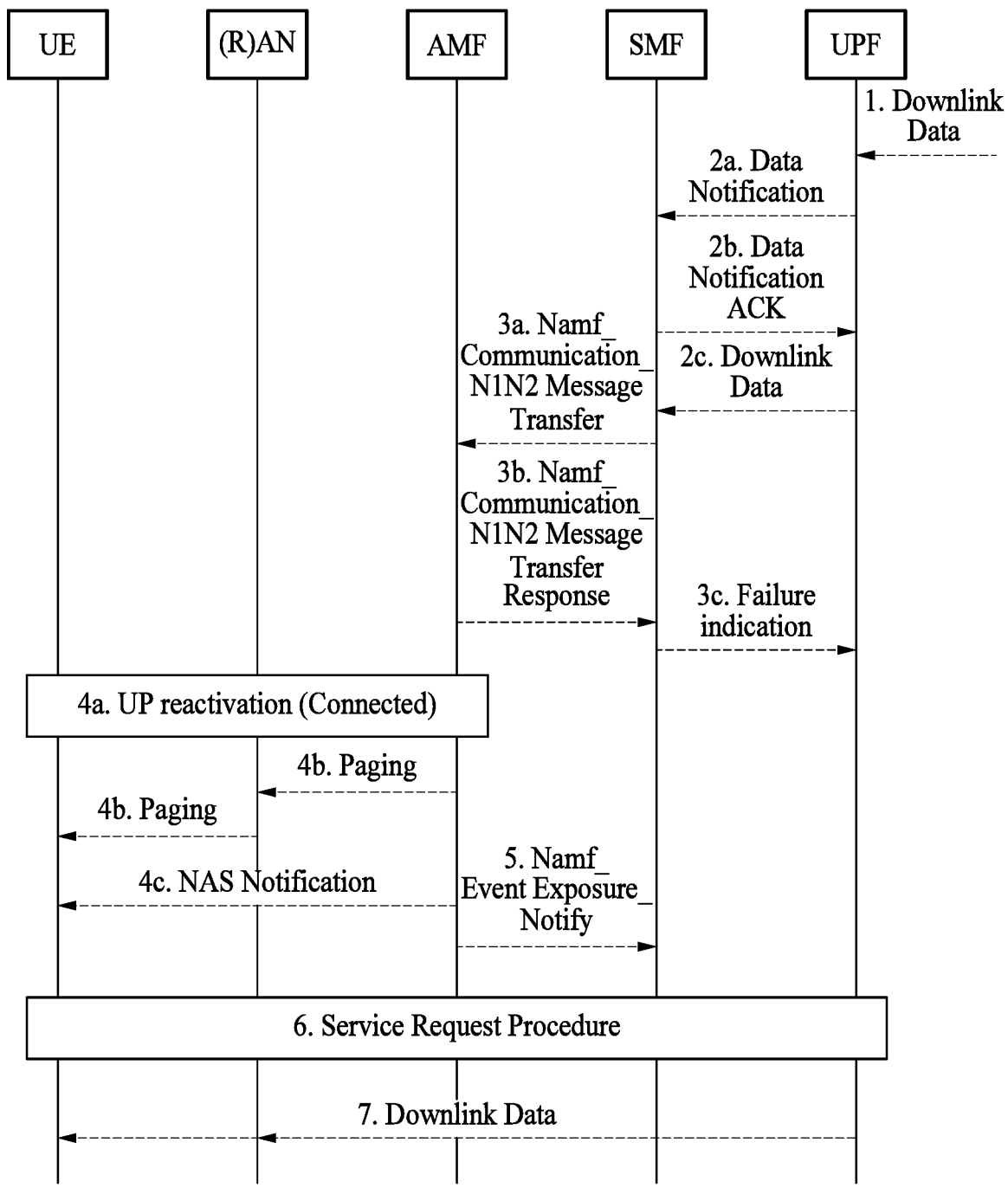
FIG. 12 illustrates an example of a network triggered service request procedure according to an example embodiment.

FIG. 12 illustrates an example of a network triggered service request procedure according to an example embodiment.

The network triggered service request procedure is used when the network needs to signal (e.g., N1 signaling to the UE, mobile-terminated SMS, user plane connection activation for PDU session(s) to deliver mobile terminating user data) with the UE. When the network triggered service request procedure is triggered by an SMSF, a PCF device, or a UDM, the SMF device of FIG. 12 may be replaced with the SMSF, the PCF device, or the UDM. If the UE is in a CM-IDLE state or a CM-CONNECTED state in the 3GPP access, the network initiates the network triggered service request procedure. If the UE is in the CM-IDLE state and asynchronous type communication is not activated, the network sends a paging request to the (R)AN/UE. The paging request triggers a UE triggered service request procedure in the UE. If the asynchronous type communication is activated, the network stores a received message and forwards the message to the (R)AN and/or the UE (i.e., synchronizes a context with the (R)AN and/or the UE) when the UE enters the CM-CONNECTED state.

If the SMF device is triggered to send a second Namf_Communication_N1N2MessageTransfer with higher priority than that of a first Namf_Communication_N1N2MessageTransfer that is sent, the SMF device sends a new Namf_Communication_N1N2MessageTransfer indicating the higher priority to the AMF device. If the SMF device receives an additional notification message from the UPF device for a PDU session with the same or lower priority than that of the sent first Namf_Communication_N1N2MessageTransfer, or if the SMF device sends the second Namf_Communication_N1N2MessageTransfer indicating the higher priority and receives additional notification messages from the UPF device for the UE, the SMF device does not send the new Namf_Communication_N1N2MessageTransfer.

If the UE is in the CM-IDLE state in the non-3GPP access and if the UE is simultaneously registered over the 3GPP access and the non-3GPP access in a PLMN, the network may initiate the network triggered service request procedure over the 3GPP access.

If the UE is in the CM-IDLE state in the 3GPP access and in the CM-CONNECTED state in the non-3GPP access and if the UE is simultaneously registered over the 3GPP access and the non-3GPP accesses in the same PLMN, the network may initiate the network triggered service request procedure for the 3GPP access over the non-3GPP access.

For the network triggered service request procedure, the impacted SMF device and UPF device are all under control of the PLMN serving the UE. For example, in a home routed roaming case, the SMF device and the UPF device in an HPLMN may not be involved.

Referring to FIG. 12, in operation 1, when the UPF device receives downlink data of a PDU session and no AN tunnel information is stored in the UPF device for the PDU session, the UPF device may buffer the downlink data or may forward the downlink data to the SMF device based on an instruction from the SMF device.

In operation 2a, the UPF device may send, to the SMF device, a data notification including an N4 session ID and information used to identify QFI and DSCP.

i) On arrival of a first downlink data packet, the UPF device may send a data notification message to the SMF device, if the SMF device has not previously notified the UPF device to not send the data notification to the SMF device (in which case the next operations are omitted).

ii) If the UPF device receives a downlink data packet for another QoS flow in the same PDU session, the UPF device may send another data notification message to the SMF device.

iii) If a paging policy differentiation (PPD) feature is supported by the UPF device and activated by the SMF device for an N4 session, the UPF device may also include DSCP in a TOS (IPv4)/TC (IPv6) value from an IP header of the downlink data packet and information to identify a QFI of the QoS flow for the DL data packet.

In operation 2b, the SMF device may send data notification ACK to the UPF device.

In operation 2c, the UPF device may forward the downlink data packet to the SMF device. If the PPD feature is supported by the SMF device, the SMF device may determine a paging policy indication based on the DSCP in the TOS (IPv4)/TC (IPv6) value from the IP header of the received downlink data packet and information used to identify the QFI of the QoS flow for the DL data packet.

In operation 3a that is conditionally performed, the SMF device may send, to the AMF device, Namf_Communication_N1N2MessageTransfer including a SUPI, a PDU session ID, N2 SM information (QFI(s), QoS profile(s), CN N3 tunnel information, S-NSSAI, paging policy indication), an area of validity for N2 information, ARP, paging policy indication, and 5QI.

When the data notification message is received, the PDU session may correspond to a LADN and the SMF device may determine that the UE is outside the service area of the corresponding LADN based on a UE location change notification from the AMF device. In this case, the SMF device may not trigger a notification to the AMF device. The SMF device may notify the UPF device that originated the data notification to discard downlink data for the PDU sessions and/or to not provide further data notification messages.

Otherwise, the SMF device may determine whether to contact the AMF device. The SMF device may not contact the AMF device i) if the SMF device is previously notified that the UE is unreachable; or ii) if the UE is reachable only for a regulatory prioritized service and the PDU session is for the regulatory prioritized service.

The SMF device may determine to contact the AMF device and may invoke the Namf_Communication_N1N2MessageTransfer to the AMF device, including the PDU session ID received in operation 2a.

If the SMF device, while waiting for a user plane connection to be activated, receives any additional data notification message for the same PDU session but corresponds to higher priority (i.e., an ARP priority level) than that of the first data notification for this PDU session, the SMF device may invoke a new Namf_Communication_N1N2MessageTransfer indicating the higher priority ARP and PDU session ID to the AMF device.

If the SMF device, while waiting for the user plane connection to be activated, receives a message from a new AMF device other than one to which the SMF device invokes the Namf_Communication_N1N2MessageTransfer, the SMF device may re-invoke the Namf_Communication_N1N2MessageTransfer towards the new AMF device.

When supporting the PPD, the SMF device may indicate, in the Namf_Communication_N1N2MessageTransfer, the 5QI associated with the QFI in operation 2a, or the packet received in operation 2c, the ARP, the PPI related to the downlink data that is received from the UPF device or triggers the data notification message.

In operation 3b that is conditionally performed, the AMF device may respond to the SMF device.

If the UE is in the CM-IDLE state at the AMF device and the AMF device is able to page the UE, the AMF device may send a Namf_Communication_N1N2MessageTransfer response to the SMF device immediately with a cause "Attempting to reach UE" indicating to the SMF device that the N2 SM information provided in operation 3a may be ignored by the AMF device once the UE is reachable and the SMF device may be asked to provide the N2 SM information again.

If the UE is in the CM-CONNECTED state at the AMF device, the AMF device may send the Namf_Communication_N1N2MessageTransfer response to the SMF device immediately with a cause "N1/N2 transfer success".

If the UE is in the CM-IDLE state and the AMF device determines that the UE is not reachable for paging, the AMF device may send the Namf_Communication_N1N2MessageTransfer response to either the SMF device or other network functions from which the AMF device receives the request message in operation 3a, indicating that the UE is not reachable. Alternatively, the AMF device may perform asynchronous type communication and store a UE context based on the received message. If the asynchronous type communication is invoked, the AMF device may initiate communication with the UE and the (R)AN when the UE is reachable, for example, when the UE enters the CM-CONNECTED state.

If the AMF device determines that the UE is unreachable for the SMF device (e.g., since the UE is in a MICO mode or the UE is only registered over the non-3GPP access and the UE state is CM-IDLE), the AMF device may reject the request from the SMF device. The AMF device may include, in a reject message, an indication that the SMF device has no need to send DL data notifications to the AMF device, if the SMF device does not subscribe to an event of UE reachability. The AMF device may store an indication that the SMF device is informed that the UE is unreachable.

If the UE is not in the MICO mode and the AMF device detects that the UE is in a non-allowed area unless the request from the SMF device is for a regulatory prioritized service, the AMF device may reject the request from the SMF device and may notify the SMF device that the UE is reachable only for the regulatory prioritized service. The AMF device may store an indication that the SMF device is informed that the UE is reachable only for the regulatory prioritized service.

If a registration procedure with an AMF change is in progress when an old AMF device receives the Namf_Communication_N1N2MessageTransfer, the old AMF device may reject the request with an indication that the Namf_Communication_N1N2MessageTransfer is temporarily rejected.

In response to receiving a Namf_Communication_N1N2MessageTransfer response with an indication that its request is temporarily rejected, the SMF device may start a locally configured guard timer and wait for any message to receive from the new AMF device. In response to receiving a message from the AMF device, the SMF device may re-invoke the Namf_Communication_N N2MessageTransfer (with a data notification) to the AMF device from which the SMF device receives the message. Otherwise, the SMF device may perform operation 3c in response to expiry of the guard timer. If the SMF device determines that the control plane buffering applies, the SMF device may request the UPF device to start forwarding the downlink data PDU towards the SMF device.

In operation 3c that is conditionally performed, the SMF device may respond to the UPF device.

The SMF device may notify the UPF device about a failure of the user plane setup.

If the SMF device receives the indication from the AMF device that the UE is unreachable or reachable only for the regulatory prioritized service, the SMF device may perform, based on network policies, one of the following: i) indicate to the UPF device to stop sending data notifications, ii) indicate to the UPF device to stop buffering DL data and discard the buffered data, iii) indicate to the UPF device to stop sending data notifications and stop buffering DL data and discard the buffered data, and iv) refrain from sending a further Namf_Communication_N1N2MessageTransfer message for DL data to the AMF device while the UE is unreachable.

Based on the operator policies, the SMF device may apply a pause of a charging procedure.

If the SMF device receives an indication from the AMF device that the Namf_Communication_N1N2MessageTransfer message requested from the SMF device is temporarily rejected, the SMF device may indicate to the UPF device to apply temporary buffering based on network policies.

In operation 4a that is conditionally performed, if the UE is in the CM-CONNECTED state in the 3GPP access and the PDU session ID received from the SMF device in operation 3a is associated with the 3GPP access, operations 12 to 22 of the UE triggered service request procedure of FIGS. 11A and 11B may be performed to activate the user plane connection for this PDU session (i.e., to establish radio resources and N3 tunnel) without sending a paging message to the (R)AN node and the UE. In operation 12 of the UE triggered service request procedure of FIGS. 11A and 11B, the AMF device may not send the NAS service accept message to the UE. The rest of the UE triggered service request procedure may be omitted.

In operation 4b that is conditionally performed, if the UE is in the CM-IDLE state in the 3GPP access and the PDU session ID received from the SMF device in operation 3a is associated with the 3GPP access and based on the local policy that the AMF device determines to notify the UE through the 3GPP access even when the UE is in the CM-CONNECTED state for the non-3GPP access, the AMF device may send the paging message to the RAN node(s) over the 3GPP access.

If the UE is simultaneously registered over the 3GPP access and the non-3GPP access in the same PLMN, the UE is in the CM-IDLE state in both the 3GPP access and the non-3GPP access, and the PDU session ID in operation 3a is associated with the non-3GPP access, the AMF device may send the paging message to the RAN node(s) over the 3GPP access.

If the UE is in the RM-REGISTERED state and CM-IDLE and reachable, the AMF device may send the paging message (NAS ID for paging, registration area list, paging DRX length, paging priority indication, access associated with the PDU session) to the (R)AN node(s) belonging to a registration area(s) in which the UE is registered and the RAN node may page the UE, including the access associated with the PDU session in the paging message that is received from the AMF device.

When supporting the PPD, paging strategies may be configured in the AMF device for different combinations of a DNN, a paging policy indication, ARP, and 5QI.

For the RRC-inactive state, the paging strategies may be configured in the (R)AN for different combinations of the paging policy indication, ARP, and 5QI.

The paging priority indication may be included only i) if the AMF device receives a Namf_Communication_N1N2MessageTransfer message with an ARP value associated with priority services (e.g., MPS, MCS), as configured by the operator. ii) One paging priority level may be used for a plurality of ARP values. Mapping of ARP values to paging priority level(s) may be configured by operator policies in the AMF device and in the RAN.

The (R)AN may prioritize paging of UEs according to the paging priority indication.

If the AMF device, while waiting for a UE response to the paging request message sent without the paging priority indication, receives the Namf_Communication_N1N2MessageTransfer message, any of which indicates an ARP value associated with priority services (e.g., MPS, MCS), as configured by the operator, the AMF device may send another paging message with a suitable paging priority.

Paging strategies may include i) a paging retransmission scheme (e.g., a number of times that the paging is repeated or a time interval at which the paging is repeated), ii) determining whether to send the paging message to the (R)AN nodes during specific AMF high load conditions, and iii) determining whether to apply sub-area based paging (e.g., a first page in a last known cell ID or TA and retransmission in all registered TAs).

The AMF device and the (R)AN may support further paging optimization in order to reduce signaling load and network resources used to successfully page the UE based on at least one of:

i) by the AMF device implementing specific paging strategies (e.g., the N2 paging message is sent to the (R)AN nodes that serve the UE last), ii) by the AMF device considering information on recommended cells and RAN nodes provided from the (R)AN at transition to the CM- IDLE state (here, the AMF device considers the (R)AN nodes associated with a portion of the information to determine the (R)AN nodes to be paged, and provides the information on recommended cells within the N2 paging message to each of the (R)AN nodes), and iii) by the (R)AN considering paging attempt count information provided from the AMF device at paging.

If UE radio capability for paging information is available in the AMF device, the AMF device may add the UE radio capability for paging information in the N2 paging message to the (R)AN nodes.

If the information on recommended cells and (R)AN nodes for paging is available in the AMF device, the AMF device may consider the information to determine the (R)AN nodes for paging and, when paging a (R)AN node, the AMF device may transparently convey the information on recommended cells to the (R)AN node.

The AMF device may include the paging attempt count information in the N2 paging message(s). The paging attempt count information may be the same for all (R)AN nodes selected by the AMF device for paging.

In operation 4c that is conditionally performed, if the UE is simultaneously registered over the 3GPP access and the non-3GPP access in the same PLMN, the UE is in the CM-CONNECTED state in the 3GPP access, and the PDU session ID in operation 3a is associated with the non-3GPP access, the AMF device may send the NAS notification message including the PDU session ID to the UE over the 3GPP access and may set a notification timer. Operation 5 may be omitted.

If the UE is simultaneously registered over the 3GPP access and the non-3GPP access in the same PLMN and the UE is in the CM-CONNECTED state for the non-3GPP access and in the CM-IDLE for 3GPP access, and if the PDU session ID in operation 3a is associated with the 3GPP access and based on the local policy that the AMF device determines to notify the UE through the non-3GPP access, the AMF device may send the NAS notification message including the PDU session ID to the UE over the non-3GPP access and may set the notification timer.

In operation 5 that is conditionally performed, the AMF device may send Namf_EventExposure_Notify to the SMF device.

The AMF device may supervise the paging procedure with the timer. If the AMF device receives no response from the UE to the paging request message, the AMF device may apply further paging according to any applicable paging strategy described in operation 4b.

The AMF device may notify the SMF device if the UE is not reachable unless the AMF device is aware of an ongoing MM procedure that prevents the UE from responding, that is, the AMF device receives an N14 context request message indicating that the UE performs the registration procedure with another AMF device.

Once the UE unreachability notification is received, the SMF device may inform the UPF device of the reception thereof.

In operation 6, if the UE is in the CM-IDLE state in the 3GPP access, the UE may initiate the UE triggered service request procedure in response to receiving a paging request for a PDU session associated with the 3GPP access. In operation 4 of the UE triggered service request procedure of FIGS. 11A and 11B, the AMF device may invoke the Nsmf_PDUSession_UpdateSMContext request to the SMF device(s) associated with the PDU session identified in the MM NAS service request message if there is any, except for the PDU session ID included in the Namf_Communication_N1N2MessageTransfer in operation 3a.

If the UE is in the CM-IDLE state in both the 3GPP access and the non-3GPP access, the UE, in response to receiving a paging request for a PDU session associated with the non-3GPP access, may initiate the UE triggered service request procedure including a list of allowed PDU sessions that may be re-activated over the 3GPP access. If the AMF device receives a service request message from the UE over the non-3GPP access (e.g., since the UE successfully connects to the non-3GPP access), the AMF device may stop the paging procedure and process the received service request procedure. If the AMF device receives the service request message and the list of allowed PDU sessions provided from the UE does not include the PDU session for which the UE is paged, the AMF device may notify the SMF device that the UE is reachable, however, does not accept to re-activate the PDU session by invoking the Namf_EventExposure_Notify service.

If the UE is in the CM-IDLE state in the non-3GPP access and in the CM-CONNECTED state in the 3GPP access, the UE may, in response to receiving the NAS notification message over the 3GPP access and including the PDU session associated with the non-3GPP access, initiate the UE triggered service request procedure with the list of allowed PDU sessions that may be re-activated over the 3GPP access, if allowed by UE policies.

If the AMF device does not receive the NAS service request message before the notification timer expires, the AMF device may notify the SMF device that the UE is reachable, however, does not accept to re-activate the PDU session by invoking the Namf_EventExposure_Notify service. If the AMF device receives the service request message from the UE over the non-3GPP access (e.g., since the UE successfully connects to the non-3GPP access), the AMF device may stop the notification timer and may process the received service request procedure.

If the UE is in the CM-IDLE state in the 3GPP access and in the CM-CONNECTED state in the non-3GPP access, the UE may, in response to receiving the NAS notification message over the non-3GPP access identifying the PDU session associated with the 3GPP access, initiate the UE triggered service request procedure over the 3GPP access when the 3GPP access is available. If the AMF device does not receive the NAS service request message before the notification timer expires, the AMF device may either page the UE through the 3GPP access or notify the SMF device that the UE is not able to re-activate the PDU session.

In operation 7, the UPF device may send the buffered downlink data towards the UE over the (R)AN node that performs the service request procedure.

The network may send downlink signaling if the procedure is triggered due to a request from another network entity described in operation 3a.

<Change of SSC Mode 2 PDU Session Anchor with Different PDU Sessions>

Figure 13:
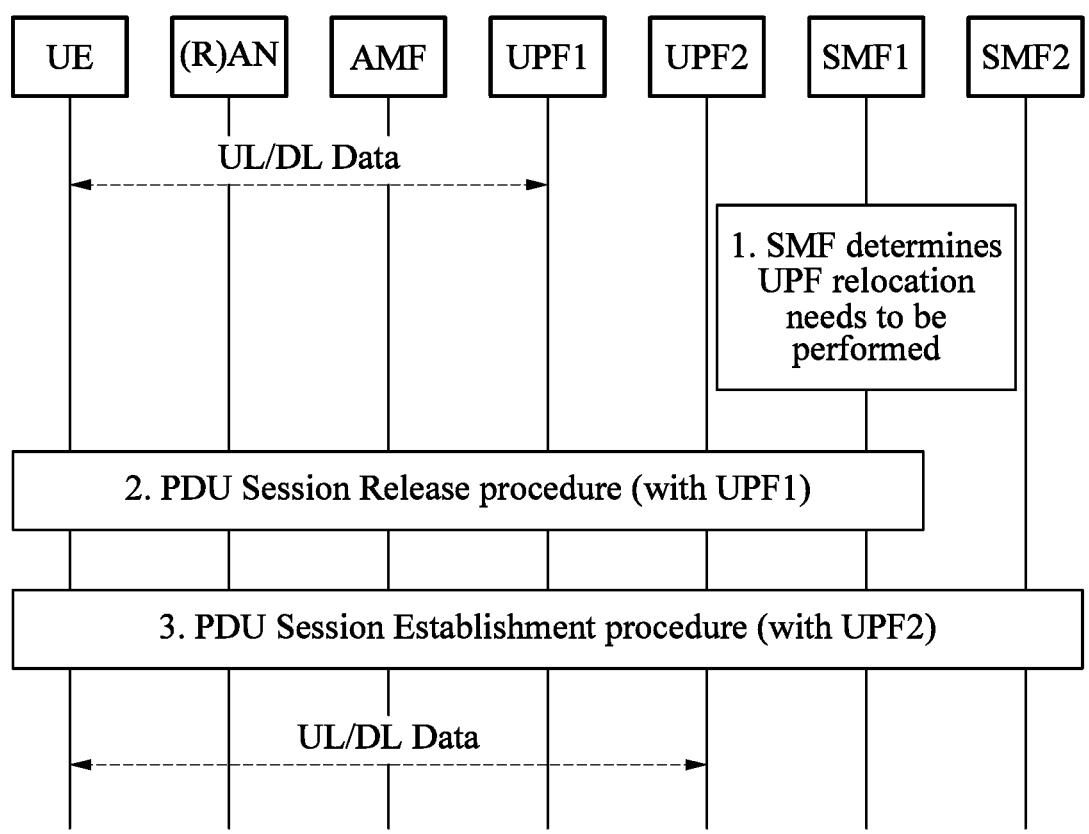
FIG. 13 illustrates an example of a change procedure of a session and service continuity (SSC) mode 2 PSA for a PDU session according to an example embodiment.

FIG. 13 illustrates an example of a change procedure of SSC mode 2 PSA for a PDU session according to an example embodiment.

FIG. 13 illustrates an example of a procedure that is triggered by an SMF device to change a PDU session anchor serving a PDU session of SSC mode 2 for a UE when neither multi-homing nor UL CL applies to the PDU session. The procedure may release the existing PDU session associated with an old PDU session anchor (UPF1 of FIG. 13) and immediately establish a new PDU session with a new PDU session anchor (UPF2).

Referring to FIG. 13, in operation 1, the SMF device may determine that a serving UPF device needs to be changed due to events that may benefit from such change.

In operation 2, the PDU session release procedure with the old PDU session anchor may be initiated. The SMF device may send N1 SM information to the UE through an AMF device by invoking Namf_Communication_N1N2MessageTransfer. A PDU session release command message in the N1 SM information may contain a PDU session ID and a cause indicating that a PDU session re-establishment in the same DN is required.

In operation 3, in response to receiving the PDU session release command with the cause indicating that the PDU session re-establishment in the same DN is required, the UE may create a new PDU session ID and may initiate a PDU session establishment procedure. The AMF device may select an SMF device and the SMF device may select a new UPF (i.e., UPF2) device for the re-established PDU session of SSC mode 2.

<Change of SSC Mode 3 PDU Session Anchor with Plurality of PDU Sessions>

Figure 14:
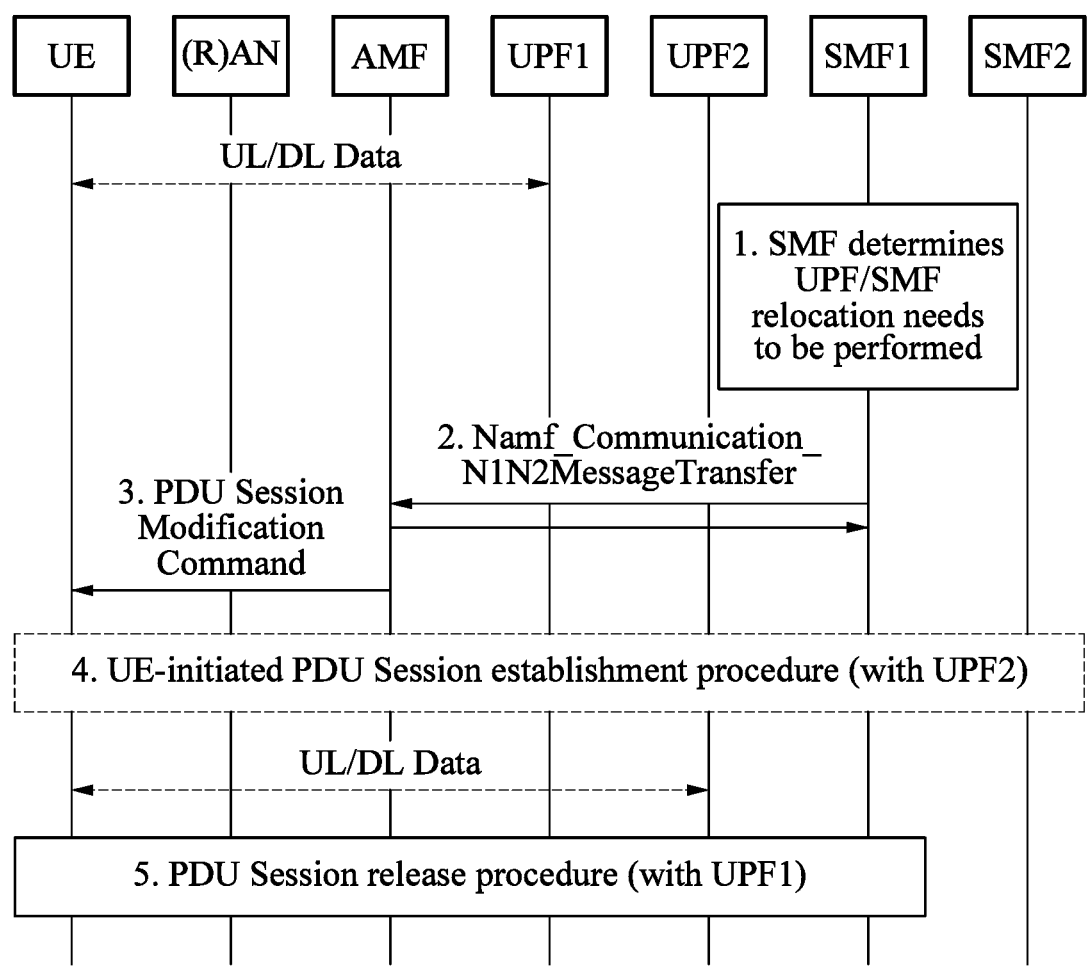
FIG. 14 illustrates an example of a change procedure of an SSC mode 3 PDU session anchor with a plurality of PDU sessions according to an example embodiment.

FIG. 14 illustrates an example of a change procedure of session and service continuity (SSC) mode 3 PDU session anchor with the plurality of PDU sessions according to an example embodiment. FIG. 14 illustrates an example of a procedure that is triggered by an SMF device to change a PDU session anchor serving a PDU session of SSC mode 3 for a UE. This procedure may release an existing PDU session associated with an old PDU session anchor (UPF1 of FIG. 14) after establishing a new PDU session in the same DN with a new PDU session anchor (UPF2), which is controlled by the same SMF device. The SMF device may determine that a new SMF device needs to be reallocated.

Referring to FIG. 14, in operation 1, the SMF device may determine that the serving UPF device or the SMF device needs to be changed.

In operation 2, the SMF device may invoke Namf_Communication_N1N2MessageTransfer (PDU session ID, SMF reallocation requested indication, N1 SM container (PDU session modification command (cause, PDU session release timer)). Here, the PDU session ID indicates the existing PDU session to be relocated and the cause indicates that a PDU session re-establishment in the same DN is required.

The SMF reallocation requested indication indicates whether the SMF device is requested to be reallocated. A release timer value indicates an amount of time during which the network is willing to maintain the PDU session.

In operation 3, the AMF device may forward a NAS message to the UE.

In operation 4, if the UE receives the PDU session modification command, the UE may determine to initiate a PDU session establishment procedure.

In an SSC mode, the UE may create a new PDU session ID and initiate a PDU session establishment request using the new PDU session ID. The new PDU session ID may be included as a PDU session ID in a NAS request message. The old PDU session ID indicates that the existing PDU session to be released may also be provided to the AMF device in the NAS request message.

If SMF device reallocation is requested in operation 2, the AMF device may select a different SMF device. Otherwise, the AMF device may send an N11 message to the same SMF device serving the old PDU session ID.

In operation 3, the AMF device may include both the PDU session ID and the old PDU session ID in an Nsmf_PDUSession_CreateSMContext request. The SMF device may detect that the PDU session establishment request is related to the trigger in operation 2 based on the presence of the old PDU session ID in the Nsmf_PDUSession_CreateSMContext request. The SMF device may store the new PDU session ID and may select a new PDU session anchor (i.e., UPF2) for the new PDU session.

In operation 5, the old PDU session may be released by the UE before the timer provided in operation 1 expires (e.g., once the UE consolidates all traffic on PDU #2 or if the session is no more needed) or by the SMF device upon expiry of this timer.

Example: UE Triggered Service Request in CM-IDLE State

Figure 15A:
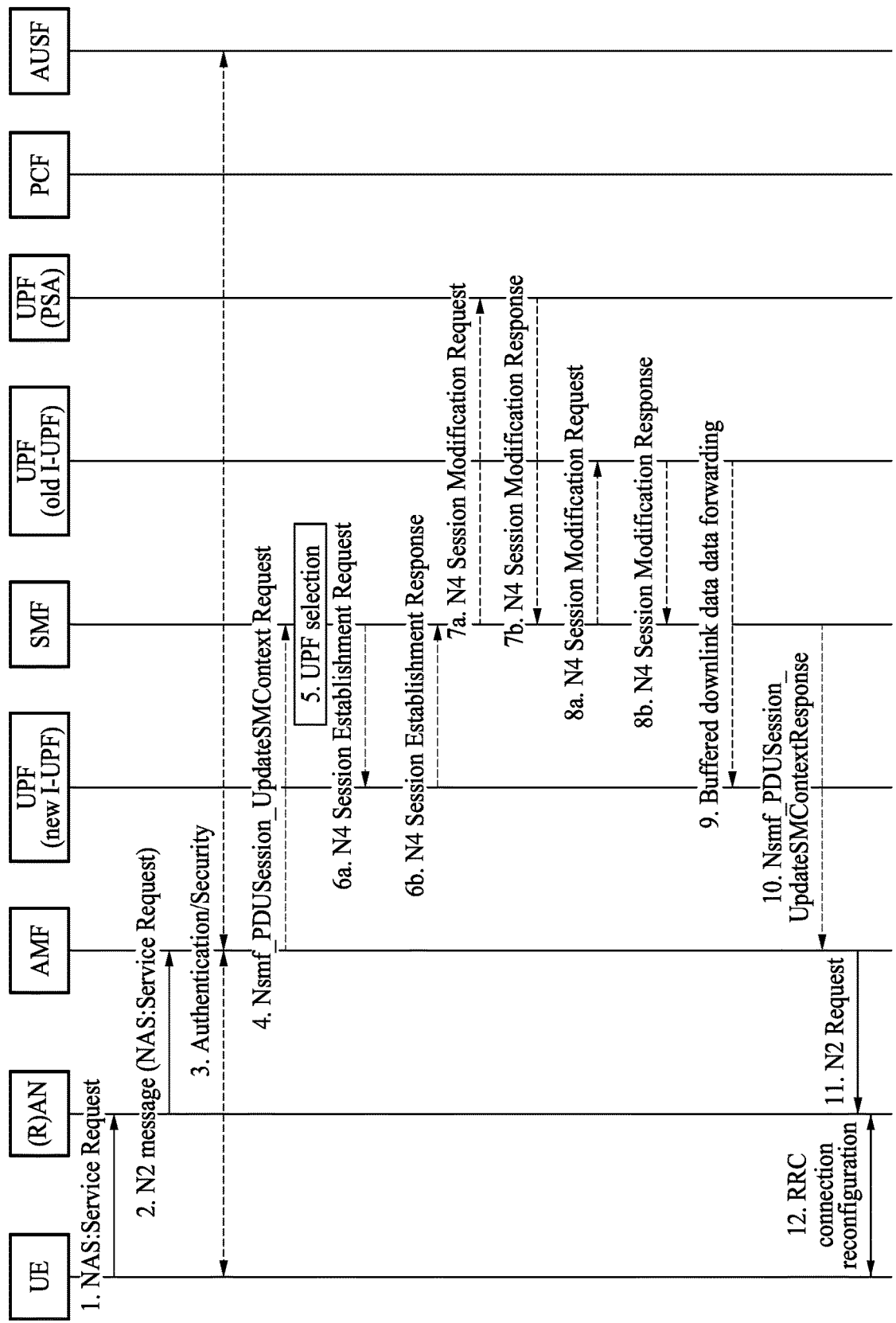
FIGS. 15A and 15B illustrate an example of a UE triggered service request procedure in a CM-IDLE state according to an example embodiment.
Figure 15B:
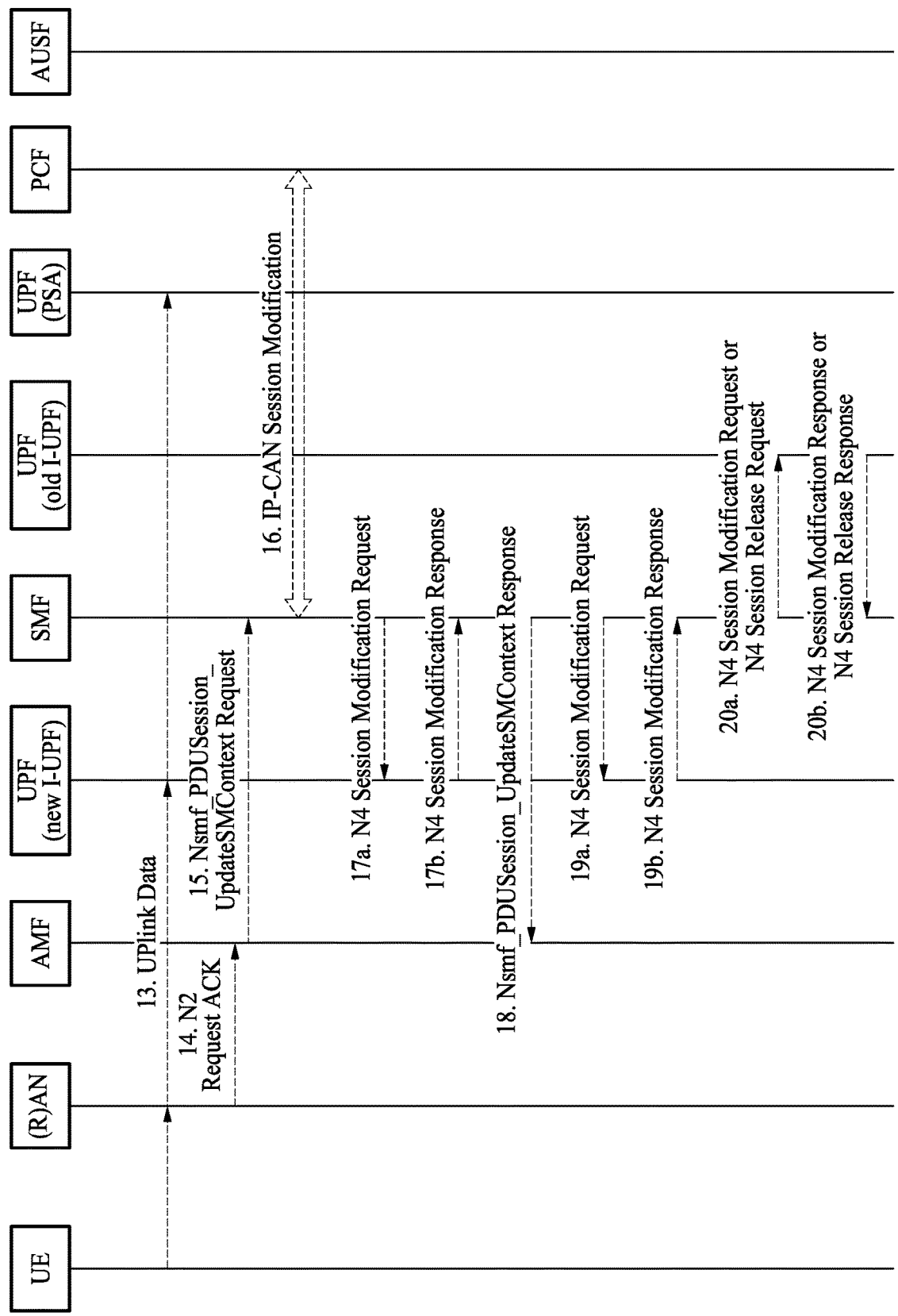

FIGS. 15A and 15B illustrates an example of a UE triggered service request procedure in a CM-IDLE state according to an example embodiment.

The service request procedure is used by the UE in the CM-IDLE state to request establishment of a secure connection to the AMF device. The UE in the CM-IDLE state may initiate the service request procedure in order to send uplink signaling messages, user data, or a response to a network paging request. After receiving the service request message, the AMF device may perform authentication and the AMF device may perform a security procedure. Once a secure signaling connection to the AMF device is established, the UE or the network may send signaling messages. For example, PDU session establishment from the UE to the network, or the SMF device, over the AMF device, may start a user plane resource establishment for the PDU sessions requested by the network and/or indicated in the service request message.

For any service request, the AMF device may respond with a service accept message to synchronize a PDU session status between the UE and the network, if necessary. The AMF device may also respond with a service reject message to the UE, if the service request may not be accepted by the network.

In the case of the service request by the user data, the network may take further actions if the user plane connection activation is not successful. The UE triggered service request procedure in the CM_IDLE state may be applicable to a scenario with or without an intermediate UPF device, and with or without reselecting the intermediate UPF device.

Referring to FIGS. 15A and 15B, in operation 1, the UE may send, to the (R)AN, an AN message (AN parameters, MM NAS service request (PDU session(s) to be activated, security parameters, PDU session status)).

In the case of the NG-RAN: i) The AN parameters may include an establishment cause. The establishment cause may provide a reason for requesting establishment of an RRC connection. ii) The UE may send a NAS service request message towards the AMF device encapsulated in an RRC message to the RAN. The RRC message that may be used to carry the 5G temporary ID and the NAS message is described in RAN specifications.

If the service request is triggered for user data, the UE may identify the PDU session(s) to be activated in the NAS service request message. If the service request is triggered for signaling only, the UE may not identify any PDU session. If this procedure is triggered for paging response and, in this instance, the UE needs to use a portion of PDU session(s), the UE may identify the PDU session(s) to be activated in the MM NAS service request message. Otherwise, the UE may not identify any PDU session(s) in the service request message.

If the service request over the 3GPP access is triggered in response to the paging indicating the non-3GPP access, the NAS service request message may include a list of PDU sessions associated with the non-3GPP access that may be re-activated over the 3GPP access. The PDU session status indicates PDU sessions available in the UE.

In operation 2, the (R)AN may send an N2 message (N2 parameters, MM NAS service request) to the AMF device. Here, if the AMF device is incapable of handling the service request, the AMF device may reject the service request.

When the NG-RAN is used, the N2 parameters may include the 5G temporary ID, location information, the RAT type, and the establishment cause. When the NG-RAN is used, the N2 parameters may include the establishment cause. The 5G temporary ID may be obtained in an RRC procedure. The RAN may select the AMF device based on the 5G temporary ID. The location information and the RAT type may relate to a cell in which the UE is camping.

Based on the PDU session status, the AMF device may initiate a PDU session release procedure when the PDU session is not available at the UE.

In operation 3, if the service request is not sent integrity protected or integrity protection is indicated as failed, the AMF device may initiate the NAS authentication/security procedure. If the UE triggers the service request to establish a signaling connection only, the UE and the network may send signaling after the security exchange and the following operations 4 to 8 and operations 11 to 17 may be omitted.

In operation 4 that is conditionally performed, the AMF device may send, to the SMF device, an Nsmf_PDUSession_UpdateSMContext request (PDU session ID(s), cause(s), UE location information, access type).

The Nsmf_PDUSession_UpdateSMContext request may be invoked based on at least one of the following scenarios. i) if the UE identifies PDU session(s) to be activated in the MM NAS service request message. Alternatively, if this procedure is triggered by the SMF device, however, the PDU sessions identified by the UE correlates to other SMF devices than the one triggering the procedure, the AMF device may send the Nsmf_PDUSession_UpdateSMContext request to the SMF device(s) associated with the PDU session(s) with a cause set to indicate "establishment of user plane resources" for a PDU session. ii) If the SMF device subscribes to AMF device for UE location change notification, the UE may move out or in the subscription area. iii) If the UE is in a MICO mode and the AMF device notifies the SMF device that the UE is unreachable and that the SMF device does not need to send DL data notifications to the AMF device, the AMF device may inform the SMF device that the UE is reachable through a Namf_EventExposure_Notify service operation.

In operation 5, based on the new location information, the SMF device may verify UPF selection criteria and may determine to perform one of the following:

i) continue using the current UPF device(s), ii) select a new (intermediate) UPF device (or add/remove the intermediate UPF device), if the UE is outside a service area of the UPF device that is previously connected to the AN, while maintaining the UPF device acting as a PDU session anchor, and iii) trigger re-establishment of the PDU session to perform relocation of the UPF device acting as the PDU session anchor (e.g., if the UE is outside a service area of the anchor UPF device which is connecting to the RAN).

If the request of operation 4 is for activating a PDU session of a LADN service, the SMF device may reject the request when the new location information indicates that the UE is outside a LADN service area.

In operation 6a that is conditionally performed, the SMF device may send an N4 session establishment request to the new UPF device, for example, the intermediate UPF device.

If the SMF device selects the new UPF device to act as the intermediate UPF device for the PDU session, an N4 session establishment request message may be sent to the new UPF device, providing packet detection, data forwarding, enforcement and reporting rules to be installed on the intermediate UPF device. PDU session anchor addressing information (on N9) for this PDU session may be provided to the intermediate UPF device.

If the service request is triggered by the network and the new UPF device is selected by the SMF device to replace the old (intermediate) UPF device, the SMF device may include the data forwarding indication.

In operation 6b that is conditionally performed, the new (intermediate) UPF device may send an N4 session establishment response to the SMF device.

The new (intermediate) UPF device may send an N4 session establishment response message to the SMF device. If the UPF device allocates CN tunnel information, the UPF device may provide CN DL tunnel information for the UPF device acting as the PDU session anchor and UL tunnel information (i.e., CN N3 tunnel information) to the SMF device. If the data forwarding indication is received, the new (intermediate) UPF device acting as an N3 terminating point may send CN DL tunnel information for the old (intermediate) UPF device to the SMF device. The SMF device may start a timer to be used in operation 20a to release a resource in the old (intermediate) UPF device.

In operation 7a that is conditionally performed, the SMF device may send an N4 session modification request to the UPF (PSA) device.

If the SMF selects the new UPF device to act as the intermediate UPF device for the PDU session, the SMF device may send an N4 session modification request message to the PDU session anchor UPF device, providing the DL tunnel information from the new (intermediate) UPF device.

In operation 7b, the UPF (PSA) device may send an N4 session modification response to the SMF device. The UPF (PSA) device may send an N4 session modification response message to the SMF device.

In operation 8a that is conditionally performed, the SMF device may send, to the old (intermediate) UPF device, an N4 session modification request.

If the service request is triggered by the network and the new UPF device is selected by the SMF device to replace the old (intermediate) UPF device, the SMF device may send the N4 session modification request message to the old (intermediate) UPF device, providing the DL tunnel information from the new (intermediate) UPF device acting as the N3 terminating point. The SMF device may start a timer to monitor a forwarding tunnel.

In operation 8b, the old (intermediate) UPF device may send an N4 session modification response to the SMF device. The old (intermediate) UPF device may send an N4 session modification response message to the SMF device.

In operation 9 that is conditionally performed, the old (intermediate) UPF device may send buffered downlink data forwarding to the new (intermediate) UPF device. The old (intermediate) UPF may forward the buffered data to the new (intermediate) UPF device acting as the N3 terminating point.

In operation 10 that is conditionally performed, the SMF device may send, to the AMF device, an Nsmf_PDUSession_UpdateSMContext response (N1 SM information (PDU session ID, PDU session re-establishment indication), N2 SM information (PDU session ID, QoS profile, CN N3 tunnel information, S-NSSAI), cause).

In response to receiving the Nsmf_PDUSession_UpdateSMContext request in operation 4 with the cause including "establishment of user plane resources", the SMF device may determine whether UPF reallocation is performed based on the UE location information, a UPF service area, and operator policies: i) For a PDU session that the SMF device determines still to be served by the current UPF device, i.e., the PDU session anchor or the intermediate UPF device in operation 5, the SMF device may create only N2 SM information and may send the Nsmf_PDUSession_UpdateSMContext response to the AMF device to establish the user plane(s). The N2 SM information may include information that is to be provided from the AMF device to the RAN. ii) For a PDU session that the SMF device determines as needing a UPF relocation for a PDU session anchor UPF device is needed in operation 5, the SMF device may send the Nsmf_PDUSession_UpdateSMContext response including only N1 SM information to the UE over the AMF device. The N1 SM information may include a corresponding PDU session ID and PDU session re-establishment indication.

In response to receiving an N11 message in operation 4 with an indication that the UE is reachable, if the SMF device has pending DL data, the SMF device may send the N11 message to the AMF device to establish the user plane(s) for the PDU sessions. Otherwise, the SMF device may resume sending DL data notifications to the AMF device in case of DL data.

In operation 11I, the AMF device may send, to the (R)AN, an N2 request (N2 SM information received from the SMF device, security context, AMF signaling connection ID, handover restriction list, MM NAS service accept).

The RAN may store the security context, the AMF signaling connection ID, QoS information for the QoS flows of the PDU sessions that are activated and N3 tunnel IDs in the UE RAN context.

The MM NAS service accept may include the PDU session status in the AMF device. If N1 SM information is received in operation 10, the service accept message may also include the N1 SM information.

The AMF device may include at least one piece of N2 SM information from the SMF device if this procedure is triggered for the PDU session user plane activation. The AMF device may send additional N2 SM information from the SMF device in a separate N2 message(s) (e.g., N2 tunnel setup request). Alternatively, if a plurality of SMF devices are involved, the AMF device may send a single N2 request message to the (R)AN after all the Nsmf_PDUSession_UpdateSMContext response service operations from all the SMF devices associated with the UE are received. In this case, the N2 request message may include N2 SM information received in each of the Nsmf_PDUSession_UpdateSMContext response and information to enable the AMF device to associate responses to relevant SMF devices.

In operation 12, the (R)AN may perform the following with respect to the UE: The RAN may perform an RRC connection reconfiguration with the UE based on QoS information for all the QoS flows of PDU sessions of which UP connections are activated and data radio bearers. The user plane security may be established in operation 12.

The RAN may forward the MM NAS service accept to the UE. The UE may locally delete context of PDU sessions that are not available in 5GC.

If the N1 SM information is present in the service accept and indicates that a PDU session to be re-established is present, the UE may initiate PDU session re-establishment after the service request procedure is completed.

In operation 13, once the user plane radio resources are set up, uplink data from the UE may be forwarded to the RAN. The NG-RAN may send the uplink data to the UPF address and tunnel ID provided in operation 4.

In operation 14 that is conditionally performed, the (R)AN may send, to the AMF device. N2 request ACK (N2 SM information (RAN tunnel information, a list of accepted QoS flows for the PDU sessions of activated, a list of rejected QoS flows for the PDU sessions activated)).

The message may include N2 SM information (e.g., RAN tunnel information). The RAN may respond N2 SM information with a separate N2 message (e.g., N2 tunnel setup response) if the AMF device sends the separate N2 message in operation 5.

If a plurality of pieces of N2 SM information are included in the N2 request message in operation 5, the N2 request ACK may include the plurality of pieces of N2 SM information and information to enable the AMF device to associate the responses to relevant SMF devices.

In operation 15 that is conditionally performed, the AMF device may send, to the SMF device, an Nsmf_PDUSession_UpdateSMContext request (N2 SM information (RAN tunnel info), RAT type) per accepted PDU session.

If the AMF device receives at least one piece of N2 SM information in operation 8, the AMF device may forward the N2 SM information to the relevant SMF device. If a UE time zone changes compared to a last reported UE time zone, the AMF device may include a UE time zone IE in this message.

In operation 16 that is optionally performed, the SMF device may perform the following with respect to the PCF device. For example, if dynamic PCC is deployed, the SMF device may initiate IP-CAN session modification and may provide new location information to the PCF device.

In operation 17*a* that is conditionally performed, the SMF device may send, to the new (intermediate) UPF device, an N4 session modification request (RAN tunnel information).

If the SMF device selects the new UPF device to act as the intermediate UPF device for the PDU session in operation 5, the SMF device may initiate the N4 session modification procedure and provide RAN tunnel information.

In operation 17*b* that is conditionally performed, the UPF device may send an N4 session update response to the SMF device.

In operation 18 that is conditionally performed, the SMF device may send an Nsmf_PDUSession_UpdateSMContext response to the AMF device.

In operation 19*a* that is conditionally performed, the SMF device may send an N4 session modification request to the new (intermediate) UPF device.

If forwarding tunnel is established and if the timer SMF set for the forwarding tunnel in operation 8*a* expires, the SMF device may send the N4 session modification request to the new (intermediate) UPF device acting as the N3 terminating point to release the forwarding tunnel.

In operation 19*b* that is conditionally performed, the new (intermediate) UPF device may send an N4 session modification response to the SMF device. The new (intermediate)

UPF device acting as the N3 terminating point may send the N4 session modification response to the SMF device.

In operation 20a that is conditionally performed, the SMF device may send an N4 session modification request or an N4 session release request to the old UPF device.

If the SMF device determines to continue using the old UPF device in operation 5, the SMF device may send the N4 session modification request, providing (R)AN tunnel information.

If the SMF device determines to select the new UPF device to act as the intermediate UPF device in operation 5, the SMF device may initiate resource release, after the timer in operation 6b expires, by sending the N4 session release request (release cause) to the old (intermediate) UPF device.

In operation 20b, the old (intermediate) UPF device may send an N4 session modification response or an N4 session release response to the SMF device.

The old UPF device may make acknowledgement with the N4 session modification response or the N4 session release response message to verify modification or release of resources.

Another Example: Network Triggered Service Request

Figure 16:
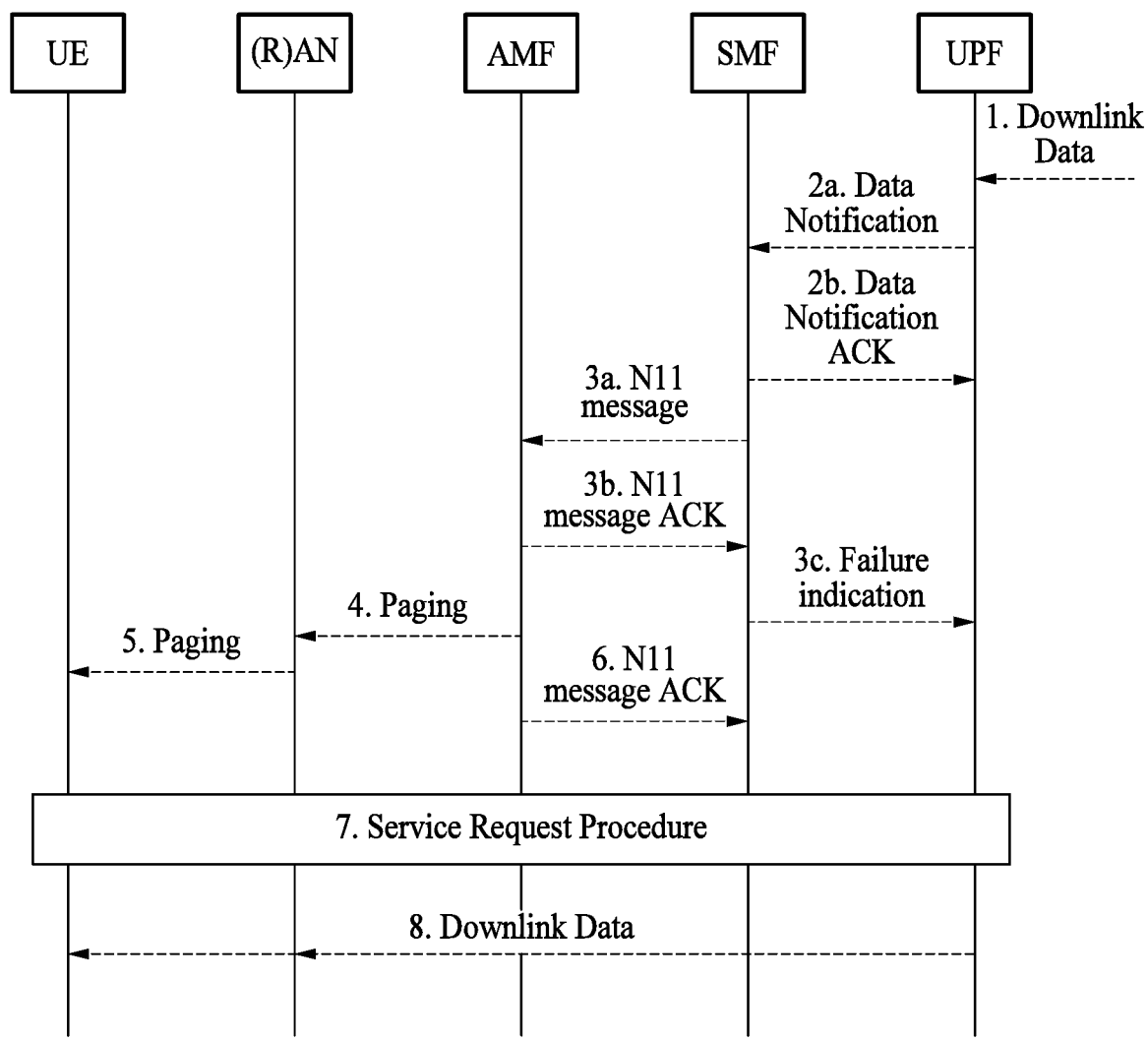
FIG. 16 illustrates another example of a network triggered service request procedure according to an example embodiment.

FIG. 16 illustrates another example of a network triggered service request according to an example embodiment.

The network triggered service request procedure is used when the network needs to signal (e.g., N1 signaling to the UE, mobile-terminated SMS, user plane resource establishment for PDU session(s) to deliver mobile terminating user data) with the UE. If the UE is in a CM-IDLE state or a CM-CONNECTED state in the 3GPP access, the network may initiate the network triggered service request procedure. If the UE is in the CM-IDLE state and asynchronous type communication is not activated, the network sends a paging request to the (R)AN/UE. The paging request triggers the UE triggered service request procedure. If the asynchronous type communication is activated, the network stores a received message and forwards the message to the (R)AN and/or the UE (i.e., synchronizes a context with the (R)AN and/or the UE) when the UE enters the CM-CONNECTED state.

If the UE is in the CM-CONNECTED state in the non-3GPP access, the network initiates the network triggered service request procedure when the network needs to signal. If the UE is in the CM-IDLE state in the non-3GPP access and if the UE is simultaneously registered over the 3GPP access and the non-3GPP access in a PLMN, the network may initiate the network triggered service request over the 3GPP access.

For this procedure, the impacted SMF device and UPF device are all under control of a PLMN serving the UE. For example, in a home routed roaming case, the SMF device and the UPF device in an HPLMN are not involved.

Referring to FIG. 16, in operation 1, when the UPF device receives downlink data of a PDU session and no (R)AN tunnel information is stored in the UPF device for the PDU session, the UPF device may buffer the downlink data, unless the UPF device is previously notified by the SMF device to not buffer the downlink data.

In operation 2a, the UPF device may send a data notification (PDU session ID, priority) to the SMF device.

i) On arrival of a first downlink data packet, the UPF device may send a data notification message to the SMF device, if the SMF device has not previously notified the UPF device to not send the data notification to the SMF device (in which case the next operations are omitted).

ii) If the UPF device receives additional downlink data packets for a QoS flow in the same PDU session with the same or lower priority than one used in any previous data notification for this PDU session, the UPF device may buffer these downlink data packets without sending a new data notification.

iii) If a PPD feature is supported by the UPF device and activated by the SMF device for an N4 session, the UPF device may also include DSCP in a TOS (IPv4)/TC (IPv6) value from an IP header of the downlink data packet.

iv) If the SMF device, while waiting for a user plane connection to be established in the UPF device, receives an N11 message notifying a new AMF device serving the UE from the new AMF device, the SMF device may re-send the data notification message only to the new AMF device.

In operation 2b, the SMF device may send a data notification ACK to the UPF device.

In operation 3a, the SMF device may send, to the AMF device, an N11 message (SUPI, PDU session ID, N2 SM information (QoS profile, CN N3 tunnel information), priority).

Unless the SMF device is previously notified that the UE is unreachable, or the UE is reachable only for a regulatory prioritized service and the PDU session is for the regulatory prioritized service, or the PDU session is for the LADN and the SMF device is previously notified that the UE is outside the LADN service area and reachable, the SMF device, in response to receiving a data notification message, may determine to contact the AMF device and may send the N11 message (SUPI, PDU session ID, N2 SM information (PDU session ID, QoS profile, CN N3 tunnel information, S-NS-SAI), priority, paging policy indication) to the AMF device, including the priority and PDU session ID received in the data notification message as a part of operation 2a. If the SMF device, while waiting for a user plane connection to be activated, receives any additional data notification message for the same PDU session but with higher priority than indicated in any previous data notification for this PDU session, the SMF device may send a new N11 message indicating the higher priority and PDU session ID to the AMF device.

If the SMF device, while waiting for a user plane connection to be activated, receives an N11 message response from the AMF device other than one to which the SMF device sends the N11 message, the SMF device may resend the N11 message to the AMF device.

When supporting the PPD feature, the SMF device may indicate, in the N11 message, the paging policy indication related to the downlink data that triggers the data notification message.

In operation 3b that is conditionally performed, the AFF device may respond to the SMF device.

If the UE is in the CM-IDLE state and the AMF device determines that the UE is not reachable for paging, the AMF device may either send the N11 message to the SMF device, or other network functions from which the AMF device receives the request message in operation 3a, indicating that the UE is not reachable, or the AMF device may perform asynchronous type communication and store the N11 message. If the asynchronous type communication is invoked and the AMF device stores the N11 message, the AMF device may initiate communication with the UE and the (R)AN when the UE is reachable, e.g., when the UE enters the CM-CONNECTED state.

If the AMF device determines that the UE is unreachable for the SMF (e.g., due to the UE in a MICO mode or the UE is only registered over non-3GPP access and its state is CM-IDLE), the AMF device may reject the request from the SMF device. The AMF device may include, in a reject message, an indication that the SMF device does not need to send DL data notifications to the AMF device, if the SMF device does not subscribe to the event of the UE reachability. The AMF device may store an indication that the SMF device is informed that the UE is unreachable.

If the UE is not in the MICO mode and the AMF device detects that the UE is in a non-allowed area unless the request from the SMF device is a regulatory prioritized service, the AMF device may reject the request from the SMF device and may notify the SMF device that the UE is reachable only for the regulatory prioritized service. The AMF device may store an indication that the SMF device is informed that the UE is reachable only for the regulatory prioritized service.

If the registration procedure with AMF change is in progress when the old AMF device receives an N11 message, the old AMF device may reject the N11 message with an indication that the N11 message is temporarily rejected.

In response to receiving an N11 message ACK with an indication that its request is temporarily rejected, the SMF device may start a locally configured guard timer and wait for any N11 message to come from the new AMF device. In response to receiving an N11 message from the AMF device, the SMF device may send an N11 message (with data notification) to the AMF device from which the SMF device receives the N11 message. Otherwise, the SMF device performs operation 3c at expiry of the guard timer. If the SMF device determines control plane buffering, the SMF device may indicate the UPF device to start forwarding the downlink data packets towards the SMF device.

In operation 3c that is conditionally performed, the SMF device may respond to the UPF device.

The SMF device may notify the UPF device about a failure of the user plane setup.

If the SMF device receives the indication from the AMF device that the UE is unreachable or reachable only for the regulatory prioritized service, the SMF device may perform, based on network policies, one of the following: i) indicate to the UPF device to stop sending data notifications and/or to stop buffering DL data or apply extended buffering, and ii) refrain from sending further N11 messages for DL data to the AMF while the UE is unreachable.

If the SMF device receives information that the N11 message requested from the SMF device is temporarily rejected and receives the downlink data notification from the UPF device, the SMF device may request the UPF device to apply extended buffering.

In operation 4 that is conditionally performed, the AMF device may send a paging message to an (R)AN node.

If the UE is in the CM-CONNECTED state, the AMF may perform operations 8 to 16 in the UE triggered service request procedure of FIGS. 11A and 11B to activate the user plane connection for this PDU session (i.e., establish the radio resources and N3 tunnel) without sending a paging message to the (R)AN node and the UE. In operation 8 of FIG. 15A, the AMF device may not send the service accept message to the UE. The rest of this procedure may be omitted.

If the UE is in the RM-REGISTERED state and CM-IDLE and reachable, the AMF device may send a paging message (NAS ID for paging, registration area list, paging DRX length, paging priority indication) to the (R)AN node(s) belonging to the registration area(s) in which the UE is registered.

If the UE is CM-IDLE in both the non-3GPP access and the 3GPP access, the AMF device may send a paging message over the 3GPP access to re-activate a PDU session associated with the non-3GPP access.

When supporting the PPD, the AMF device may include paging policy indication in the paging request message.

Paging strategies may be configured in the AMF device for different combinations of DNN, paging policy indication, PDU session IDs from the SMF device when available and other PDU session context information identified by the PDU session ID received in the N11 message.

The paging strategies may include i) a paging retransmission scheme (e.g., a number of times that the paging is repeated or a time interval at which the paging is repeated), ii) determining whether to send the paging message to the (R)AN nodes during specific AMF high load conditions, and iii) determining whether to apply sub-area based paging (e.g., a first page in a last known cell ID or TA and retransmission in all registered TAs).

The AMF device and the (R)AN may support further paging optimizations in order to reduce signaling load and network resources used to successfully page the UE by at least one of: i) by the AMF device implementing specific paging strategies (e.g., the N2 paging message is sent to the (R)AN nodes that serve the UE last), ii) by the AMF device considering information on recommended cells and RAN nodes provided from the (R)AN at transition to the CM-IDLE state (here, the AMF device considers the (R)AN nodes associated with a portion of the information to determine the (R)AN nodes to be paged, and provides the information on recommended cells within the N2 paging message to each of the (R)AN nodes, and iii) by the (R)AN considering the paging attempt count information provided from the AMF device at paging.

If UE radio capability for paging information is available in the AMF device, the AMF device may add the UE radio capability for paging information in the N2 paging message to the (R)AN nodes.

If the information on recommended cells and (R)AN nodes for paging is available in the AMF device, the AMF device may consider the information to determine the (R)AN nodes for paging and, when paging a (R)AN node, the AMF device may transparently convey the information on recommended cells to the (R)AN node.

The AMF device may include the paging attempt count information in the N2 paging message(s). The paging attempt count information may be the same for all (R)AN nodes selected by the AMF device for paging.

In operation 5 that is conditionally performed, the (R)AN node may page the UE.

If the (R)AN nodes receive paging messages from the AMF device, the UE may be paged by the (R)AN node.

In operation 6 that is conditionally performed, the AMF device may send an N11 message ACK to the SMF device.

The AMF device may supervise the paging procedure with a timer. If the AMF device receives no response from the UE to the paging request message, the AMF device may apply further paging according to any applicable paging strategy described in operation 3.

If the AMF device receives no response from the UE, the AMF device may consider the UE as unreachable and the SM N2 message may not be routed to the (R)AN, so the AMF device may return an "N11 message reject" with an appropriate "failure cause", for example, UE unreachability, to the SMF device or other network functions to indicate the failure of "message routing service", unless the AMF device is aware of an ongoing MM procedure that prevents the UE from responding, that is, the AMF device receives an N14 context request message indicating that the UE performs the registration procedure with another AMF device.

In operation 7, when the UE is in the CM-IDLE state, the UE may initiate the UE triggered service request procedure of FIGS. 15A and 15B in response to receiving the paging request. In operation 4 of the UE triggered service request procedure of FIGS. 15A and 15B, the AMF device may send the N11 message to the SMF devices(s) associated with the PDU session identified in the MM NAS service request message if there is any, but not to the SMF device(s) from which the AMF device receives the N11 message in operation 3a.

In operation 8, the UPF device may send the buffered downlink data towards the UE over the (R)AN node which performs the service request procedure. The network may send downlink signaling if the procedure is triggered due to a request from other network entities described in operation 3a.

The components described in the example embodiments may be achieved by hardware components including at least one DSP (Digital Signal Processor), a processor, a controller, an ASIC (Application Specific Integrated Circuit), a programmable logic element such as an FPGA (Field Programmable Gate Array), other electronic devices, and combinations thereof. At least some of the functions or the processes described in the example embodiments may be achieved by software, and the software may be recorded on a recording medium. The components, the functions, and the processes described in the example embodiments may be achieved by a combination of hardware and software.

The units and/or modules described herein may be implemented using hardware components, software components, and/or combination thereof. For example, the hardware components may include microphones, amplifiers, bandpass filters, audio to digital converters, and processing devices. A processing device may be implemented using one or more hardware device configured to carry out and/or execute program code by performing arithmetical, logical, and input/output operations. The processing device(s) may include a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular, however, one skilled in the art will appreciated that a processing device may include a plurality of processing elements and a plurality of types of processing elements. For example, a processing device may include a plurality of processors or a processor and a controller. In addition, different processing configurations are possible, such as parallel processors.

The software may include a computer program, a piece of code, an instruction, or some combination thereof, to independently or collectively instruct and/or configure the processing device to operate as desired, thereby transforming the processing device into a special purpose processor. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

The components described in the example embodiments may be achieved by hardware components including at least one DSP (Digital Signal Processor), a processor, a controller, an ASIC (Application Specific Integrated Circuit), a programmable logic element such as an FPGA (Field Programmable Gate Array), other electronic devices, and combinations thereof. At least some of the functions or the processes described in the example embodiments may be achieved by software, and the software may be recorded on a recording medium. The components, the functions, and the processes described in the example embodiments may be achieved by a combination of hardware and software.

A number of example embodiments have been described above. Nevertheless, it needs to be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A user equipment (UE) triggered service request method for a network performed by a session management function (SMF) device, the method comprising:
   receiving an Nsmf_PDUSession_UpdateSMContext request message that includes a protocol data unit (PDU) session identifier (ID) and location information of the UE and an access type from an access and mobility management function (AMF) device;
   determining either to maintain a PDU session or to release the PDU session, when the PDU session ID corresponds to a local area data network (LADN) and the SMF device determines that the UE is outside an area of the LADN based on a location of the UE from the AMF device; and;

sending an Nsmf_PDUSession_UpdateSMContext response message to the AMF device, wherein the UE triggered service request method is used by the UE in a CM-CONNECTED state to request activation of user plane connection for PDU sessions and to respond to a NAS notification message from the AMF device, wherein the UE does not trigger the UE triggered service request method for a PDU session corresponding to a local area data network (LADN) when the UE is outside an area of the LADN, wherein the UE sends a service request message towards the AMF device encapsulated in an RRC message to Radio Access Network (RAN), and wherein when the UE triggered service realest over a 3rd Generation Partnership Project (3GFF) access is triggered in response to a paging indicating a non-3GPP access the service request message identifies a list of PDU sessions associated with the non-3GPF access that is re-activated over 3GPP in the list of allowed PDU sessions.

2. The method of claim 1, wherein the SMF device is configured to send an N4 session establishment request message to the new UPF device in response to determining to use the new UPF device.

3. The method of claim 1, wherein the SMF device is configured to send an N4 session modification request message including downlink (DL) tunnel information to a PDU session anchor (PSA) device, in response to determining to use the new UPF device.

4. The method of claim 1, wherein the SMF device is configured to send an N4 session modification request message to the old UPF device in response to determining to use the new UPF device.

5. A user equipment (UE) triggered service request method for a network performed by a new user plane function (UPF) device, the method comprising:

receiving an N4 session establishment request message from a session management function (SMF) device when the SMF devices receives, from an access and mobility management function (AMF) device, an Nsmf_PDUSession_UpdateSMContext request message that includes a protocol data unit (PDU) session identifier (ID) and location information and an access type of a user equipment (UE) and determines either to maintain a PDU session or to release the PDU session, when the PDU session ID corresponds to a local area data network (LADN) and the SMF device determines that the UE is outside an area of the LADN based on a location of the UE from the AMF device; and sending, to the SMF device, an N4 session establishment response message, wherein the service request method is used by the UE in a CM-CONNECTED state to request activation of user plane connection for PDU sessions and to respond to a NAS notification message from the AMF device, wherein the UE does not trigger the service request method for a PDU session corresponding to a local area data network (LADN) when the UE is outside an area of the LADN, wherein the UE sends a service request message towards the AMF device encapsulated in an RRC message to a Radio Access Network (RAN), when the UE triggered service request over a 3rd Generation Partnership Project (3GPP) access is triggered in response to a paging indicating a non-3GPP access, the service request message identifies a list of PDU sessions associated with the non-3GPP access that is re-activated over 3GPP in the list of allowed PDU sessions.

6. The method of claim 5, wherein, in response to receiving the N4 session establishment request message, the new UPF device is configured to allocate downlink (DL) core network (CN) tunnel information and uplink (UL) CN tunnel information for the new UPF device that acts as a PDU session anchor.

7. A network triggered service request method for a network performed by an access and management function (AMF) device comprising:

receiving, by the AMF, a Namf Communication N1N2MessageTransfer message from a session management function (SMF) device; and sending, by the AMF device, a paging message to a RAN node(s) over the 3GPP access, when a user equipment (UE) is in a CM-IDLE state in a 3rd Generation Partnership Project (3GPP) access and a protocol data unit (PDU) session ID received from the SMF device is associated with the 3GPP access and based on the local policy that the AMF device determines to notify the UE through the 3GPP access even when the UE is in a CM-CONNECTED state for a non-3GPP access, wherein the SMF device determines to contact the AMF device, if the SMF device is previously not notified that the UE is unreachable, or if the UE is reachable only for a regulatory prioritized service and the PDU session is for the regulatory prioritized service, when the UE is in a CM IDLE state or a CM-CONNECTED state in the 3GPP access, the network initiates the network triggered service request method, when the UE is in the CM-IDLE state and asynchronous type communication is not activated, the network sends a paging request to an Access Network or the UE, wherein the paging request triggers a UE triggered service request method in the UE when the UE is in the CM-IDLE state in a non-3GPP access and the UE is simultaneously registered over the 3GPP access and the non-3GPP access in a Public Land Mobile Network (PLMN), the network initiates the network triggered service request method via the 3GPP access, and when the UE is in the CM-IDLE state in the 3GPP access and in the CM-CONNECTED state in the non-3GPP access and the UE is simultaneously registered over the 3GPP access and the non-3GPP accesses in a same PLMN, the network initiates the network triggered service request method for the 3GPP access over the non-3GPP access.

8. The method of claim 7, wherein, if a connection management state for a non-$3^{rd}$ Generation Partnership Project (non-3GPP) access is a CM-IDLE state and a connection management state for a 3GPP access is a CM-CONNECTED state, the UE is configured to send a list of allowed PDU sessions capable of being re-activated over the 3GPP access.

9. The method of claim 8, wherein the list of PDU sessions includes a session of which use is allowed over the 3GPP access among PDU sessions associated with the non-3GPP access.

10. The method of claim 7, wherein, if a connection management state for a 3GPP access is a CM-IDLE state, the UE is configured to initiate a data transmission and reception procedure associated with a service with the UPF device in response to receiving the paging message for the PDU session associated with the 3GPP access.

11. The method of claim 7, wherein, if a connection management state for a 3GPP access and a non-3GPP access is a CM-IDLE state, the UE is configured to send, to the AMF device, a list of allowed PDU session capable of being re-activated over the 3GPP access.

12. The method of claim 7, wherein the paging message is sent based on a paging strategy managed by the AMF device, and the paging strategy is set by a timer supervised by the AMF device, or used when the AMF device determines whether to send the paging message during high load conditions or determines whether to apply a sub-area based paging.

13. The method of claim 7, wherein, if the UPF device receives additional downlink data for a quality of service (QoS) flow of a PDU session with the same or lower priority than that of the PDU session, the UPF device that sends the data notification message to the SMF device is configured to buffer the additional downlink data instead of sending a new data notification message.

\* \* \* \* \*